(12) United States Patent
Okada et al.

(10) Patent No.: US 10,416,030 B2
(45) Date of Patent: Sep. 17, 2019

(54) FORCE SENSOR

(71) Applicant: WACOH-TECH INC., Toyama (JP)

(72) Inventors: Kazuhiro Okada, Toyama (JP); Miho Okada, Toyama (JP)

(73) Assignee: WACOH-TECH INC., Toyama (JP)

( * ) Notice: Subject to any disclaimer, the term of this patent is extended or adjusted under 35 U.S.C. 154(b) by 230 days.

(21) Appl. No.: 15/312,913

(22) PCT Filed: Jan. 26, 2015

(86) PCT No.: PCT/JP2015/052784
§ 371 (c)(1),
(2) Date: Nov. 21, 2016

(87) PCT Pub. No.: WO2016/121129
PCT Pub. Date: Aug. 4, 2016

(65) Prior Publication Data
US 2017/0191882 A1 Jul. 6, 2017

(51) Int. Cl.
*G01L 1/04* (2006.01)
*G01L 1/14* (2006.01)
(Continued)

(52) U.S. Cl.
CPC ............... *G01L 1/04* (2013.01); *G01L 1/144* (2013.01); *G01L 1/146* (2013.01); *G01L 5/165* (2013.01); *G01L 5/226* (2013.01)

(58) Field of Classification Search
None
See application file for complete search history.

(56) References Cited

U.S. PATENT DOCUMENTS

| 4,905,523 A | 3/1990 | Okada |
| 4,967,605 A | 11/1990 | Okada |

(Continued)

FOREIGN PATENT DOCUMENTS

| JP | 5-118943 A | 5/1993 |
| JP | 8-122178 A | 5/1996 |

(Continued)

OTHER PUBLICATIONS

U.S. Appl. No. 09/653,790 (abandoned).
(Continued)

*Primary Examiner* — Jamel E Williams
(74) *Attorney, Agent, or Firm* — Ladas & Parry LLP

(57) ABSTRACT

There is provided a detection ring (600), the structure of which is shown in the perspective view of FIG. 13(*a*). The detection ring (600) is arranged so that the Z-axis is a central axis on the XY plane as shown in the side view (b), and a planar shape thereof is formed in a circular ring as shown in the bottom view (c). The detection ring (600) is structured so that four sets of detection portions (D1 to D4), each constituted with a blade spring which undergoes elastic deformation, are coupled with four sets of circular arc-shaped coupling portions (L1 to L4). A supporting substrate is arranged below the detection ring (600) and fixing points (P1, P2) arranged on the Y-axis are fixed to the supporting substrate. When force or moment to be detected is exerted on exertion points (Q1, Q2), the four sets of detection portions (D1 to D4) undergo elastic deformation. A displacement electrode is formed on a bottom of a displacement portion (63) at each of the detection portions (D1 to D4), and a fixed electrode is formed on a face facing the supporting substrate to form four sets of capacitive elements, thereby detecting force or moment exerted by operation on the basis of variation amount of capacitance values thereof.

12 Claims, 35 Drawing Sheets

(51) Int. Cl.
    *G01L 5/22* (2006.01)
    *G01L 5/16* (2006.01)

(56) References Cited

U.S. PATENT DOCUMENTS

| | | |
|---|---|---|
| 4,969,366 A | 11/1990 | Okada |
| 5,014,415 A | 5/1991 | Okada |
| 5,035,148 A | 7/1991 | Okada |
| 5,092,645 A | 3/1992 | Okada |
| 5,182,515 A | 1/1993 | Okada |
| 5,263,375 A | 11/1993 | Okada |
| 5,295,386 A | 3/1994 | Okada |
| 5,343,765 A | 9/1994 | Okada |
| 5,365,799 A | 11/1994 | Okada |
| 5,392,658 A | 2/1995 | Okada |
| 5,406,848 A | 4/1995 | Okada |
| 5,421,213 A | 6/1995 | Okada |
| 5,437,196 A | 8/1995 | Okada |
| 5,490,427 A | 2/1996 | Yee et al. |
| 5,492,020 A | 2/1996 | Okada |
| 5,497,668 A | 3/1996 | Okada |
| 5,531,002 A | 7/1996 | Okada |
| 5,531,092 A | 7/1996 | Okada |
| 5,571,972 A | 11/1996 | Okada |
| 5,639,973 A | 6/1997 | Okada |
| 5,646,346 A | 7/1997 | Okada |
| 5,668,318 A | 9/1997 | Okada |
| 5,682,000 A | 10/1997 | Okada |
| 5,744,718 A | 4/1998 | Okada |
| 5,780,749 A | 7/1998 | Okada |
| 5,811,693 A | 9/1998 | Okada |
| 5,831,163 A | 11/1998 | Okada |
| 5,850,040 A | 12/1998 | Okada |
| 5,856,620 A | 1/1999 | Okada |
| 5,962,787 A | 10/1999 | Okada et al. |
| 5,987,985 A | 11/1999 | Okada |
| 6,003,371 A | 12/1999 | Okada |
| 6,053,057 A | 4/2000 | Okada |
| 6,076,401 A | 6/2000 | Okada |
| 6,098,461 A | 8/2000 | Okada |
| 6,158,291 A | 12/2000 | Okada |
| 6,159,761 A | 12/2000 | Okada |
| 6,185,814 B1 | 2/2001 | Okada |
| 6,205,856 B1 | 3/2001 | Okada |
| 6,269,697 B1 | 8/2001 | Okada |
| 6,282,956 B1 | 9/2001 | Okada |
| 6,314,823 B1 | 11/2001 | Okada |
| 6,367,326 B1 | 4/2002 | Okada |
| 6,378,381 B1 | 4/2002 | Okada et al. |
| 6,474,133 B1 | 11/2002 | Okada |
| 6,477,903 B2 | 11/2002 | Okada |
| 6,512,364 B1 | 1/2003 | Okada |
| 6,530,283 B2 | 3/2003 | Okada et al. |
| 6,716,253 B2 | 4/2004 | Okada |
| 6,772,632 B2 | 8/2004 | Okada |
| 6,779,408 B2 | 8/2004 | Okada |
| 6,809,529 B2 | 10/2004 | Okada et al. |
| 6,859,048 B2 | 2/2005 | Okada et al. |
| 6,864,677 B1 | 3/2005 | Okada |
| 6,865,943 B2 | 3/2005 | Okada |
| 6,894,482 B2 | 5/2005 | Okada |
| 6,915,709 B2 | 7/2005 | Okada |
| 6,920,788 B2 | 7/2005 | Okada |
| 6,941,810 B2 | 9/2005 | Okada |
| 6,990,867 B2 | 1/2006 | Okada |
| 7,059,188 B2 | 6/2006 | Okada |
| 7,075,527 B2 | 7/2006 | Takagi et al. |
| 7,121,147 B2 | 10/2006 | Okada |
| 7,123,028 B2 | 10/2006 | Okada et al. |
| 7,152,485 B2 | 12/2006 | Okada |
| 7,219,561 B2 | 5/2007 | Okada |
| 7,231,802 B2 | 6/2007 | Okada |
| 7,360,455 B2 | 4/2008 | Okada |
| 7,363,814 B2 | 4/2008 | Okada |
| 7,533,582 B2 | 5/2009 | Okada |
| 7,578,162 B2 | 8/2009 | Okada |
| 7,882,740 B2 | 2/2011 | Okada |
| 7,900,513 B2 | 3/2011 | Okada |
| 8,408,075 B2 | 4/2013 | Okada |
| 8,667,854 B2 | 3/2014 | Nishioki et al. |
| 8,966,996 B2 | 3/2015 | Okada et al. |
| 9,383,277 B2 | 7/2016 | Okada et al. |
| 9,995,644 B2 | 6/2018 | Nishioki et al. |
| 2016/0211778 A1 | 7/2016 | Okada et al. |
| 2017/0110989 A1 | 4/2017 | Okada et al. |

FOREIGN PATENT DOCUMENTS

| | | |
|---|---|---|
| JP | 2004-325367 A | 11/2004 |
| JP | 2004-354049 A | 12/2004 |
| WO | 2013/014803 A1 | 1/2013 |

OTHER PUBLICATIONS

International Search Report (ISR) and Written Opinion (WO) dated Apr. 28, 2015 for International Application No. PCT/JP2015/052784.
Espacenet English abstract of JP 2004-325367 A.
Espacenet English abstract of JP 2004-354049 A.
Espacenet English abstract of JP 8-122178 A.
Espacenet English abstract of WO 2013/014803 A1.
Espacenet English abstract of JP 5-118943 A.

|  | d1 | d2 | d3 | d4 | d5 | d6 | d7 | d8 |
|---|---|---|---|---|---|---|---|---|
| +Fx | − | + | + | − | 0 | 0 | 0 | 0 |
| +Fy | + | + | − | − | 0 | 0 | 0 | 0 |
| +Fz | 0 | 0 | 0 | 0 | + | + | + | + |
| +Mx | 0 | 0 | 0 | 0 | + | + | − | − |
| +My | 0 | 0 | 0 | 0 | − | + | + | − |
| +Mz | + | − | + | − | 0 | 0 | 0 | 0 |

VARIATION AMOUNT (EXTENT OF INCREASE AND DECREASE) OF CAPACITANCE VALUES

|    | C1   | C2   | C3   | C4   |
|----|------|------|------|------|
| Fx | (−)  | (+)  | (+)  | (−)  |
| Fy | (+)  | (+)  | (−)  | (−)  |
| Fz | −    | −    | −    | −    |
| Mx | −−   | −−   | ++   | ++   |
| My | ++   | −−   | −−   | ++   |
| Mz | +    | −    | +    | −    |

FIG. 21

VARIATION AMOUNT (EXTENT OF INCREASE AND DECREASE) OF CAPACITANCE VALUES

|    | C1   | C2   | C3   | C4   |
|----|------|------|------|------|
| Fx | 0    | 0    | 0    | 0    |
| Fy | 0    | 0    | 0    | 0    |
| Fz | −    | −    | −    | −    |
| Mx | −−   | −−   | ++   | ++   |
| My | ++   | −−   | −−   | ++   |
| Mz | +    | −    | +    | −    |

FIG. 22

$$\begin{cases} F_z = -(C1+C2+C3+C4) \\ M_x = -C1-C2+C3+C4 \\ M_y = +C1-C2-C3+C4 \\ M_z = +C1-C2+C3-C4 \end{cases}$$

FIG. 23
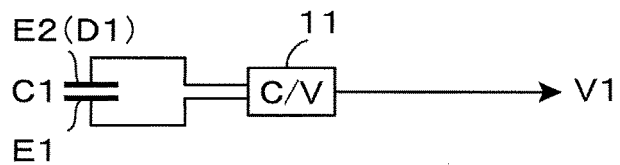
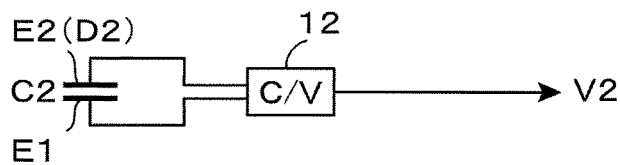
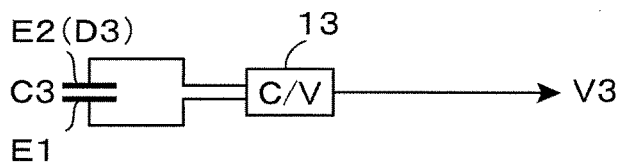
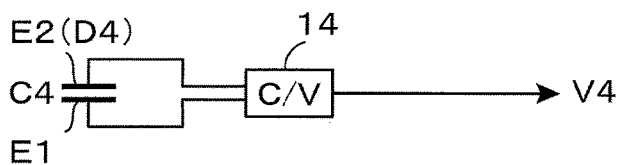
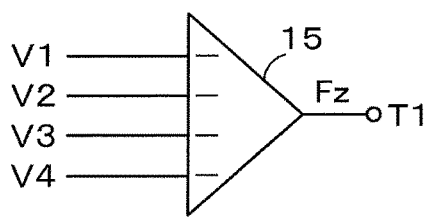
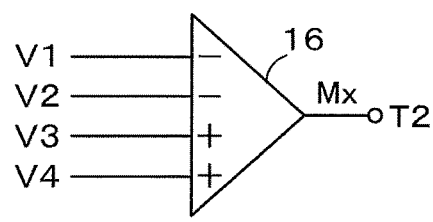
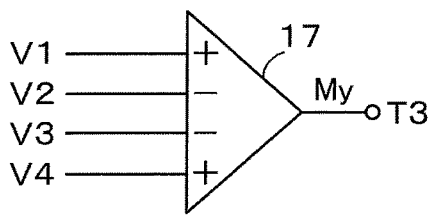
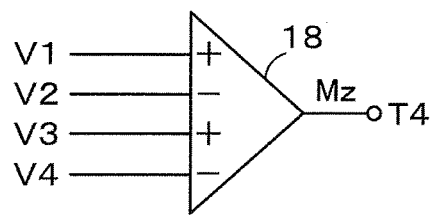

FIG. 28

VARIATION AMOUNT (EXTENT OF INCREASE AND DECREASE) OF CAPACITANCE VALUES

|    | C11 | C12 | C13 | C14 | C15 | C16 | C17 | C18 |
|----|-----|-----|-----|-----|-----|-----|-----|-----|
| Fx | (−) | (+) | (−) | (+) | (+) | (−) | (+) | (−) |
| Fy | (+) | (−) | (−) | (+) | (−) | (+) | (+) | (−) |
| Fz | −   | −   | −   | −   | −   | −   | −   | −   |
| Mx | −−  | −−  | −−  | −−  | ++  | ++  | ++  | ++  |
| My | ++  | ++  | −−  | −−  | −−  | −−  | ++  | ++  |
| Mz | +   | −   | +   | −   | +   | −   | +   | −   |

FIG. 29

$$\begin{cases} F_x = -C11+C12-C13+C14+C15-C16+C17-C18 \\ F_y = +C11-C12-C13+C14-C15+C16+C17-C18 \\ F_z = -(C11+C12+C13+C14+C15+C16+C17+C18) \\ M_x = -C11-C12-C13-C14+C15+C16+C17+C18 \\ M_y = +C11+C12-C13-C14-C15-C16+C17+C18 \\ M_z = +C11-C12+C13-C14+C15-C16+C17-C18 \end{cases}$$

FIG. 30

| | VARIATIONS OF THE ARITHMETIC EXPRESSIONS |
|---|---|
| Fx | $Fx = -C11+C12+C17-C18$ <br> $Fx = +C12-C13-C16+C17$ |
| Fy | $Fy = +C11-C12-C13+C14$ <br> $Fy = -C15+C16+C17-C18$ |
| Fz | $Fz = -(C11+C14+C15+C18)$ <br> $Fz = -(C12+C13+C16+C17)$ |
| Mx | $Mx = -C11-C12+C17+C18$ <br> $Mx = -C13-C14+C15+C16$ |
| My | $My = +C11+C12-C13-C14$ <br> $My = -C15-C16+C17+C18$ |
| Mz | $Mz = +C11-C12+C15-C16$ <br> $Mz = +C13-C14+C17-C18$ <br> $Mz = +C11-C14+C15-C18$ |

VARIATION AMOUNT (EXTENT OF INCREASE AND DECREASE) OF CAPACITANCE VALUES

|    | C1 | C2 | C3 | C4 |
|----|----|----|----|----|
| Fx | −  | +  | +  | −  |
| Fy | +  | +  | −  | −  |
| Fz | −  | −  | −  | −  |
| Mx | −  | −  | +  | +  |
| My | +  | −  | −  | +  |
| Mz | +  | −  | +  | −  |

FIG. 34

VARIATION AMOUNT (EXTENT OF INCREASE AND DECREASE) OF CAPACITANCE VALUES

|    | C11 | C12 | C13 | C14 | C15 | C16 | C17 | C18 |
|----|-----|-----|-----|-----|-----|-----|-----|-----|
| Fx | −   | +   | −   | +   | +   | −   | +   | −   |
| Fy | +   | −   | −   | +   | −   | +   | +   | −   |
| Fz | −   | −   | −   | −   | −   | −   | −   | −   |
| Mx | −   | −   | −   | −   | +   | +   | +   | +   |
| My | +   | +   | −   | −   | −   | −   | +   | +   |
| Mz | +   | −   | +   | −   | +   | −   | +   | −   |

FIG. 38

VARIATION AMOUNT (EXTENT OF INCREASE AND DECREASE) OF CAPACITANCE VALUES

|    | C11 | C12 | C13 | C14 | C15 | C16 | C17 | C18 |
|----|-----|-----|-----|-----|-----|-----|-----|-----|
| Fx | 0   | +   | −   | 0   | 0   | −   | +   | 0   |
| Fy | −   | 0   | 0   | −   | +   | 0   | 0   | +   |
| Fz | −   | −   | −   | −   | −   | −   | −   | −   |
| Mx | −   | −−  | −−  | −   | +   | ++  | ++  | +   |
| My | +   | ++  | −−  | −   | −   | −−  | ++  | +   |
| Mz | −   | −   | +   | +   | −   | −   | +   | +   |

FIG. 39

$$\begin{cases} Fx = +C12-C13-C16+C17 \\ Fy = -C11-C14+C15+C18 \\ Fz = -(C11+C12+C13+C14+C15+C16+C17+C18) \\ Mx = -C11-C12-C13-C14+C15+C16+C17+C18 \\ My = +C11+C12-C13-C14-C15-C16+C17+C18 \\ Mz = -C11-C12+C13+C14-C15-C16+C17+C18 \end{cases}$$

FIG. 40

| VARIATIONS OF THE ARITHMETIC EXPRESSIONS | |
|---|---|
| Fz | Fz = −(C11+C13+C15+C17) <br> Fz = −(C12+C14+C16+C18) |
| Mx | Mx = −C12−C13+C16+C17 |
| My | My = +C11−C14−C15+C18 |
| Mz | Mz = −C11+C13−C15+C17 <br> Mz = −C12+C14−C16+C18 |

FORCE SENSOR

RELATED APPLICATION

This application is an application under 35 U.S.C. 371 of International Application No. PCT/JP2015/052784 filed on Jan. 26, 2015, the entire contents of which are incorporated herein by reference.

TECHNICAL FIELD

The present invention relates to a force sensor and in particular to a sensor which is suitable for detecting force in the direction of each coordinate axis and moment around each coordinate axis in a three-dimensional orthogonal coordinate system.

BACKGROUND ART

Various types of force sensors have been used to control motions of robots and industrial machines. Also, a downsized force sensor has been incorporated as a man-machine interface of an input device for electronics. In order to reduce dimensions and costs, a force sensor to be used in the above applications is required to be as simple as possible in structure and also to independently detect force for each coordinate axis in a three dimensional space.

At present, generally used multi-axis force sensors are categorized into such types that a specific directional component of force exerted on a mechanical structure portion is detected as displacement occurring at a specific site and such types that the specific directional component of force is detected as mechanical strain occurring at a specific site. A force sensor which is of a capacitive element type is a representative sensor of the former which is of a displacement detection type. This force sensor has a capacitive element constituted with a pair of electrodes and detects displacement occurring at one of the electrodes by the force exerted on the basis of a capacitance value of the capacitive element. A multi-axis force sensor which is of capacitive element type has been disclosed, for example, in Patent Document 1 (Patent Document 2 which is an English version thereof) and Patent Document 3 (Patent Document 4 which is an English version thereof) given below.

On the other hand, a strain gauge type force sensor is a representative sensor of the latter which is of a mechanical strain detection type. This force sensor detects a mechanical strain resulting from the force exerted as a change in electrical resistance of strain gauges, etc. The strain gauge-type multi-axis force sensor has been disclosed, for example, in Patent Document 5 (Patent Document 6 which is an English version thereof) given below.

However, in any of the multi-axis force sensors disclosed in each of the above-described Patent Documents, a mechanical structure portion thereof is inevitably made thick. Thereby, it is difficult to make thin the sensor in its entirety. On the other hand, in the fields of robots, industrial machines, input devices for electronics, etc., it is desired to develop a thinner-type force sensor. Thus, in Patent Document 7, there has been proposed a force sensor in which an annular member is deformed by exertion of force to detect displacement of each portion resulting from the deformation by using a capacitive element. The force sensor which has been disclosed in Patent Document 7 (which is termed "a force sensor of the prior application" in the present application) is simplified in structure, thereby having a structure suitable for being made thinner.

PRIOR ART DOCUMENTS

Patent Documents

Patent Document 1: Japanese Patent Publication No. 2004-325367A
Patent Document 2: U.S. Pat. No. 7,219,561
Patent Document 3: Japanese Patent Publication No. 2004-354049A
Patent Document 4: U.S. Pat. No. 6,915,709
Patent Document 5: Japanese Patent Publication No. H8-122178A
Patent Document 6: U.S. Pat. No. 5,490,427
Patent Document 7: WO 2013/014803

SUMMARY OF INVENTION

Problems to be Solved by the Invention

However, in the above-described force sensor of the prior application, it is necessary to arrange a capacitive element at various sites in order to detect a variety of deformed states of an annular member, thus, inevitably resulting in complicated constitution of electrodes which constitute the capacitive element. Further, a relative position of a pair of electrodes which constitute the capacitive element is an important factor which seriously affects detection accuracy, thereby demanding a great work load in adjusting positions of individual electrodes. In particular, where a plurality of capacitive elements are arranged so as to be symmetrical and used in detecting a difference, adjustment is needed so that a counter electrode is made parallel to each of the individual capacitive elements and also an interval between the electrodes is equal to each other with regard to the plurality of capacitive elements. Therefore, when the sensor is used in commercial applications, there is posed such a problem that production efficiency is reduced to raise costs.

Thus, an object of the present invention is to provide a force sensor which is simple in structure and also capable of realizing high production efficiency by enhancing the degree of freedom in arranging detection elements.

Means for Solving the Problems (1) The first feature of the present invention resides in a force sensor which detects force or moment with regard to at least one axis, among force in a direction of each coordinate axis and moment around each coordinate axis, in an XYZ three-dimensional orthogonal coordinate system, the force sensor comprising:

a force receiving body which receives exertion of force or moment to be detected;

a detection ring which has an annular structure extending along a predetermined basic annular channel and which is provided with a detection portion which is positioned at a detection point defined on the basic annular channel and also provided with a coupling portion which is positioned on both sides of the detection portion;

a supporting body which supports the detection ring;

a connection member which connects the force receiving body to a position of a predetermined exertion point on the detection ring;

a fixing member which fixes a position of a predetermined fixing point of the detection ring to the supporting body;

a detection element which detects elastic deformation occurring at the detection portion; and a detection circuit which outputs an electric signal on the basis of detection result of the detection element in a state that a load is applied to one of the force receiving body and the supporting body, the electric signal indicating force or moment exerted on the other; wherein the exertion point and the fixing point are arranged at positions of the coupling portion which are different from each other, and the detection portion is structured so as to develop elastic deformation at least partially, when force is exerted between the exertion point and the fixing point, on the basis of exertion of the force.

(2) The second feature of the present invention resides in a force sensor according to the first feature, wherein the detection element is constituted with a capacitive element which has a displacement electrode fixed at a predetermined position of the detection portion and a fixed electrode fixed at a position of the supporting body or the force receiving body facing the displacement electrode, the displacement electrode is arranged at a position at which displacement is caused to the fixed electrode on the basis of elastic deformation occurring at the detection portion, and the detection circuit outputs an electric signal which indicates force or moment exerted, on the basis of variation in a capacitance value of the capacitive element.

(3) The third feature of the present invention resides in a force sensor according to the second feature, wherein when an XY plane is taken on a horizontal face and a Z-axis is given as an axis moving perpendicularly upward, the detection ring is provided with an annular structure extending along a basic annular channel positioned on the XY plane, with the Z-axis given as a central axis, the supporting body is constituted with a supporting substrate arranged below the detection ring, with a predetermined interval kept, and the displacement electrode is fixed on a lower face of the detection portion, and the fixed electrode is fixed on an upper face of the supporting substrate.

(4) The fourth feature of the present invention resides in a force sensor according to the third feature, wherein the detection portion is provided with a first deformation portion which undergoes elastic deformation by exertion of force or moment to be detected, a second deformation portion which undergoes elastic deformation by exertion of force or moment to be detected, and a displacement portion which undergoes displacement by elastic deformation of the first deformation portion and the second deformation portion, an external end of the first deformation portion is connected to a coupling portion adjacent thereto, an internal end of the first deformation portion is connected to the displacement portion, an external end of the second deformation portion is connected to a coupling portion adjacent thereto, and an internal end of the second deformation portion is connected to the displacement portion, and the displacement electrode is fixed at a position of the displacement portion facing the supporting substrate.

(5) The fifth feature of the present invention resides in a force sensor according to the fourth feature, wherein n number (n≥2) of plural detection points are defined on the basic annular channel, detection portions are positioned at the respective detection points, the detection ring is constituted by arranging alternately n number of detection portions and n number of coupling portions along the basic annular channel.

(6) The sixth feature of the present invention resides in a force sensor according to the fifth feature, wherein n even number (n≥2) of the detection points are defined on the basic annular channel, the detection portions are positioned on the respective detection points, and the detection ring is constituted by alternately arranging n number of the detection portions and n number of the coupling portions along the basic annular channel.

(7) The seventh feature of the present invention resides in a force sensor according to the sixth feature, wherein when n even number of the coupling portions are numbered sequentially along the basic annular channel, the exertion points are arranged at odd-numbered coupling portions, and the fixing points are arranged at even-numbered coupling portions.

(8) The eighth feature of the present invention resides in a force sensor according to the seventh feature, wherein n is set to be equal to 2, by which the coupling portions and the detection portions are arranged in an order of a first coupling portion, a first detection portion, a second coupling portion and a second detection portion along the basic annular channel to constitute the detection ring, the exertion point is arranged at the first coupling portion, and the fixing point is arranged at the second coupling portion.

(9) The ninth feature of the present invention resides in a force sensor according to the seventh feature, wherein n is set to be equal to 4, by which the coupling portions and the detection portions are arranged in an order of a first coupling portion, a first detection portion, a second coupling portion, a second detection portion, a third coupling portion, a third detection portion, a fourth coupling portion and a fourth detection portion along the basic annular channel to constitute the detection ring, a first exertion point is arranged at the first coupling portion, a first fixing point is arranged at the second coupling portion, a second exertion point is arranged at the third coupling portion, and a second fixing point is arranged at the fourth coupling portion, connection members are provided with a first connection member for connecting a position of the first exertion point of the detection ring to the force receiving body and a second connection member for connecting a position of the second exertion point of the detection ring to the force receiving body, and fixing members are provided with a first fixing member for fixing a position of the first fixing point of the detection ring to the supporting substrate and a second fixing member for fixing a position of the second fixing point of the detection ring to the supporting substrate.

(10) The tenth feature of the present invention resides in a force sensor according to the ninth feature, wherein the first exertion point is arranged on a positive X-axis, the second exertion point is arranged on a negative X-axis, the first fixing point is arranged on a positive Y-axis, and the second fixing point is arranged on a negative Y-axis.

(11) The eleventh feature of the present invention resides in a force sensor according to the tenth feature, wherein where a V-axis is defined as a coordinate axis in which the X-axis is rotated counter-clockwise by 45 degrees around an origin O on the XY plane and W-axis is defined as a coordinate axis in which the Y-axis is rotated counter-clockwise by 45 degrees around the origin O on the XY plane, a first detection point, a second detection point, a third detection point and a fourth detection point are arranged respectively on a positive V-axis, a positive W-axis, a negative V-axis and a negative W-axis.

(12) The twelfth feature of the present invention resides in a force sensor according to the eleventh feature, wherein there is formed at each of the detection portions, a capacitive element in which a capacitance value is reversed in terms of an increase and decrease depending on when a compression stress is exerted or when an extension stress is exerted along the basic annular channel, when a capacitance value of a first capacitive element having a displacement electrode fixed at the first detection portion positioned at the first detection point is termed C1, a capacitance value of the second capacitive element having a displacement electrode fixed at the second detection portion positioned at the second detection point is termed C2, a capacitance value of the third capacitive element having a displacement electrode fixed at the third detection portion positioned at the third detection point is termed C3, and a capacitance value of the fourth capacitive element having a displacement electrode fixed at the fourth detection portion positioned at the fourth detection point is termed C4, the detection circuit performs operation on the basis of the following arithmetic expressions $$Fz=-(C1+C2+C3+C4)$$

$$Mx=-C1-C2+C3+C4$$

$$My=+C1-C2-C3+C4$$

$$Mz=+C1-C2+C3-C4,$$

thereby outputting electric signals which indicate force Fz exerted in a direction of the Z-axis, moment Mx exerted around the X-axis, moment My exerted around the Y-axis and moment Mz exerted around the Z-axis.

(13) The thirteenth feature of the present invention resides in a force sensor according to the seventh feature, wherein n is set to be equal to 8, by which the coupling portions and the detection portions are arranged in an order of a first coupling portion, a first detection portion, a second coupling portion, a second detection portion, a third coupling portion, a third detection portion, a fourth coupling portion, a fourth detection portion, a fifth coupling portion, a fifth detection portion, a sixth coupling portion, a sixth detection portion, a seventh coupling portion, a seventh detection portion, an eighth coupling portion and an eighth detection portion along the basic annular channel to constitute the detection ring, a first exertion point is arranged at the first coupling portion, a first fixing point is arranged at the second coupling portion, a second exertion point is arranged at the third coupling portion, a second fixing point is arranged at the fourth coupling portion, a third exertion point is arranged at the fifth coupling portion, a third fixing point is arranged at the sixth coupling portion, a fourth exertion point is arranged at the seventh coupling portion, and a fourth fixing point is arranged at the eighth coupling portion, connection members are provided with a first connection member for connecting a position of the first exertion point of the detection ring to the force receiving body, a second connection member for connecting a position of the second exertion point of the detection ring to the force receiving body, a third connection member for connecting a position of the third exertion point of the detection ring to the force receiving body, and a fourth connection member for connecting a position of the fourth exertion point of the detection ring to the force receiving body, and fixing members are provided with a first fixing member for fixing a position of the first fixing point of the detection ring to the supporting substrate, a second fixing member for fixing a position of the second fixing point of the detection ring to the supporting substrate, a third fixing member for fixing a position of the third fixing point of the detection ring to the supporting substrate and a fourth fixing member for fixing a position of the fourth fixing point of the detection ring to the supporting substrate.

(14) The fourteenth feature of the present invention resides in a force sensor according to the thirteenth feature, wherein where a V-axis is defined as a coordinate axis in which the X-axis is rotated counter-clockwise by 45 degrees around an origin O on the XY plane and W-axis is defined as a coordinate axis in which the Y-axis is rotated counter-clockwise by 45 degrees around the origin O on the XY plane, the first exertion point, the second exertion point, the third exertion point and the fourth exertion point are arranged respectively on a positive X-axis, a positive Y-axis, a negative X-axis, a negative Y-axis, while the first fixing point, the second fixing point, the third fixing point and the fourth fixing point are respectively arranged on a positive V-axis, a positive W-axis, a negative V-axis and a negative W-axis.

(15) The fifteenth feature of the present invention resides in a force sensor according to the fourteenth feature, wherein when a direction vector Vec ($\theta$) is defined so as to give an angle $\theta$ in a counterclockwise rotation in a positive direction of the X-axis, with the origin O given as a starting point, on the XY plane, an i-th (where, $1 \leq i \leq 8$) detection point is arranged at a position where a direction vector Vec ($\pi/8 + (i-1)\cdot\pi/4$) intersects with the basic annular channel.

(16) The sixteenth feature of the present invention resides in a force sensor according to the fifteenth feature, wherein there is formed at each detection portion a capacitive element which is reversed in terms of an increase and decrease of a capacitance value, depending on when a compression stress is exerted or when an extension stress is exerted along the basic annular channel, when a capacitance value of an i-th capacitive element having a displacement electrode fixed to an i-th detection portion positioned at an i-th detection point is termed C1$i$, the detection circuit, performs operation with regard to force Fx exerted in a direction of the X-axis on the basis of the following arithmetic expression:

$$Fx=-C11+C12-C13+C14+C15-C16+C17-C18, \text{ or}$$

$$Fx=-C11+C12+C17-C18, \text{ or}$$

$$Fx=+C12-C13-C16+C17,$$

with regard to force Fy exerted in a direction of the Y-axis on the basis of the following arithmetic expression:

$$Fy=+C11-C12-C13+C14-C15+C16+C17-C18, \text{ or}$$

$$Fy=+C11-C12-C13+C14, \text{ or}$$

$$Fy=-C15+C16+C17-C18,$$

with regard to force Fz exerted in a direction of the Z-axis on the basis of the following arithmetic expression:

$$Fz=-(C11+C12+C13+C14+C15+C16+C17+C18), \text{ or}$$

$$Fz=-(C11+C14+C15+C18), \text{ or}$$

$$Fz=-(C12+C13+C16+C17),$$

with regard to moment Mx exerted around the X-axis on the basis of the following arithmetic expression:

$$Mx=-C11-C12-C13-C14+C15+C16+C17+C18, \text{ or}$$

$$Mx=-C11-C12+C17+C18, \text{ or}$$

$$Mx=-C13-C14+C15+C16,$$

with regard to moment My exerted around the Y-axis on the basis of the following arithmetic expression:

$$My=+C11+C12-C13-C14-C15-C16+C17+C18, \text{ or}$$

$$My=+C11+C12-C13-C14, \text{ or}$$

$$My=-C15-C16+C17+C18,$$

with regard to moment Mz exerted around the Z-axis on the basis of the following arithmetic expression:

$$Mz=+C11-C12+C13-C14+C15-C16+C17-C18, \text{ or}$$

$$Mz=+C11-C12+C15-C16, \text{ or}$$

$$Mz=+C13-C14+C17-C18, \text{ or}$$

$$Mz=+C11-C14+C15-C18,$$

thereby outputting electric signals indicating force Fx, force Fy, force Fz, moment Mx, moment My and moment Mz.

(17) The seventeenth feature of the present invention resides in a force sensor according to the sixth feature, wherein When n even number of coupling portions are numbered sequentially along the basic annular channel, any of the exertion points and the fixing points are arranged at odd-numbered coupling portions and also the exertion points and the fixing points are arranged alternately along the basic annular channel.

(18) The eighteenth feature of the present invention resides in a force sensor according to the seventeenth feature, wherein n is set to be equal to 8, by which the coupling portions and the detection portions are arranged in an order of a first coupling portion, a first detection portion, a second coupling portion, a second detection portion, a third coupling portion, a third detection portion, a fourth coupling portion, a fourth detection portion, a fifth coupling portion, a fifth detection portion, a sixth coupling portion, a sixth detection portion, a seventh coupling portion, a seventh detection portion, an eighth coupling portion and an eighth detection portion along the basic annular channel to constitute the detection ring, a first fixing point is arranged at the first coupling portion, a first exertion point is arranged at the third coupling portion, a second fixing point is arranged at the fifth coupling portion, and a second exertion point is arranged at the seventh coupling portion, connection members are provided with a first connection member for connecting a position of the first exertion point of the detection ring to the force receiving body and a second connection member for connecting a position of the second exertion point of the detection ring to the force receiving body, and fixing members are provided with a first fixing member for fixing a position of the first fixing point of the detection ring to the supporting substrate and a second fixing member for fixing a position of the second fixing point of the detection ring to the supporting substrate.

(19) The nineteenth feature of the present invention resides in a force sensor according to the eighteenth feature, wherein the first fixing point is arranged on a positive X-axis, the second fixing point is arranged on a negative X-axis, the first exertion point is arranged on a positive Y-axis, and the second exertion point is arranged on a negative Y-axis.

(20) The twentieth feature of the present invention resides in a force sensor according to the nineteenth feature, wherein the detection ring is a square annular structure body arranged on the XY plane around the origin O and provided with a first side extending in a direction parallel to the Y-axis and intersecting with the positive X-axis, a second side extending in a direction parallel to the X-axis and intersecting with the positive Y-axis, a third side extending in a direction parallel to the Y-axis and intersecting with the negative X-axis, and a fourth side extending in a direction parallel to the X-axis and intersecting with the negative Y-axis, the first detection point is arranged at a position having a positive Y coordinate of the first side, the second detection point is arranged at a position having a positive X coordinate of the second side, the third detection point is arranged at a position having a negative X coordinate of the second side, the fourth detection point is arranged at a position having a positive Y coordinate of the third side, the fifth detection point is arranged at a position having a negative Y coordinate of the third side, the sixth detection point is arranged at a position having a negative X coordinate of the fourth side, the seventh detection point is arranged at a position having a positive X coordinate of the fourth side, and the eighth detection point is arranged at a position having a negative Y coordinate of the first side.

(21) The twenty-first feature of the present invention resides in a force sensor according to the twentieth feature, wherein there is formed at each of the detection portions a capacitive element in which a capacitance value is reversed in terms of an increase and decrease depending on when a compression stress is exerted or when an extension stress is exerted along the basic annular channel, when a capacitance value of an i-th capacitive element having a displacement electrode fixed at an i-th detection portion positioned at an i-th detection point is termed $C1i$, the detection circuit performs operation with regard to force Fx exerted in a direction of the X-axis, on the basis of the following arithmetic expression:

$$Fx=+C12-C13-C16+C17,$$

with regard to force Fy exerted in a direction of the Y-axis on the basis of the following arithmetic expression:

$$Fy=-C11-C14+C15+C18,$$

with regard to force Fz exerted in a direction of the Z-axis on the basis of the following arithmetic expression:

$$Fz=-(C11+C12+C13+C14+C15+C16+C17+C18), \text{ or}$$

$$Fz=-(C11+C13+C15+C17), \text{ or}$$

$$Fz=-(C12+C14+C16+C18),$$

with regard to moment Mx exerted around the X-axis on the basis of the following arithmetic expression:

$$Mx=-C11-C12-C13-C14+C15+C16+C17+C18, \text{ or}$$

$$Mx=-C12-C13+C16+C17,$$

with regard to moment My exerted around the Y-axis on the basis of the following arithmetic expression:

$$My=+C11+C12-C13-C14-C15-C16+C17+C18, \text{ or}$$

$$My=+C11-C14-C15+C18,$$

with regard to moment Mz exerted around the Z-axis on the basis of the following arithmetic expression:

$$Mz=-C11-C12+C13+C14-C15-C16+C17+C18, \text{ or}$$

$$Mz=-C11+C13-C15+C17, \text{ or}$$

$$Mz=-C12+C14-C16+C18,$$

thereby outputting electric signals indicating force Fz, force Fy, force Fz, moment Mx, moment My and moment Mz.

(22) The twenty-second feature of the present invention resides in a force sensor according to the nineteenth feature, wherein the detection ring is a circle annular structure body arranged on the XY plane around the origin O, and when a direction vector Vec (θ) is defined so as to give an angle θ in a counter-clockwise rotation in a positive direction of the X-axis, with the origin O given as a starting point, on the XY plane, an i-th (where, 1≤i≤8) detection point is arranged at a point where a direction vector Vec (π/8+(i−1)·π/4) intersects with the basic annular channel.

(23) The twenty-third feature of the present invention resides in a force sensor according to the fifth to twenty-second features, wherein with regard to force or moment on a specific axis to be detected, among n number of the plural detection portions, some of them behave as a first-attribute detection portion and the other of them behave as a second-attribute detection portion, first-attribute displacement portions which constitute the first-attribute detection portion undergo displacement in a direction moving close to the supporting substrate when a positive component is exerted on the specific axis, and they undergo displacement in a direction moving away from the supporting substrate when a negative component is exerted on the specific axis, second-attribute displacement portions which constitute the second-attribute detection portion undergo displacement in a direction moving away from the supporting substrate when a positive component is exerted on the specific axis, and they undergo displacement in a direction moving close to the supporting substrate when a negative component is exerted on the specific axis, first-attribute capacitive elements are constituted with first-attribute displacement electrodes fixed to the first-attribute displacement portions and first-attribute fixed electrodes fixed at positions of the supporting substrate facing the first-attribute displacement electrodes, second-attribute capacitive elements are constituted with second-attribute displacement electrodes fixed to the second-attribute displacement portions and second-attribute fixed electrodes fixed at positions of the supporting substrate facing the second-attribute displacement electrodes, and the detection circuit outputs an electric signal corresponding to a difference between a capacitance value of a first-attribute capacitive element and a capacitance value of a second-attribute capacitive element as an electric signal which indicates a component of the specific axis of force or moment to be detected.

(24) The twenty-fourth feature of the present invention resides in a force sensor according to the fourth to twenty-third features, wherein the detection ring is a member which is obtained by imparting partial material-removing processing to an annular member in which a through opening portion is formed at a central portion of a plate-shaped member arranged, with the Z-axis given as a central axis, and the detection portion is constituted with a part to which the material-removing processing is imparted.

(25) The twenty-fifth feature of the present invention resides in a force sensor according to the fourth to twenty-fourth features, wherein the detection portion has a first deformation portion, a second deformation portion and a displacement portion and are each arranged between an end of a coupling portion and another end of a coupling portion, the first deformation portion is constituted with a first plate-shaped piece which is flexible and the second deformation portion is constituted with a second plate-shaped piece which is flexible, and the displacement portion is constituted with a third plate-shaped piece, and an external end of the first plate-shaped piece is connected to an end of a coupling portion, an internal end of the first plate-shaped piece is connected to one end of the third plate-shaped piece, an external end of the second plate-shaped piece is connected to an end of another coupling portion, and an internal end of the second plate-shaped piece is connected to the other end of the third plate-shaped piece.

(26) The twenty-sixth feature of the present invention resides in a force sensor according to the twenty-fifth feature, wherein in a state that no force or moment is exerted, a counter surface of the third plate-shaped piece is kept parallel to a counter surface of the supporting substrate.

(27) The twenty-seventh feature of the present invention resides in a force sensor according to the twenty-sixth feature, wherein when a normal line orthogonal to the XY plane is drawn at a position of a detection point, the first plate-shaped piece and the second plate-shaped piece which constitute the detection portion positioned at the detection point are inclined to the normal line and also the first plate-shaped piece is reversed in inclination angle to the second plate-shaped piece.

(28) The twenty-eighth feature of the present invention resides in a force sensor according to the third to twenty-seventh features, wherein when a connection reference line is defined which is parallel to the Z-axis and pass through the exertion point or a movement point in which the exertion point is moved along a line connecting an origin O of a coordinate system with the exertion point, there is also installed an auxiliary connection member which connects a lower face of the detection ring or that of the force receiving body with an upper face of the supporting substrate along the connection reference line or a vicinity thereof.

(29) The twenty-ninth feature of the present invention resides in a force sensor according to the twenty-eighth feature, wherein there is used, as the auxiliary connection member, a member which is more likely to undergo elastic deformation when force is exerted in a direction orthogonal to the connection reference line than when force is exerted in a direction along the connection reference line.

(30) The thirtieth feature of the present invention resides in a force sensor according to the twenty-eighth or twenty-ninth feature, wherein a connection part to the auxiliary connection member of the detection ring or of the force receiving body, a connection part to the auxiliary connection member of the supporting substrate, or both of them are constituted with a diaphragm portion, and the auxiliary connection member is inclined to the connection reference line by deformation of the diaphragm portion based on exertion of force or moment.

(31) The thirty-first feature of the present invention resides in a force sensor according to the second to thirtieth features, wherein one of the fixed electrode and the displacement electrode is set to be greater in area than the other so that a pair of electrodes which constitute the capacitive element are not changed in effective facing area even when force or moment is exerted to result in parallel movement of the displacement electrode to the fixed electrode.

(32) The thirty-second feature of the present invention resides in a force sensor according to the second to thirty-first features, wherein the detection ring, the supporting body and the force receiving body are constituted with a conductive material, the displacement electrode is formed on a surface of the detection ring via an insulation layer, and the fixed electrode is formed on a surface of the supporting body or that of the force receiving body via an insulation layer.

(33) The thirty-third feature of the present invention resides in a force sensor according to the second to thirty-second features, wherein the detection ring, the supporting body and the force receiving body are constituted with a conductive material, the displacement electrode is constituted with a certain domain on a surface of the detection ring, or the fixed electrode is constituted with a certain domain on a surface of the supporting body or a surface of the force receiving body.

(34) The thirty-fourth feature of the present invention resides in a force sensor according to the first feature, wherein the detection element is constituted with a strain gauge fixed at a position at which the detection portion undergoes elastic deformation, and the detection circuit outputs, on the basis of variation in electrical resistance of the strain gauge, an electric signal which indicates force or moment exerted.

(35) The thirty-fifth feature of the present invention resides in a force sensor according to the thirty-fourth feature, wherein the detection portion is provided with a plate-shaped deformation portion which undergoes elastic deformation by exertion of force or moment to be detected, and the plate-shaped deformation portion is arranged so that a plate face thereof is inclined to the basic annular channel.

(36) The thirty-sixth feature of the present invention resides in a force sensor according to the thirty-fifth feature, wherein the detection element is constituted with strain gauges which are each arranged on both faces of the plate-shaped deformation portion in a vicinity of a connection end to the coupling portion.

(37) The thirty-seventh feature of the present invention resides in a force sensor according to the thirty-sixth feature, wherein the detection element is provided with a first strain gauge and a second strain gauge which are respectively arranged on a front face and a rear face in a vicinity of a first connection end to a coupling portion and a third strain gauge and a fourth strain gauge which are respectively arranged on a front face and a rear face in a vicinity of a second connection end to a coupling portion, and the detection circuit detects a bridge voltage of a bridge circuit in which the first strain gauge and the fourth strain gauge are given as a first opposite side, while the second strain gauge and the third strain gauge are given as a second opposite side.

(38) The thirty-eighth feature of the present invention resides in a force sensor according to the first to nineteenth features and thirty-fourth to thirty-seventh features, wherein the detection ring is an annular structure body in which a circle arranged on an XY plane, with a Z-axis being a central axis, is given as the basic annular channel, the supporting body is a circular plate-shaped structure body or an annular structure body which is arranged at a negative domain of the Z-axis, with the Z-axis being the central axis, and the force receiving body is a circular plate-shaped structure body or an annular structure body which is arranged at a positive domain of the Z-axis, with the Z-axis being the central axis, or a circular plate-shaped structure body or an annular structure body which is arranged on the XY plane, with the Z-axis being the central axis.

(39) The thirty-ninth feature of the present invention resides in a force sensor according to the first to nineteenth features and thirty-fourth to thirty-seventh features, wherein the detection ring is an annular structure body in which a square arranged on an XY plane, with a Z-axis being the central axis, is given as the basic annular channel, the supporting body is a square plate-shaped structure body or an annular structure body which is arranged at a negative domain of the Z-axis, with the Z-axis being the central axis, and the force receiving body is a square plate-shaped structure body or an annular structure body which is arranged at a positive domain of the Z-axis, with the Z-axis being the central axis, or a square plate-shaped structure body or an annular structure body which is arranged on the XY plane, with the Z-axis being the central axis.

(40) The fortieth feature of the present invention resides in a force sensor according to the first to thirty-ninth features, wherein the force receiving body is an annular structure body which is capable of housing inside the detection ring and the force receiving body is arranged outside the detection ring.

(41) The forty-first feature of the present invention resides in a force sensor according to the first to thirty-ninth features, wherein the detection ring is an annular structure body which is capable of housing inside the force receiving body and the force receiving body is arranged inside the detection ring.

(42) The forty-second feature of the present invention resides in a force sensor according to the first to thirty-ninth features, wherein where an XY plane is taken on a horizontal face and a Z-axis is given as an axis moving perpendicularly upward, the detection ring is arranged on the XY plane and the supporting body is arranged below the detection ring, with a predetermined interval kept, and the force receiving body is arranged above the detection ring, with a predetermined interval kept.

Effects of the Invention

In the force sensor according to the present invention, force or moment which has been exerted is detected on the basis of a deformed state of a detection ring having an annular structure. The detection ring is provided with a detection portion at which elastic deformation occurs and a coupling portion positioned on both sides of the detection portion, and upon exertion of force or moment to be detected, elastic deformation will occur at the detection portion in a concentrated manner. Here, a mode of elastic deformation occurring at the detection portion can be set freely by modifying a shape and a structure of the detection portion in an inventive manner. Therefore, it is possible to provide a force sensor which is simple in structure and capable of enhancing the degree of freedom in arranging a detection element to realize high production efficiency.

Where displacement is electrically detected on the basis of elastic deformation of the detection portion, it is possible to adopt a capacitive element as a detection element. In this case, the detection portion is modified in shape and structure in an inventive manner, thus making it possible to freely set an arrangement of the capacitive element. Specifically, a face of forming a displacement electrode on the side of the detection ring can be set freely in terms of a position and a direction thereof, by which a force sensor can be designed effectively to enhance production efficiency. Further, such a design can be made so that the detection portion undergoes displacement partially in a specific direction when force in the direction of a specific coordinate axis or moment around a specific coordinate axis is exerted. Therefore, it is possible to design a force sensor which detects efficiently any given directional component of force or moment to be detected.

Further, where stress and strain are electrically detected on the basis of elastic deformation of a detection portion, it is possible to adopt a strain gauge as a detection element. In this case as well, the detection portion is modified in shape and structure in an inventive manner, thus making it possible to freely set an arrangement of the strain gauge. Therefore, the design can be made effective in enhancing production efficiency. Accordingly, where the strain gauge is adopted as a detection element, it is possible to design a force sensor which is capable of effectively detecting any given directional component of force or moment to be detected.

BRIEF DESCRIPTION OF THE DRAWINGS

FIG. 20 is a table which shows a variation amount (extent of increase and decrease) of capacitance values of individual capacitive elements when force in the direction of each axis or moment around each axis is exerted on the force receiving body 100 in the First Embodiment shown in FIG. 16.

FIG. 21 is a table which is obtained by replacing approximately fields of (−) and (+) in the table shown in FIG. 20 by zero.

FIG. 22 is a drawing which shows arithmetic expressions for calculating four axis components of force Fz and moments Mx, My, Mz exerted on the force receiving body 100 in the First Embodiment shown in FIG. 16 on the basis of the table shown in FIG. 21.

FIG. 23 is a circuit diagram which shows one example of a detection circuit which outputs electric signals indicating four axis components of force Fz and moments Mx, My, Mz on the basis of the arithmetic expressions shown in FIG. 22.

FIG. 28 is a table which shows a variation amount (extent of increase and decrease) of capacitance values of individual capacitive elements when force in the direction of each axis or moment around each axis is exerted on the force receiving body 100 in the Second Embodiment shown in FIG. 27.

FIG. 29 is a drawing which shows arithmetic expressions for calculating six-axis components of forces Fx, Fy, Fz and moments Mx, My, Mz exerted on the force receiving body 100 in the Second Embodiment shown in FIG. 27 on the basis of the table shown in FIG. 28.

FIG. 30 is a drawing which shows variations of the arithmetic expressions shown in FIG. 29.

FIG. 34 is a table which shows a variation amount (extent of increase and decrease) of capacitance values of individual capacitive elements when force in the direction of each axis or moment around each axis is exerted on a force receiving body 100 of an embodiment in combination with the Second Embodiment shown in FIG. 24 with Third Embodiment shown in FIG. 31.

FIG. 38 is a table which shows a variation amount (extent of increase and decrease) of capacitance values of individual capacitive elements when force in the direction of each axis or moment around each axis is exerted on a force receiving body in the Fourth Embodiment shown in FIG. 35.

FIG. 39 is a drawing which shows arithmetic expressions for calculating six-axis components of forces Fx, Fy, Fz and moments Mx, My, Mz exerted on the force receiving body in the Fourth Embodiment shown in FIG. 35 on the basis of the table shown in FIG. 38.

FIG. 40 is a drawing which shows variations of the arithmetic expressions shown in FIG. 39.

BEST MODE FOR CARRYING OUT THE INVENTION

Hereinafter, a description will be given on the basis of embodiments which illustrate the present invention. The present invention is an invention which improves the force sensor of the prior application that has been disclosed in Patent Document 7 described above (WO 2013/014803). Thus, for the sake of convenience of description, in the following Chapters 1 and 2, a description will be first given of the force sensor of the prior application, and characteristics of the present invention will be described in Chapter 3 and subsequent chapters.

Figure 1:
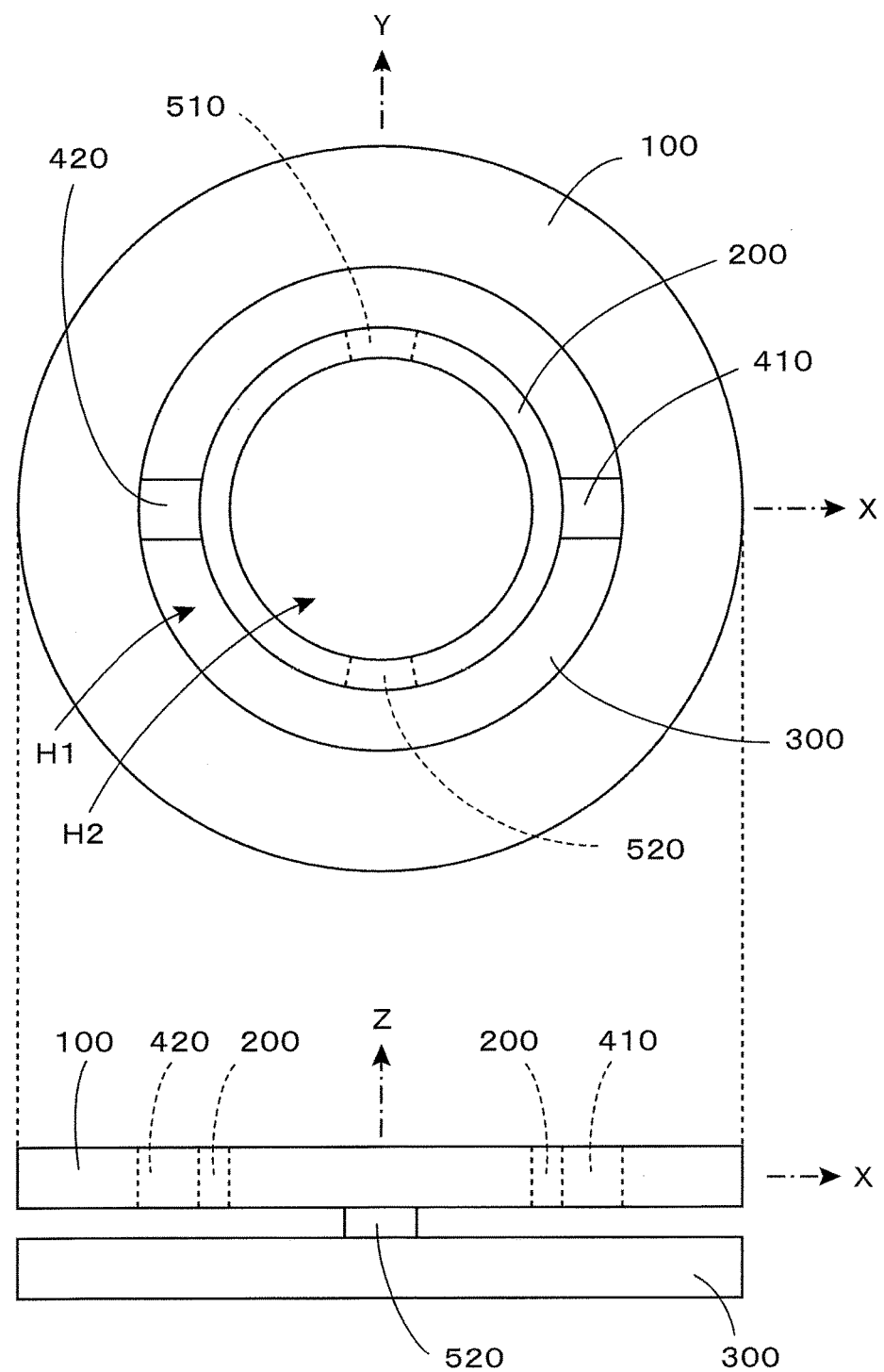
FIG. 1 is a top view (view shown in the upper part of the figure) of a basic structure portion of a force sensor of the prior application and a side view thereof (view shown in the lower part of the figure).

Chapter 1. Characteristics of Basic Structure Portion of Force Sensor of Prior Application FIG. 1 is a top view (view shown in the upper part of the figure) of a basic structure portion of a force sensor of the prior application and a side view thereof (view shown in the lower part of the figure). In the top view, the X-axis is arranged in the rightward direction of the drawing, the Y-axis is arranged in the upward direction of the drawing, and the forward direction which is perpendicular to the sheet surface is given as the direction of the Z-axis. On the other hand, in the side view, the X-axis is arranged in the rightward direction of the drawing, the Z-axis is arranged in the upward direction of the drawing, and a depth direction which is perpendicular to the sheet surface is given as the direction of the Y-axis. As shown in the drawing, the basic structure portion is constituted with a force receiving body 100, a detection ring 200, a supporting substrate 300, connection members 410, 420 and fixing members 510, 520.

The force receiving body 100 is a circular flat plate-shaped (washer-shaped) ring arranged on the XY plane so that the Z-axis is given as a central axis, and outer and inner circumferential faces thereof assume a cylindrical face. A role of the force receiving body 100 is to receive exertion of force or moment to be detected and to transmit it to the detection ring 200.

On the other hand, as with the force receiving body 100, the detection ring 200 is a circular flat-plate shaped (washer-shaped) ring which is arranged on the XY plane so that the Z-axis is given as the central axis, and outer and inner circumferential faces thereof assume a cylindrical face. In the case of an illustrated example here, the detection ring 200 is arranged inside the force receiving body 100. That is, the force receiving body 100 is an external ring which is arranged on the XY plane, and the detection ring 200 is an internal ring which is arranged on the XY plane. Here, the detection ring 200 is characterized in causing elastic deformation resulting from exertion of force or moment to be detected.

The connection members 410, 420 are members for connecting the force receiving body 100 with the detection ring 200. In the case of the example shown in the drawing, the connection member 410 connects an inner circumferential face of the force receiving body 100 with an outer circumferential face of the detection ring 200 at a position along a positive domain of the X-axis, and the connection member 420 connects an inner circumferential face of the force receiving body 100 with an outer circumferential face of the detection ring 200 at a position along a negative domain of the X-axis. Therefore, as shown in the drawing, a clearance portion H1 is secured between the force receiving body 100 and the detection ring 200, and as shown in the drawing, a clearance portion H2 is secured inside the detection ring 200.

As apparent from the side view shown at the lower part of FIG. 1, in the case of the example shown in the drawing, the force receiving body 100 is equal in thickness to the detection ring 200 (dimension in the direction of the Z-axis), and in the side view, the detection ring 200 is kept hidden completely inside the force receiving body 100. Although both of the rings are not necessarily made equal in thickness, it is preferable to make both of the rings equal in thickness in realizing a thin-type sensor (sensor in which a dimension in the direction of the Z-axis is as small as possible).

The supporting substrate 300 is a circular-disk shaped substrate, the diameter of which is equal to an outer diameter of the force receiving body 100, provided with an upper face parallel to the XY plane and arranged below the force receiving body 100 and the detection ring 200, with a predetermined interval kept. The fixing members 510, 520 are members for fixing the detection ring 200 to the supporting substrate 300. In the side view, the fixing member 510 is hidden behind the fixing member 520 and does not appear. However, roles of the fixing members 510, 520 are to connect a lower face of the detection ring 200 with an upper face of the supporting substrate 300. As indicated by the broken lines in the top view, the fixing members 510, 520 are arranged at a position along the Y-axis.

Figure 2:
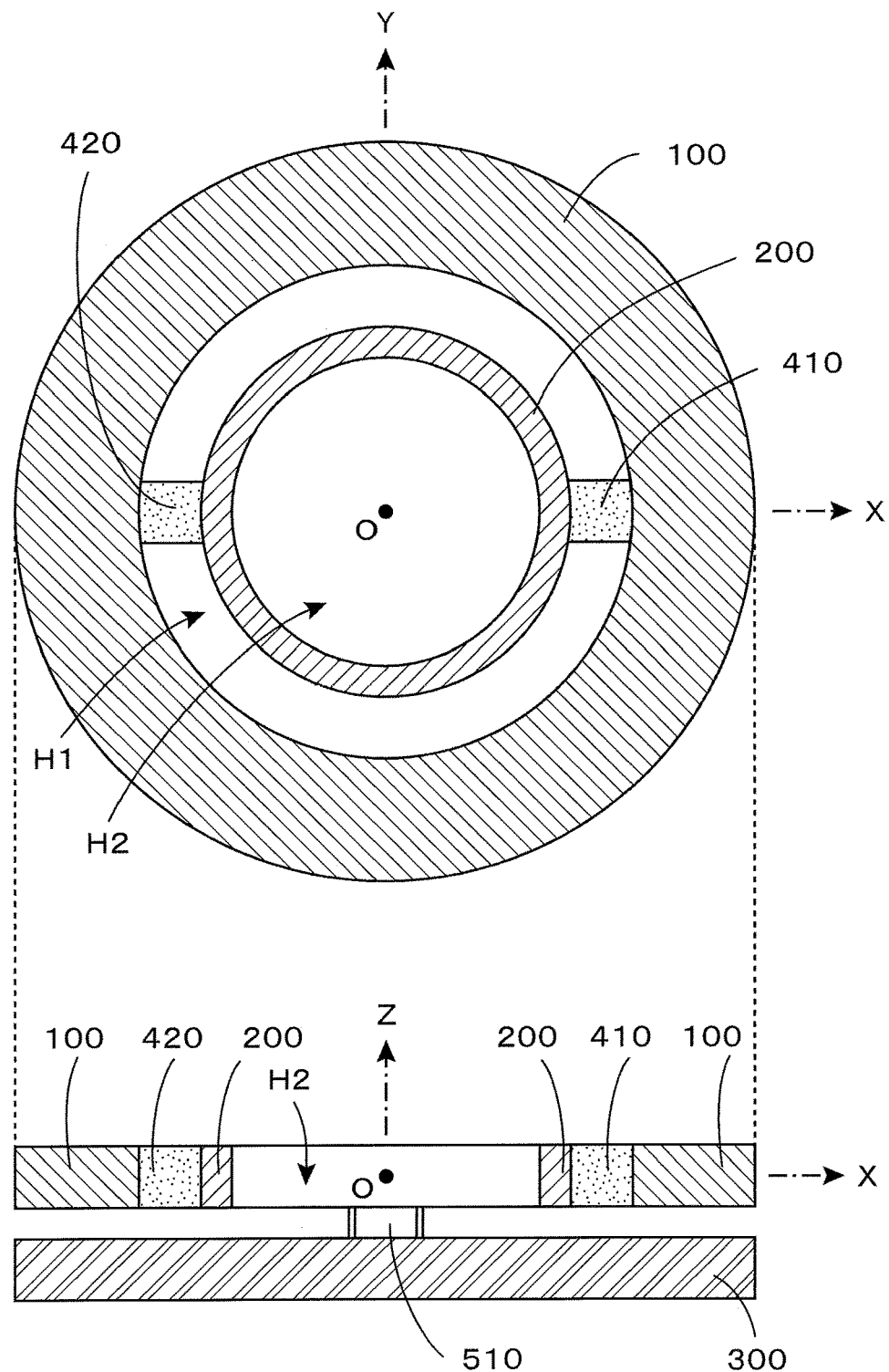
FIG. 2 is a transverse sectional view (view shown in the upper part of the figure) in which the basic structure portion shown in FIG. 1 is cut along an XY plane and a longitudinal sectional view thereof (view shown in the lower part of the figure) in which it is cut along an XZ plane.

FIG. 2 is a transverse sectional view (view shown in the upper part of the figure) in which the basic structure portion shown in FIG. 1 is cut along the XY plane and a longitudinal sectional view (view shown in the lower part of the figure) thereof in which it is cut along the XZ plane. There is shown an origin O of an XYZ three-dimensional orthogonal coordinate system at the center of the transverse sectional view in which it is cut along the XY plane. FIG. 2 clearly shows a state that the detection ring 200 is connected with the force receiving body 100 at two sites on both sides via the connection members 410, 420 arranged along the X-axis.

Figure 3:
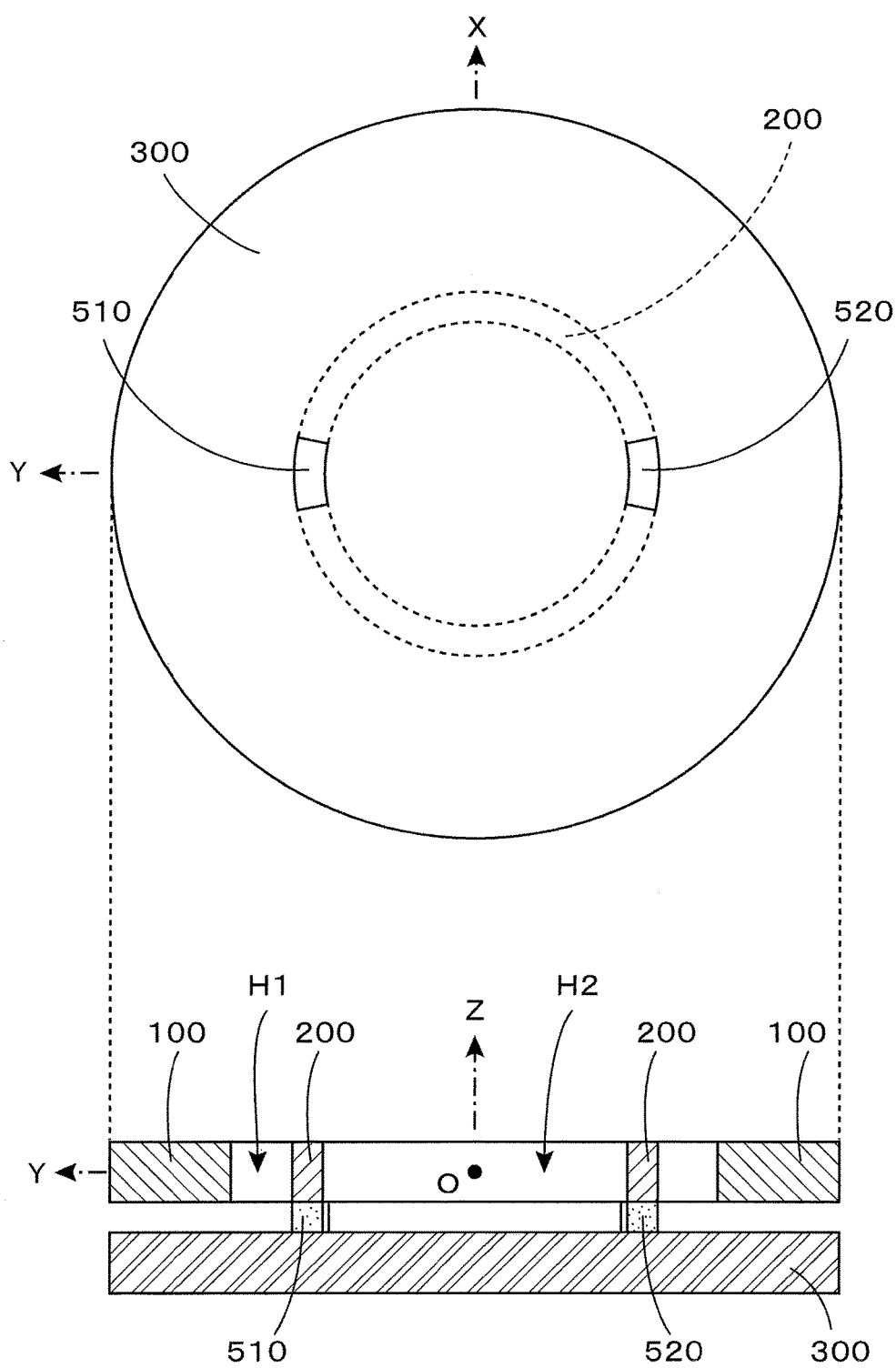
FIG. 3 is a top view (view shown in the upper part of the figure) of a supporting substrate 300 and fixing members 510, 520 of the basic structure portion shown in FIG. 1 and a longitudinal sectional view (view shown in the lower part of the figure) in which the basic structure portion is cut along a YZ plane.

FIG. 3 is a top view (view shown in the upper part of the figure) of the supporting substrate 300 and the fixing members 510, 520 in the basic structure portion shown in FIG. 1 and a longitudinal sectional view (view shown in the lower part of the figure) in which the basic structure portion is cut along the YZ plane. The top view of FIG. 3 is equivalent to a state in which the top view of FIG. 1 is rotated counter-clockwise at 90 degrees, with the Y-axis taken in the leftward direction. Further, in the top view of FIG. 3, a position of the detection ring 200 is indicated by the broken lines. On the other hand, in the longitudinal sectional view of FIG. 3, there is clearly shown a state that the detection ring 200 is fixed above the supporting substrate 300 by the fixing members 510, 520.

As will be described below, when force in each direction is exerted on the force receiving body 100 in a state that the supporting substrate 300 is fixed, the detection ring 200 undergoes deformation in a mode according to force which has been exerted. The force sensor of the prior application electrically detects the deformed state, thereby detecting the exerted force. Therefore, the ease of elastic deformation of the detection ring 200 is a parameter which influences detection sensitivity of the sensor. Use of the detection ring 200 which easily undergoes elastic deformation makes it possible to realize a high-sensitivity sensor which is capable of detecting subtle force upon exertion thereof, but a maximum value of detectable force is suppressed. In contrast, use of the detection ring 200 which is less likely to undergo elastic deformation makes it possible to increase a maximum value of detectable force. However, the sensitivity is decreased and no subtle force can be detected.

The ease of elastic deformation of the detection ring 200 is determined depending on the thickness in the direction of the Z-axis and thickness in a radial direction (in each case, elastic deformation is more likely to occur with a decrease in thickness) and determined also depending on a material thereof. Therefore, in practice, it is necessary to determine dimensions and materials of individual parts of the detection ring 200, depending on applications of the force sensor. As will be described below, the detection ring used in the present invention has been improved in this respect, and it is possible to enhance the degree of freedom of design depending on industrial demand.

On the other hand, the force receiving body 100 and the supporting substrate 300 are not necessarily required to be a material which will cause elastic deformation in terms of a principle of detecting force. Rather, in order that exerted force completely contributes to deformation of the detection ring 200, it is preferable that the force receiving body 100 and the supporting substrate 300 are a perfect rigid body. In the example shown in the drawing, a reason that a ring-shaped structure body having the clearance portion H1 at the center is used as the force receiving body 100 is not for causing elastic deformation easily but for housing the detection ring 200 therein. As shown in the example shown in the drawing, such a constitution is adopted that the ring-shaped force receiving body 100 is arranged outside the detection ring 200, by which the basic structure portion can be decreased in thickness to realize a thinner force sensor.

In practice, where an insulating material is used as materials of the force receiving body 100, the detection ring 200 and the supporting substrate 300, a synthetic resin such as plastic can be favorably used. Where a conductive material is used, a metal such as stainless steel and aluminum can be favorably used. As a matter of course, an insulating material and a conductive material may be used in combination.

Next, consideration will be given to phenomena that will occur in the basic structure portion, where force in the direction of each coordinate axis and moment around each coordinate axis are exerted on the force receiving body 100 in a state that the supporting substrate 300 is fixed.

As described above, the force receiving body 100 and the supporting substrate 300 are in principle desired to be a perfect rigid body so that exerted force completely contributes to deformation of the detection ring 200. However, actually, where the basic structure portion is constituted with a resin or a metal, the force receiving body 100 or the supporting substrate 300 is not given a perfect rigid body. Upon exertion of force or moment on the force receiving body 100, to be exact, slight elastic deformation will occur in the force receiving body 100 and the supporting substrate 300 as well. However, elastic deformation occurring in the force receiving body 100 and the supporting substrate 300 is slight elastic deformation, as compared with elastic deformation that will occur in the detection ring 200, and in this case, this elastic deformation is negligible. They may be thus practically considered as a rigid body. Therefore, in the present application, a description will be given on the assumption that the force receiving body 100 and the supporting substrate 300 are a rigid body and elastic deformation by force or moment will occur only in the detection ring 200.

Figure 4:
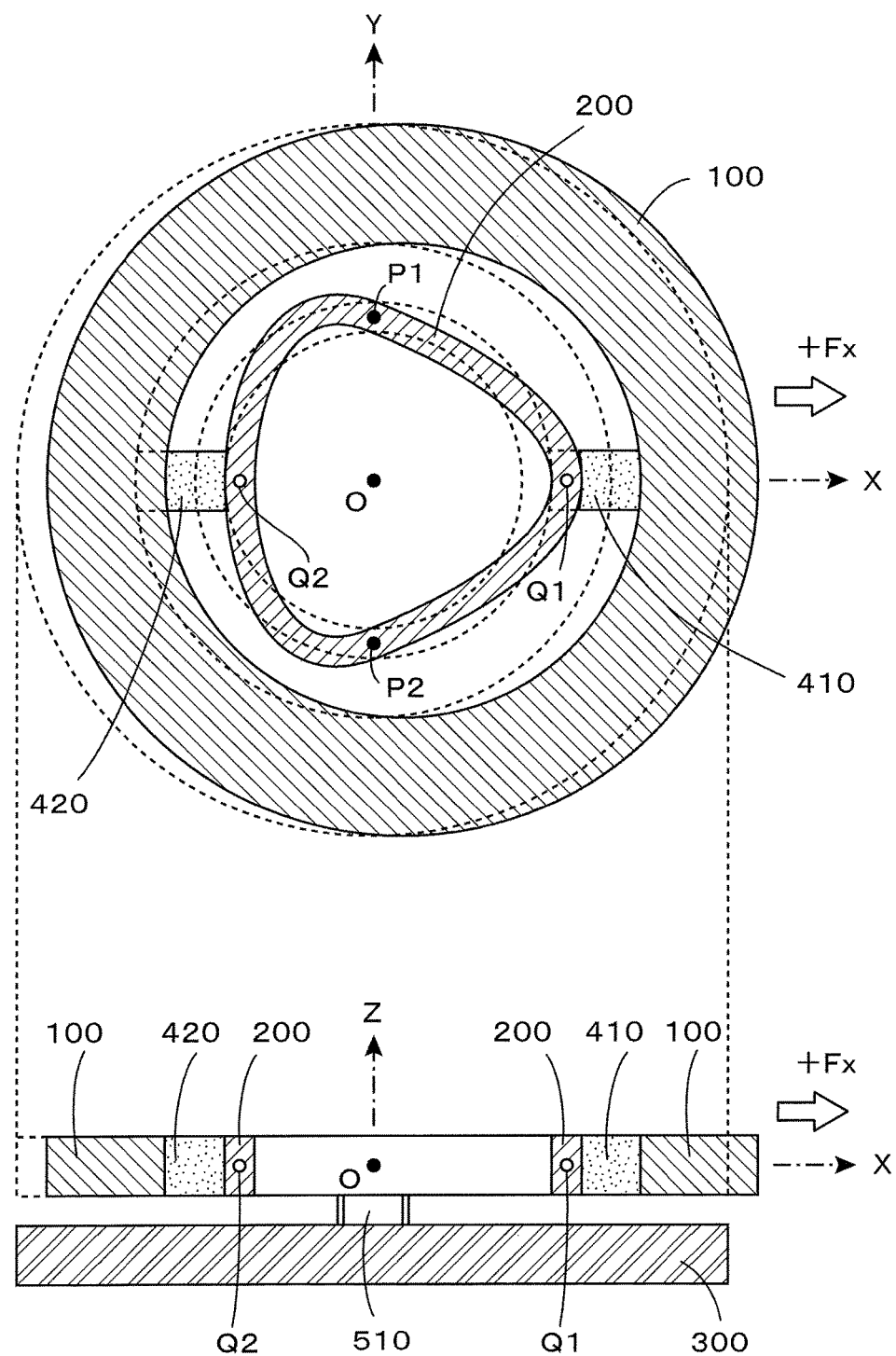
FIG. 4 is a transverse sectional view (view shown in the upper part of the figure) on the XY plane and a longitudinal sectional view (view shown in the lower part of the figure) on the XZ plane, each of which shows a deformed state when force +Fx in the positive direction of the X-axis is exerted on a force receiving body 100 of the basic structure portion shown in FIG. 1.

First, consideration will be given to changes occurring in the basic structure portion when force in the direction of the X-axis is exerted on the force receiving body 100 in a state that the supporting substrate 300 is fixed. FIG. 4 is a transverse sectional view (view shown in the upper part of the figure) on the XY plane and a longitudinal sectional view (view shown in the lower part of the figure) on the XZ plane, each of which shows a deformed state when force +Fx in the positive direction of the X-axis is exerted on the force receiving body 100 of the basic structure portion shown in FIG. 1. Although the supporting substrate 300 is fixed and, therefore, not movable, the force receiving body 100 moves in the rightward direction in the drawing by force +Fx in the positive direction of the X-axis. As a result, the detection ring 200 undergoes deformation as shown in the drawing. The broken lines in the drawing indicate positions of individual rings before movement or deformation.

Here, for the sake of convenience of describing the deformed state, consideration is given to two fixing points P1, P2 (indicated by black circles) and two exertion points Q1, Q2 (indicated by open circles). The fixing points P1, P2 are points defined on the Y-axis and equivalent to positions of the fixing members 510, 520 shown in FIG. 1. That is, the detection ring 200 is fixed to the supporting substrate 300 by the fixing members 510, 520 at positions of the fixing points P1, P2. On the other hand, the exertion points Q1, Q2 are points defined on the X-axis, and the detection ring 200 is connected to the force receiving body 100 by the connection members 410, 420 at positions of the exertion points Q1, Q2.

As described above, in the force sensor of the prior application, the exertion point is a position to which the connection member is connected, and the fixing point is a position to which the fixing member is connected. Then, an important point is that the exertion points and the fixing points are arranged at different positions. In the case of an example shown in FIG. 4, the fixing points P1, P2 and the exertion points Q1, Q2 are arranged at different positions on the XY plane. This is because no elastic deformation would occur in the detection ring 200 if the exertion points and the fixing points occupied the same position.

Now, when force +Fx in the positive direction of the X-axis is exerted on the force receiving body 100, as shown in FIG. 4, force in the rightward direction in the drawing is applied to the exertion points Q1, Q2 (open circles) of the detection ring 200. However, positions of the fixing points P1, P2 (black circles) on the detection ring 200 are fixed and, therefore, the detection ring 200 which is flexible is deformed from a standard circular-shaped state to a distorted state as shown in the drawing. (It is noted that the drawing showing a deformed state in the present application is deformed to some extent for the purpose of depicting the deformed state in an emphasized manner and does not necessarily show an accurate deformed state). Specifically, as shown in the drawing, between the points P1 and Q1 as well as between the points P2 and Q1, a tensile force is exerted on both ends of a quadrant circular arc of the detection ring 200, by which the quadrant circular arc contracts to the inside. Between the points P1 and Q2 as well as between the points P2 and Q2, a pressing force is exerted on both ends of the quadrant circular arc of the detection ring 200, by which the quadrant circular arc expands to the outside.

Where force −Fx in the negative direction of the X-axis is exerted on the force receiving body 100, there develops a phenomenon in which the left and right sides are reversed to that shown in FIG. 4. Further, where force +Fy in the positive direction of the Y-axis and force −Fy in the negative direction of the Y-axis are exerted on the force receiving body 100, there develops a phenomenon in which the deformed state shown in the upper part of FIG. 4 is rotated by 90 degrees.

Figure 5:
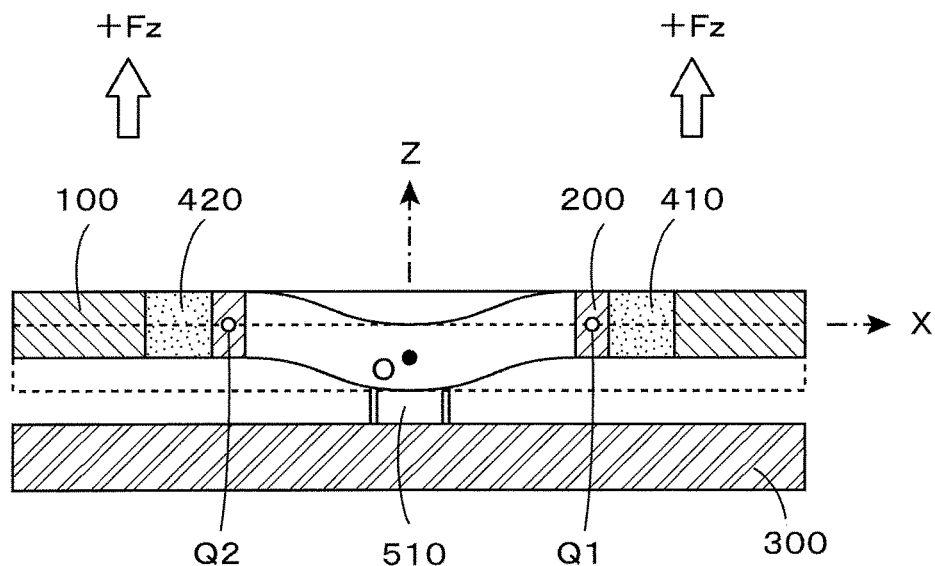
FIG. 5 is a longitudinal sectional view on the XZ plane which shows a deformed state when force +Fz in the positive direction of the Z-axis is exerted on the force receiving body 100 of the basic structure portion shown in FIG. 1.

Next, consideration is given to changes occurring in the basic structure portion when force in the direction of the Z-axis is exerted on the force receiving body 100 in a state that the supporting substrate 300 is fixed. FIG. 5 is a longitudinal sectional view on the XZ plane which shows a deformed state when force +Fz in the positive direction of the Z-axis is exerted on the force receiving body 100 of the basic structure portion shown in FIG. 1. Although the supporting substrate 300 is fixed and, therefore, not movable, the force receiving body 100 moves in the upward direction in the drawing by force +Fz in the positive direction of the Z-axis. As a result, the detection ring 200 undergoes deformation, as shown in the drawing. The broken lines illustrated in the drawing indicate positions of individual rings before movement or deformation.

Here as well, a deformed state is in principle based on the fact that positions of two fixing points P1, P2 (positions which are fixed by the fixing members 510, 520) are not movable and positions of the two exertion points Q1, Q2 move upward from the positions of Q1, Q2. The detection ring 200 undergoes slow deformation from the positions of the fixing points P1, P2 to the positions of the exertion points Q1, Q2. Further, where force −Fz in the negative direction of the Z-axis is exerted on the force receiving body 100, the force receiving body 100 moves in the downward direction in the drawing. As a result, the deformed state of the detection ring 200 is upside down, as compared with that shown in FIG. 5.

Figure 6:
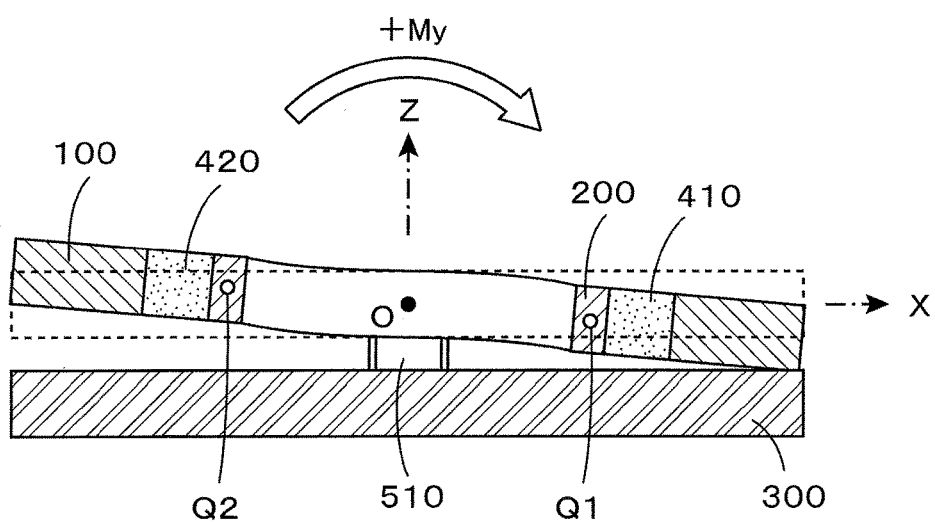
FIG. 6 is a longitudinal sectional view on the XZ plane which shows a deformed state when moment +My which is positive rotation around the Y-axis is exerted on the force receiving body 100 of the basic structure portion shown in FIG. 1.

Next, consideration is given to changes occurring in the basic structure portion when moment around the Y-axis is exerted on the force receiving body 100 in a state that the supporting substrate 300 is fixed. FIG. 6 is a longitudinal sectional view on the XZ plane which shows a deformed state when moment +My which is positive rotation around the Y-axis is exerted on the force receiving body 100 of the basic structure portion shown in FIG. 1. In the present application, a symbol of moment exerted around a predetermined coordinate axis is given so that a direction at which a right-hand screw rotates for allowing the right-hand screw to advance in a positive direction of the coordinate axis is given as positive. For example, a direction at which moment +My shown in FIG. 6 rotates is a rotation direction for allowing the right-hand screw to advance in the positive direction of the Y-axis.

In this case as well, although the supporting substrate 300 is fixed and therefore not movable, the force receiving body 100 rotates clockwise around the center of the origin O in the drawing upon receipt of moment +My which is positive rotation around the Y-axis. As a result, the exertion point Q1 moves downward, and the exertion point Q2 moves upward. The detection ring 200 undergoes slow deformation from positions of the fixing points P1, P2 (positions which are fixed by the fixing members 510, 520) to positions of the exertion points Q1, Q2. Where moment −My which is negative rotation around the Y-axis is exerted on the force receiving body 100, there develops a phenomenon in which the left and right side are reversed to that shown in FIG. 6. Further, where moment +Mx which is positive rotation around the X-axis and moment −Mx which is negative direction around the X-axis are exerted on the force receiving body 100, in the top view, there develops a phenomenon in which the deformed state is rotated by 90 degrees on the top view.

Figure 7:
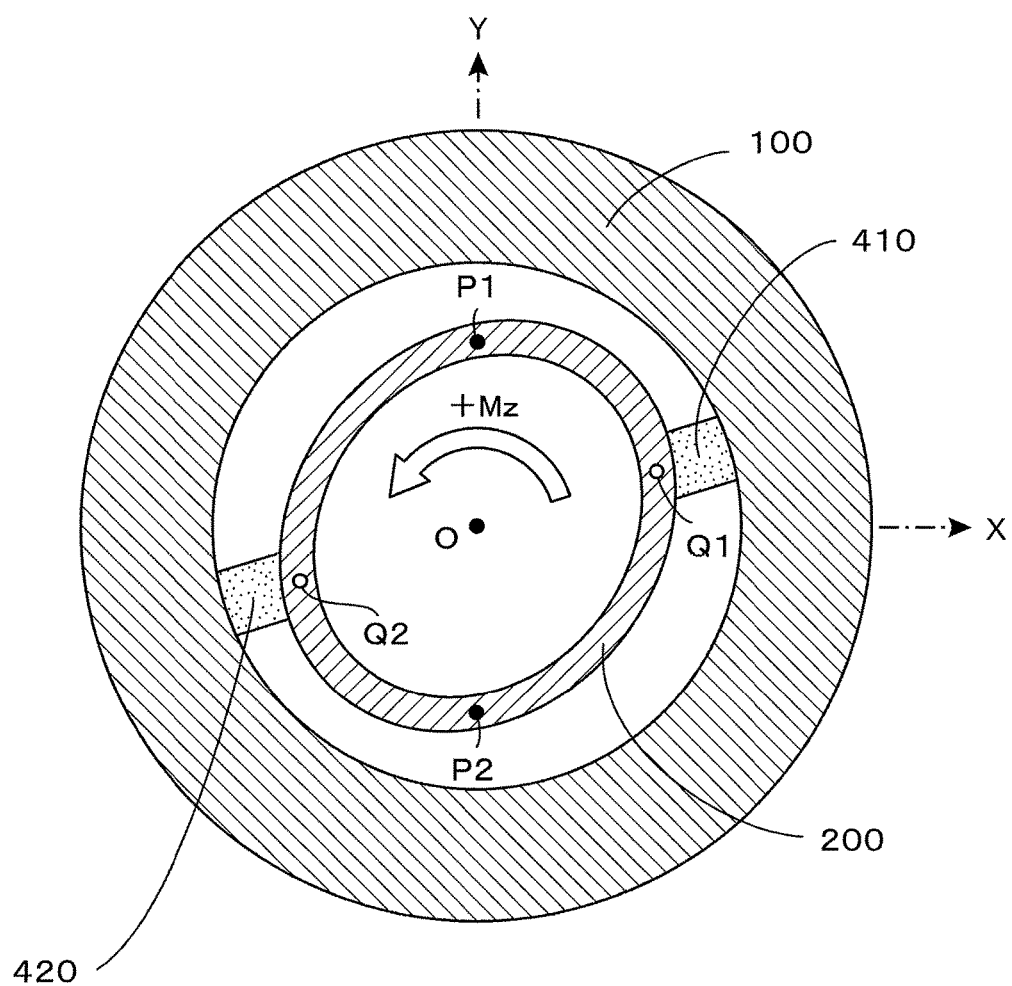
FIG. 7 is a transverse sectional view on the XY plane which shows a deformed state when moment +Mz which is positive rotation around the Z-axis is exerted on the force receiving body 100 of the basic structure portion shown in FIG. 1.

Lastly, consideration is given to changes occurring in the basic structure portion when moment around the Z-axis is exerted on the force receiving body 100 in a state that the supporting substrate 300 is fixed. FIG. 7 is a transverse sectional view on the XY plane which shows a deformed state when moment +Mz which is positive rotation around the Z-axis is exerted on the force receiving body 100 of the basic structure portion shown in FIG. 1. In this case as well, the supporting substrate 300 is fixed and, therefore, not movable. However, the force receiving body 100 receives moment +Mz which is positive rotation around the Z-axis and rotates counter-clockwise around the origin O in the drawing.

As a result, a counter-clockwise force is applied to the exertion points Q1, Q2 of the detection ring 200 in the drawing. However, since positions of the fixing points P1, P2 of the detection ring 200 are fixed, the detection ring 200 which is flexible is deformed from a standard circular-shaped state to a distorted state, as shown in the drawing. Specifically, as shown in the drawing, between the points P2 and Q1 as well as between the points P1 and Q2, a tensile force is exerted on both ends of a quadrant circular arc of the detection ring 200, by which the quadrant circular arc contracts to the inside. Between the points P1 and Q1 as well as between points P2 and Q2, a pressing force is exerted on the both ends of the quadrant circular arc of the detection ring 200, by which the quadrant circular arc expands to the outside, giving oval deformation as a whole. On the other hand, where moment −Mz which is negative rotation around the Z-axis is exerted on the force receiving body 100, the force receiving body 100 rotates clockwise around the origin O in the drawing. Thus, there develops a deformed state which is reversed as compared with the state shown in FIG. 7.

A description has been given above of deformed states occurring in the detection ring 200 when force in the direction of each coordinate axis and moment around each coordinate axis are exerted on the force receiving body 100 in a state that fixed is the supporting substrate 300 of the basic structure portion shown in FIG. 1. These deformed states are different from each other and a deformation extent is also different depending on the magnitude of the exerted force and moment. Thus, elastic deformation of the detection ring 200 is detected to collect information on a mode and magnitude thereof, thus making it possible to detect force in the direction of each coordinate axis and moment around each coordinate axis individually and independently. This is a basic principle of detection motions in the force sensor of the prior application. In the force sensor of the prior application, detection is conducted on the basis of the above-described principle. Therefore, a capacitive element and a detection circuit are additionally added to the basic structure portion which has been described above.

Chapter 2. Detection Principle of Force Sensor of Prior Application

In the force sensor of the prior application, displacement is measured at a specific site of the basic structure portion shown in FIG. 1, thereby detecting a direction and magnitude of the exerted force and moment. In order to detect this displacement, a fixation assisting body 350 is added.

Figure 8:
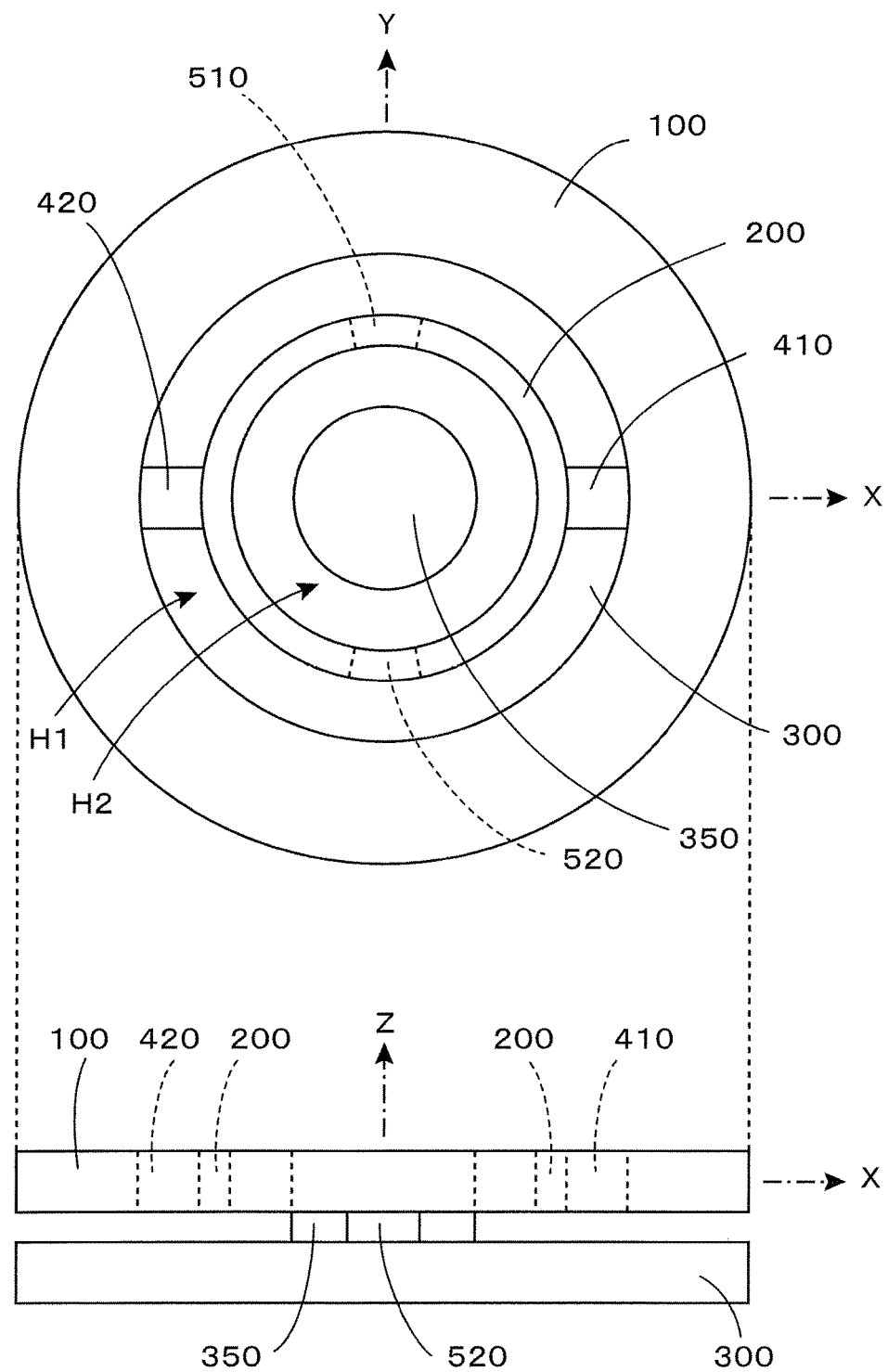
FIG. 8 is a top view (view shown in the upper part of the figure) and a side view (view shown in the lower part of the figure), each of which shows an embodiment in which a fixation assisting body 350 for detecting displacement is added to the basic structure portion shown in FIG. 1.

FIG. 8 is a top view (view shown in the upper part of the figure) and a side view (view shown in the lower part of the figure), each of which shows an example in which the fixation assisting body 350 for detecting displacement is added to the basic structure portion shown in FIG. 1. As shown in the drawing, in the basic structure portion, the detection ring 200 is arranged inside the force receiving body 100, and the fixation assisting body 350 is arranged further inside. The fixation assisting body 350 is a cylindrical article in which the Z-axis is taken as a central axis and a lower face thereof is fixed to an upper face of the supporting substrate 300. An outer circumferential face of the fixation assisting body 350 opposes an inner circumferential face of the detection ring 200, with a clearance portion H2 held between them.

Figure 9:
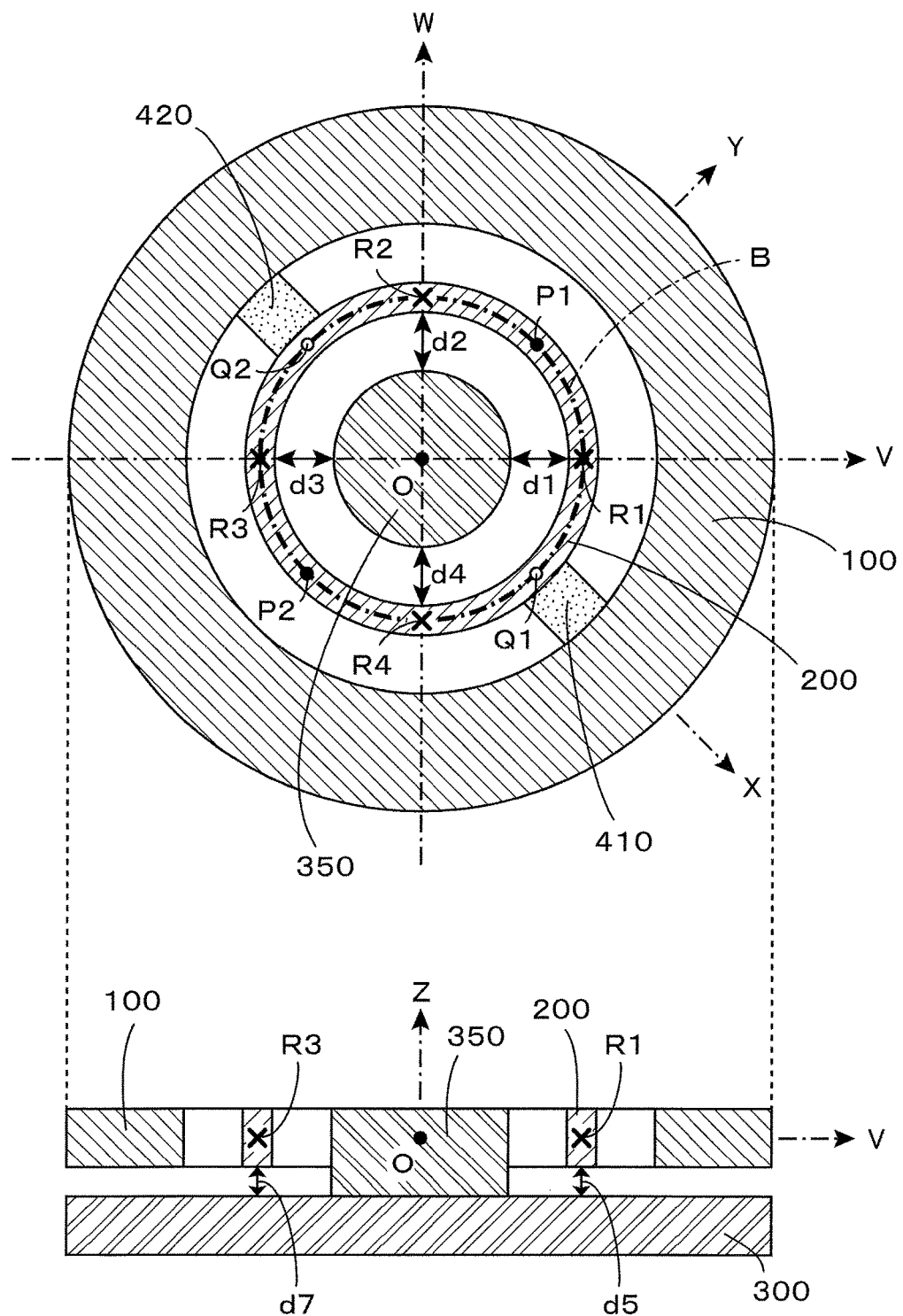
FIG. 9 is a transverse sectional view (view shown in the upper part of the figure) in which the basic structure portion shown in FIG. 8 is cut along the XY plane and a longitudinal sectional view (view shown in the lower part of the figure) in which it is cut along a VZ plane.

FIG. 9 is a transverse sectional view (view shown in the upper part of the figure) in which the basic structure portion shown in FIG. 8 is cut along the XY plane and a longitudinal sectional view (view shown in the lower part of the figure) in which the basic structure portion is cut along the VZ plane. Here, the V-axis is an axis which passes through the origin O in an XYZ three-dimensional orthogonal coordinate system and gives 45 degrees with respect to the X-axis, in which a positive domain is positioned at a first quadrant on the XY plane and a negative domain is positioned at a third quadrant on the XY plane. Further, the W-axis is an axis which passes through the origin O in the XYZ three-dimensional orthogonal coordinate system and is orthogonal to the V-axis, in which a positive domain is positioned at a second quadrant on the XY plane and a negative domain is positioned at a fourth quadrant on the XY plane. The transverse sectional view shown at the upper part of FIG. 9 is a drawing in which the positive direction of the V-axis is taken in the rightward direction and the positive direction of the W-axis is taken in the upward direction, corresponding to a drawing in which the fixation assisting body 350 is added to the basic structure portion shown in FIG. 2 and is rotated clockwise by 45 degrees. Further, the longitudinal sectional view in the lower part of FIG. 9 is a longitudinal sectional view in which the basic structure portion is cut along the VZ plane and, therefore, the rightward direction is the positive direction of the V-axis.

As described in Chapter 1, on the detection ring 200, two fixing points P1, P2 are arranged on the Y-axis and two exertion points Q1, Q2 are arranged on the X-axis. Here, four measurement points R1 to R4 (indicated by an x mark) are further defined. As shown in the drawing, a first measurement point R1, a second measurement point R2, a third measurement point R3 and a fourth measurement point R4 are arranged respectively at a positive domain of the V-axis, a positive domain of the W-axis, a negative domain of the V-axis and a negative domain of the W-axis. Accordingly, in the transverse sectional view at the upper part of FIG. 9, where a basic annular channel B (indicated by the alternate long and short dashed line in the drawing) is defined as a circle between an outer circumferential contour circle and an inner circumferential contour circle of the detection ring 200, individual points are to be arranged in the order of Q1, R1, P1, R2, Q2, R3, P2, R4 at equal intervals on the circular basic annular channel B. A reason for defining the four measurement points R1 to R4 at these positions is that displacement resulting from elastic deformation of the detection ring 200 becomes most pronounced.

In order to detect radial displacement of these four measurement points R1 to R4, measurement may be made for distances d1, d2, d3, d4 indicated by arrows in the transverse sectional view at the upper part of FIG. 9. Each of these distances d1, d2, d3, d4 is a distance between a measurement target face on an inner circumferential face of the detection ring 200 in the vicinity of each of the measurement points R1, R2, R3, R4 and a counter reference surface positioned on an outer circumference of the fixation assisting body 350 and facing the measurement target face. An increase in the distance indicates that a part in the vicinity of a measurement point expands in a radial direction, and a decrease in the distance indicates that a part in the vicinity of a measurement point contracts in the radial direction. Therefore, capacitive elements are provided for detecting electrically these distances, thus making it possible to measure a radial deformation extent in the vicinity of each of the measurement points.

On the other hand, in order to detect displacement of the four measurement points R1 to R4 in a vertical direction (in the direction of the Z-axis), measurement may be made for distances d5, d7 indicated by arrows in the longitudinal sectional view at the lower part of FIG. 9 and distances d6, d8 which are not shown in the drawing (the distance d6 is a distance immediately below the measurement point R2 behind the fixation assisting body 350, and the distance d8 is a distance immediately below the measurement point R4 in front of the fixation assisting body 350). Each of these distances d5, d6, d7, d8 is a distance between a measurement target face positioned on a lower face of the detection ring 200 in the vicinity of each of the measurement points R1, R2, R3, R4 and a counter reference surface positioned on an upper face of the supporting substrate 300, facing the measurement target face. An increase in the distance indicates that a part in the vicinity of a measurement point undergoes displacement in the upward direction and a decrease in the distance indicates that a part in the vicinity of a measurement point undergoes displacement in the downward direction. Therefore, detection elements are provided for electrically detecting these distances, thus making it possible to measure a deformation extent in the vertical direction in the vicinity of each of the measurement points.

Figures 10, 11:
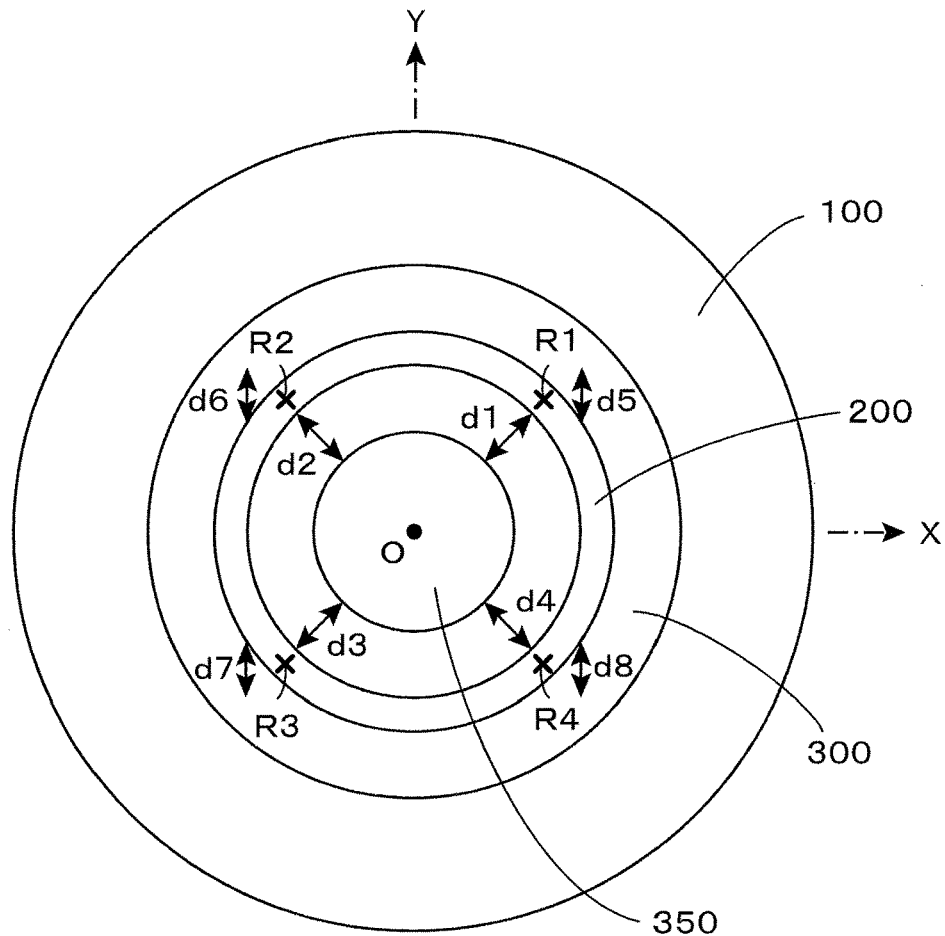
FIG. 10 is a top view which shows a distance measurement site in the basic structure portion shown in FIG. 8.
FIG. 11 is a table which shows changes in the distances d1 to d8 when force in the direction of each coordinate axis and moment around each coordinate axis are exerted on the basic structure portion shown in FIG. 10.

As described above, if the four measurement points R1 to R4 can be measured for radial displacement and vertical displacement, it is possible to understand an entire deformed state of the detection ring 200 and a deformation extent thereof. Thereby, it is possible to detect six-axis components of force in the direction of each coordinate axis and moment around each coordinate axis in an XYZ three-dimensional orthogonal coordinate system. FIG. 10 is a top view which shows distance measurement sites necessary for detecting the six-axis components. That is, in this example, as described above, the first measurement point R1 is measured for the distance d1 (radial displacement) and the distance d5 (vertical displacement), the second measurement point R2 is measured for the distance d2 (radial displacement) and the distance d6 (vertical displacement), the third measurement point R3 is measured for the distance d3 (radial displacement) and the distance d7 (vertical displacement), and the fourth measurement point R4 is measured for the distance d4 (radial displacement) and the distance d8 (vertical displacement).

FIG. 11 is a table which shows changes in the distances d1 to d8 when force in the direction of each coordinate axis and moment around each coordinate axis are exerted on the force receiving body 100 in a state that the supporting substrate 300 is fixed in the basic structure portion shown in FIG. 10. In the table, [+] indicates an increase in distance, [−] indicates a decrease in distance, and [0] indicates no variation in distance. The thus obtained results can be easily understood when consideration is given to a concrete deformed state of the detection ring 200 described in Chapter 1.

For example, when force +Fx in the positive direction of the X-axis is exerted on the force receiving body 100, as shown in FIG. 4, the detection ring 200 undergoes such deformation that a quadrant circular arc between the points P1 and Q1 and that between the points P2 and Q1 contract to the inside, and a quadrant circular arc between the points P1 and Q2 and that between the points P2 and Q2 expand to the outside. Therefore, the distances d1, d4 are decreased, while the distances d2, d3 are increased. At this time, since no vertical deformation occurs on the detection ring 200, the distances d5 to d8 are not varied. The row of +Fx in the table of FIG. 11 shows the above-described results. Where force +Fy in the positive direction of the Y-axis is exerted, there are obtained results shown in the row of +Fy in the table of FIG. 11, due to a similar reason.

Further, when force +Fz in the positive direction of the Z-axis is exerted on the force receiving body 100, the detection ring 200 undergoes deformation as shown in FIG. 5, thereby increasing the distances d5 to d8. At this time, since no radial deformation occurs in the detection ring 200, the distances d1 to d4 are not varied. The row of +Fz in the table of FIG. 11 shows the above-described results.

Then, when moment +My which is positive rotation around the Y-axis is exerted on the force receiving body 100, the detection ring 200 undergoes deformation as shown in FIG. 6. The right half of the drawing undergoes downward displacement, while the left half of the drawing undergoes upward displacement. Accordingly, the distances d5, d8 are decreased, while the distances d6, d7 are increased. At this time, no radial deformation occurs in the detection ring 200 and, therefore, the distances d1 to d4 are not varied. The rows of +My in the table of FIG. 11 show the above-described results. Where moment +Mx which is positive rotation around the Y-axis is exerted, there are obtained results shown in the row of +Mx in the table of FIG. 11, due to a similar reason.

Lastly, where moment +Mz which is positive rotation around the Z-axis is exerted on the force receiving body 100, the detection ring 200 undergoes deformation as shown in FIG. 7, thereby causing such deformation that a quadrant circular arc between the points P1 and Q1 and that between the points P2 and Q2 expand to the outside, while a quadrant circular arc between the points P1 and Q2 and that between the points P2 and Q1 contract to the inside. Therefore, the distances d1, d3 are increased and the distances d2, d4 are decreased. At this time, no vertical deformation occurs in the detection ring 200 and, therefore, the distances d5 to d8 are not varied. The row of +Mz in the table of FIG. 11 shows the above-described results.

The table of FIG. 11 shows the results obtained where force in the positive direction and moment which is positive rotation are exerted. Where force in the negative direction and moment which is negative rotation are exerted, there are obtained such results that [+] and [−] are reversed. Accordingly, a pattern of changes in distances d1 to d8 is different depending on the case where each of six-axis components is exerted. Further, a variation amount of distance becomes greater, with an increase in exerted force or moment. Thus, a detection circuit is used to perform predetermined operation based on measured values of these distances d1 to d8, thus making it possible to output detection values of the six-axis components independently.

The force sensor of the prior application is a sensor in which a capacitive element and a detection circuit are also added to the basic structure portion shown in FIG. 8, detecting electrically a change in capacitance value of the capacitive element arranged at each portion, thereby measuring displacement at a specific site to detect a direction and magnitude of the exerted force and moment.

Figure 12:
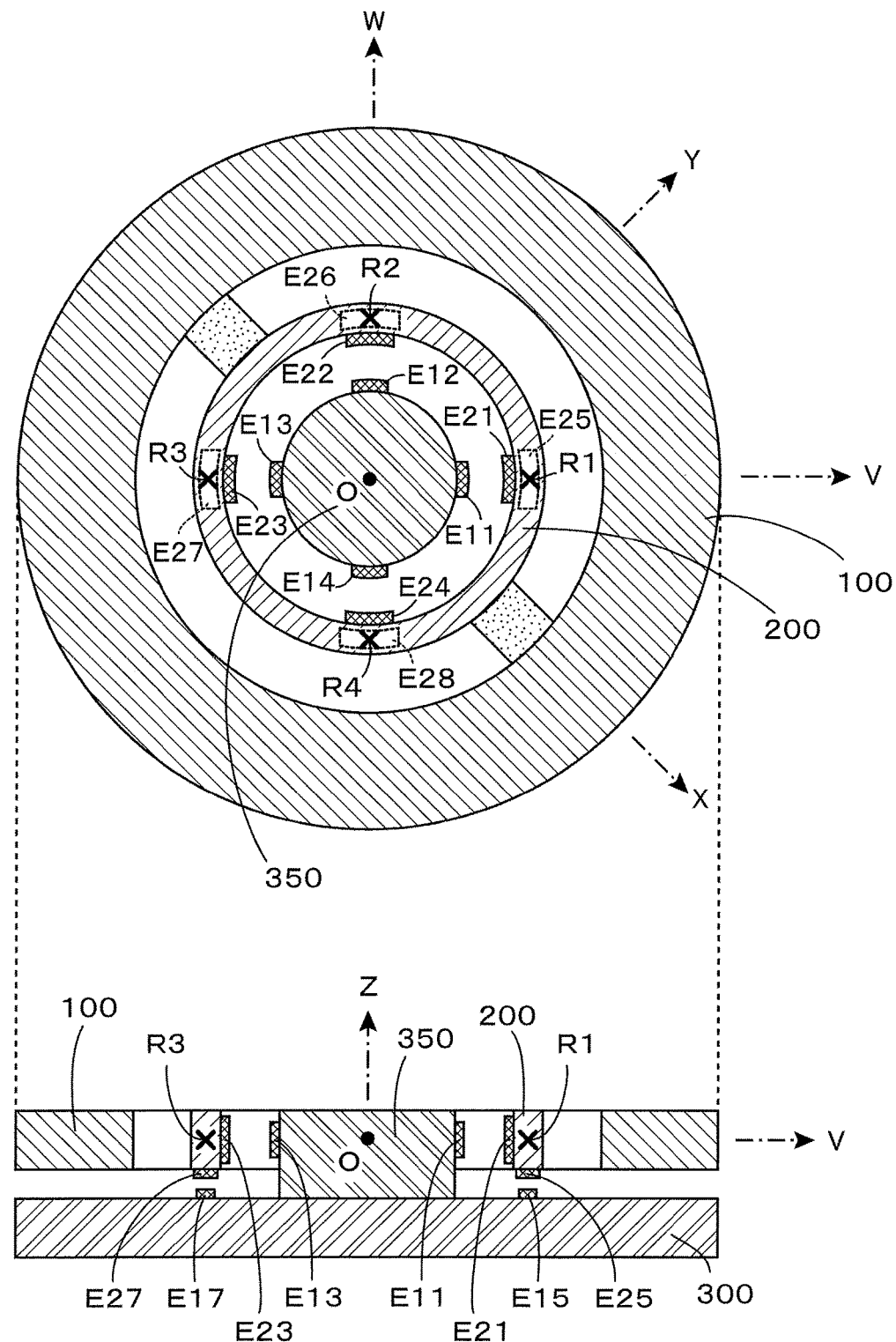
FIG. 12 is a transverse sectional view (view shown in the upper part of the figure) in which a force sensor constituted by adding a capacitive element to the basic structure portion shown in FIG. 9 is cut along the XY plane and a longitudinal sectional view (view shown in the lower part of the figure) in which the force sensor is cut along the VZ plane.

FIG. 12 is a transverse sectional view (view shown in the upper part of the figure) in which a force sensor constituted by adding a capacitive element to the basic structure portion shown in FIG. 9 is cut along the XY plane and a longitudinal sectional view (view shown in the lower part of the figure) in which the force sensor is cut along the VZ plane. Comparison of the basic structure portion shown in FIG. 9 with the force sensor shown in FIG. 12 reveals that 16 electrodes, E11 to E18 and E21 to E28, are added in the latter. Eight sets of capacitive elements constituted with the 16 electrodes function as detection elements for measuring eight different distances of d1 to d8, as described above.

As shown in the transverse sectional view at the upper part of FIG. 12, the displacement electrodes E21 to E24 are installed respectively in the vicinities (measurement target faces) of four measurement points R1 to R4 on an inner circumferential face of the detection ring 200. Further, the displacement electrodes E25 to E28 (indicated by broken lines in the drawing) are installed respectively in the vicinities (measurement target faces) of four measurement points R1 to R4 on a lower face of the detection ring 200. These eight displacement electrodes E21 to E28 are literally electrodes which cause displacement by deformation of the detection ring 200.

On the other hand, eight fixed electrodes E11 to E18 are installed at positions (counter reference surfaces) facing these eight displacement electrodes E21 to E28. These eight fixed electrodes E11 to E18 are literally electrodes which are fixed directly or indirectly to the supporting substrate 300, constantly keeping a standard position, irrespective of deformation of the detection ring 200. Specifically, the fixed electrodes E11 to E14 are installed at positions facing the displacement electrodes E21 to E24 on an outer circumferential face of the cylindrical fixation assisting body 350, and these electrodes are fixed indirectly on the supporting substrate 300 via the fixation assisting body 350. Further, the fixed electrodes E15 to E18 are directly fixed at positions facing the displacement electrodes E25 to 28 on an upper face of the supporting substrate 300. (In the longitudinal sectional view at the lower part of FIG. 12, only the displacement electrodes E15, E17 appear, but the displacement electrode E16 is positioned behind the fixation assisting body 350 and the displacement electrode E18 is positioned in front of the fixation assisting body 350.).

In the drawings of the present application, for the sake of convenience of illustration, each of the displacement electrodes and each of the fixed electrodes are depicted without regard for actual thickness. For example, where each of the electrodes is constituted with a deposition layer or a plating layer, the thickness thereof is in a range of several micrometers. And, each of the electrodes E11 to E28 in FIG. 12 is not depicted in correct thickness on the basis of an actual dimension ratio.

Accordingly, in the example shown in FIG. 12, eight sets of the displacement electrodes E21 to E28 installed on measurement target faces positioned in the vicinities of individual measurement points R1 to R4 on the inner circumferential face and the lower face of the detection ring 200 and eight sets of the fixed electrodes E11 to E18 installed on the counter reference surfaces defined at positions facing the individual measurement target faces on the outer circumferential face of the fixation assisting body 350 and on the upper face of the supporting substrate 300 are used to constitute eight sets of capacitive elements. Then, the force sensor of the prior application detects electrically capacitance values of these eight sets of capacitive elements, thereby measuring displacement of each of the measurement points R1 to R4 and detecting a direction and magnitude of force and moment exerted on the force receiving body 100 on the basis of the table shown in FIG. 11.

As described above, the force sensor of the prior application can be constituted by using the simple basic structure portion shown in FIG. 12. However, capacitive elements are required to be arranged at various sites, thus inevitably resulting in a complicated constitution of electrodes which constitute capacitive elements. Specifically, in order to add capacitive elements to the basic structure portion, it is necessary to carry out a step which forms an electrode layer parallel to a substrate face (XY plane) as found in the fixed electrodes E15 to E18 and the displacement electrodes E25 to E28 and a step which forms an electrode layer perpendicular to the substrate face (XY plane) as found in the fixed electrodes E11 to E14 and the displacement electrodes E21 to E24. In general, the former step can be carried out by a method which has been widely used in a semiconductor production process, etc., and, therefore, relatively easy. However, the latter step needs the use of a complicated method, thereby often having problems with mass-production.

Further, a relative position of one pair of electrodes which constitute individual capacitive elements is an important factor which influences the detection accuracy. In particular, as in the example shown in FIG. 12, where a plurality of capacitive elements are arranged so as to be symmetrical and used in detecting a difference, such adjustment is needed that a counter electrode is made parallel to each of the capacitive elements and also the plurality of capacitive elements are made equal in electrode interval with each other. Therefore, the force sensor of the prior application has problems such as reduction in production efficiency and increase in cost on commercial application of the sensor.

In order to solve the above problems of the force sensor of the prior application, the present invention proposes a newly adopted innovative structure in which an elastic deformation-causing detection portion is installed at a specific site of a detection ring, thereby enhancing the degree of freedom of design and also raising production efficiency. Hereinafter, the present invention will be described in detail by referring to concrete embodiments.

Chapter 3. Basic Embodiment of the Present Invention

<3-1. Structure of Detection Ring>

Figure 13:
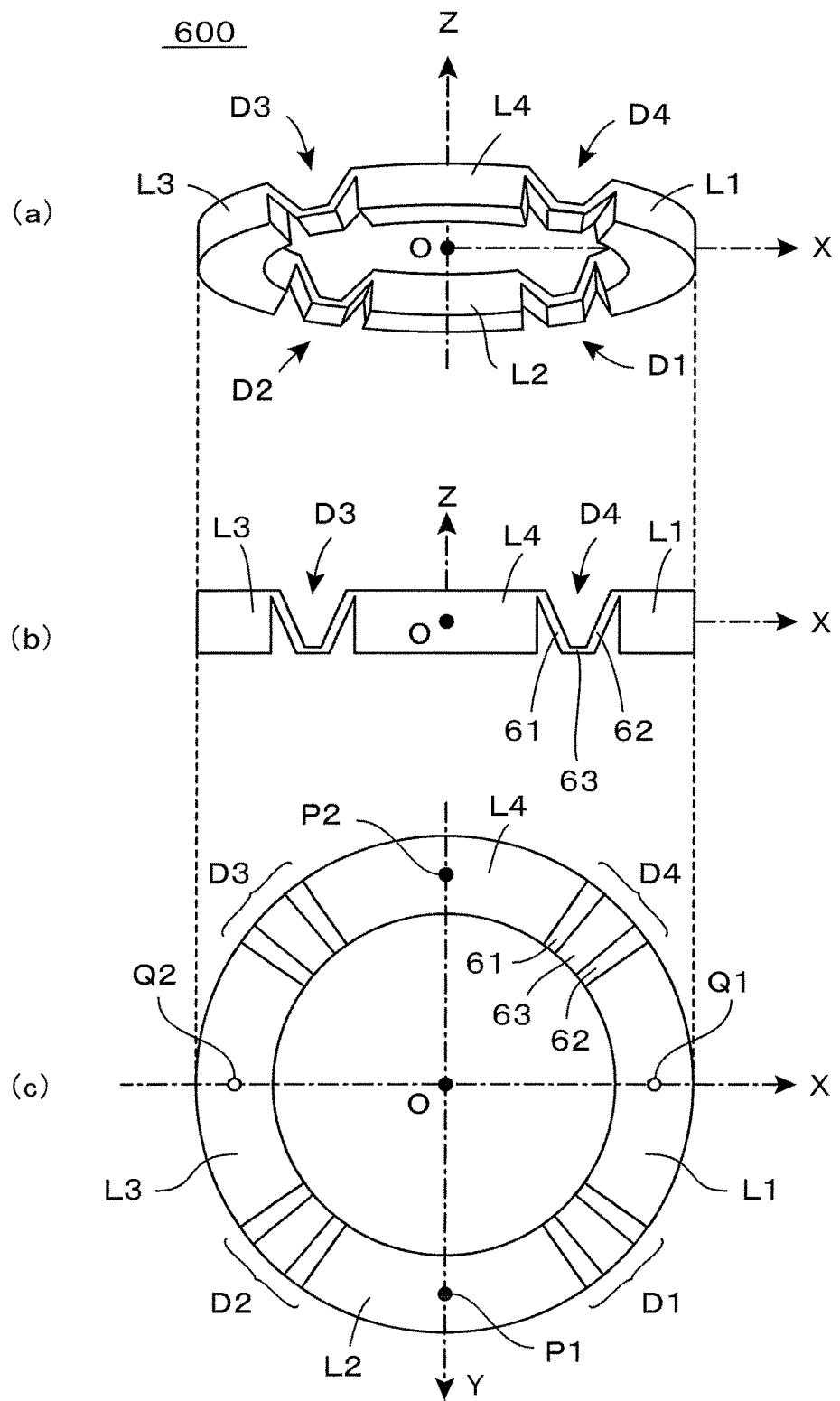
FIG. 13 is a perspective view (Fig. (a)), a side view (Fig. (b)) and a bottom view (Fig. (c)) of a detection ring 600 which is used in a force sensor according to the First Embodiment of the present invention.

FIG. 13 is a perspective view (Fig. (a)) of a detection ring 600 which is used in a force sensor according to a basic embodiment (First Embodiment) of the present invention, a side view (Fig. (b)) thereof and a bottom view (Fig. (c)) thereof. Whereas the detection ring 200 which is used in the force sensor of the prior application shown in FIG. 1 is a simple circular-annular structure body, the detection ring 600 which is used in the force sensor of the present application shown in FIG. 13 is such that the detection portions D1 to D4 constituted in combination with a plate-shaped piece undergoing elastic deformation are installed at four sites of the simple circular-annular structure body.

In other words, the detection ring 600 shown in FIG. 13 is a member obtained by giving partial material-removing processing to the detection ring 200 shown in FIG. 1, and the illustrated detection portions D1 to D4 are each formed with a part to which the material-removing processing is given. The detection ring 200 shown in FIG. 1 is obtained by forming a through opening portion at the center of a plate-shaped member arranged, with the Z-axis given as the central axis. The detection ring 600 shown in FIG. 13 is obtained by giving additional partial material-removing processing to the thus obtained detection ring 200. Four sets of the detection portions D1 to D4 are to be parts which are obtained by the above-described material-removing processing. Material-removing processing is not necessarily performed on actual mass-production of the detection ring 600, and the detection ring 600 may be produced, for example, by casting by the use of a mold, resin molding, pressing, etc.

Here, for the sake of convenience of description, there is shown a state that an XYZ three-dimensional coordinate system is defined as illustrated and the detection ring 600 is arranged on the XY plane, with the Z-axis given as a central axis. FIG. 13 (a) is a perspective view when the detection ring 600 is viewed obliquely from below. As shown in the drawing, the detection ring 600 is provided with four sets of detection portions D1 to D4 and four sets of coupling portions L1 to L4 which couple these detection portions D1 to D4 with each other. That is, the detection ring 600 is structured so that the coupling portions L1 to L4 are inserted respectively between the detection portions D1 and D4.

As shown in the detection portion D4 in the side view of FIG. 13(b) (only a part of the outer circumferential face is shown to make the drawing simple), the detection portion D4 in this embodiment is constituted with three plate-shaped pieces (blade spring) which are a first deformation portion 61, a second deformation portion 62 and a displacement portion 63. Other detection portions D1 to D3 are also similar in constitution. As described above, each of the detection portions D1 to D4 is constituted with a plate-shaped piece which is thinner than each of the coupling portions L1 to L4 and, therefore, more liable to undergo elastic deformation than each of the coupling portions L1 to L4. Therefore, as will be described below, where an external force is exerted on the detection ring 600, elastic deformation of the detection ring 600 based on the external force occurs, concentrating at the detection portions D1 to D4, and elastic deformation of the coupling portions L1 to L4 is in practice negligible.

As described above, since the detection ring 200 which has been used in the force sensor of the prior application is provided with a uniform circular annular structure, elastic deformation occurs all over the ring upon exertion of an external force. On the other hand, in the detection ring 600 which is used in the force sensor of the present application, deformation concentrates at the detection portions D1 to D4 where elastic deformation will easily occur. Therefore, it is possible to cause deformation more efficiently and also to attain more efficient detection. Specifically, not only can detection sensitivity be enhanced but also a mode of elastic deformation can be designed freely by forming the shape and structure of the detection portion in an inventive manner. A mode of concrete elastic deformation of the illustrated detection portions D1 to D4 will be described in detail below.

FIG. 13(c) is a bottom view when the detection ring 600 shown in FIG. 13(a) is viewed upward from below, and when the X-axis is taken in the rightward direction, the Y-axis is a downward axis. As shown in the drawing, starting from the coupling portion L1 arranged on the X-axis, the coupling portions and the detection portions are arranged clockwise in the order of the coupling portion L1, the detection portion D1, the coupling portion L2, the detection portion D2, the coupling portion L3, the detection portion D3, the coupling portion L4 and the detection portion D4. As will be described below, the fixing points P1, P2 (indicated by black circles) on the Y-axis are fixed to a supporting substrate, and an external force applied from a force receiving body is exerted on the exertion points Q1, Q2 (indicated by open circles) on the X-axis. As a result, elastic deformation depending on the external force occurs at each of the detection portions D1 to D4.

Figure 14:
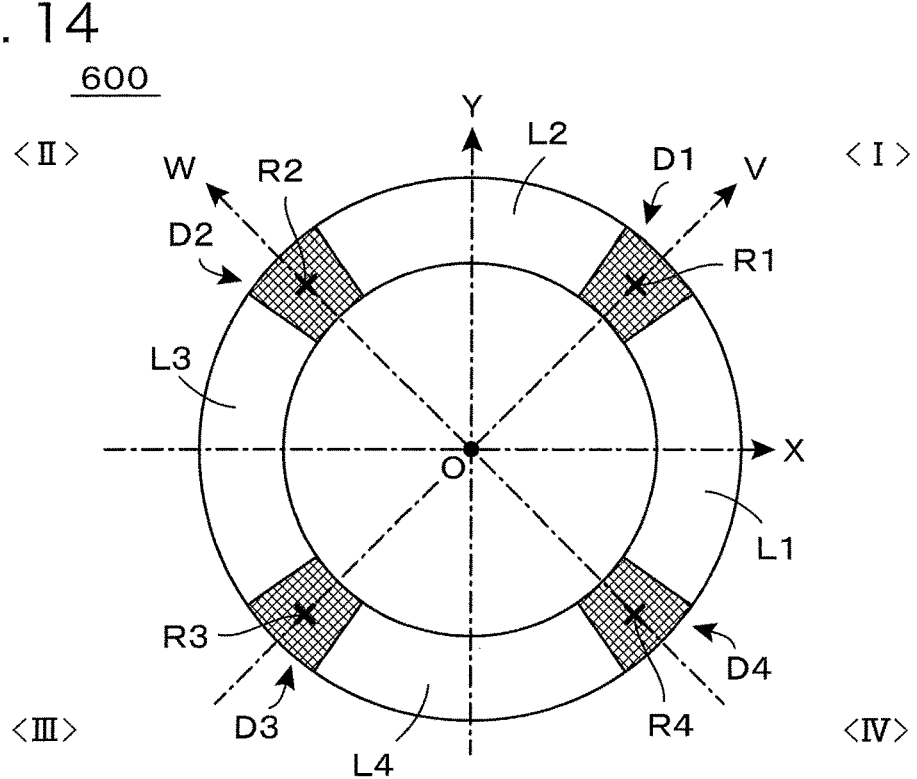
FIG. 14 is a top view which shows a distribution of domains of the detection ring 600 shown in FIG. 13 (mesh-like hatching indicates domains of detection portions D1 to D4 and does not indicate a cross section).

FIG. 14 is a top view which shows a distribution of domains of the detection ring 600 shown in FIG. 13. (Mesh-like hatching indicates the domains of the detection portions D1 to D4 and does not indicate a cross section.).

Since this is a top view, they are arranged counter-clockwise in the order of L1, D1, L2, D2, L3, D3, L4, D4 on the detection ring 600, which is reverse to the case of FIG. 13(c). As shown in the drawing, on the XY plane, the V-axis is defined as a coordinate axis in which the X-axis is rotated counter-clockwise by 45 degrees around the origin O, and the W-axis is defined as a coordinate axis in which the Y-axis is rotated counter-clockwise by 45 degrees around the origin O. <I>, <II>, <III> and <IV> shown in the drawing indicate respectively a first quadrant to a fourth quadrant in an XY two-dimensional coordinate system. Four sets of the detection portions D1, D2, D3, D4 are arranged respectively in the first quadrant, the second quadrant, the third quadrant and the fourth quadrant.

Figure 15:
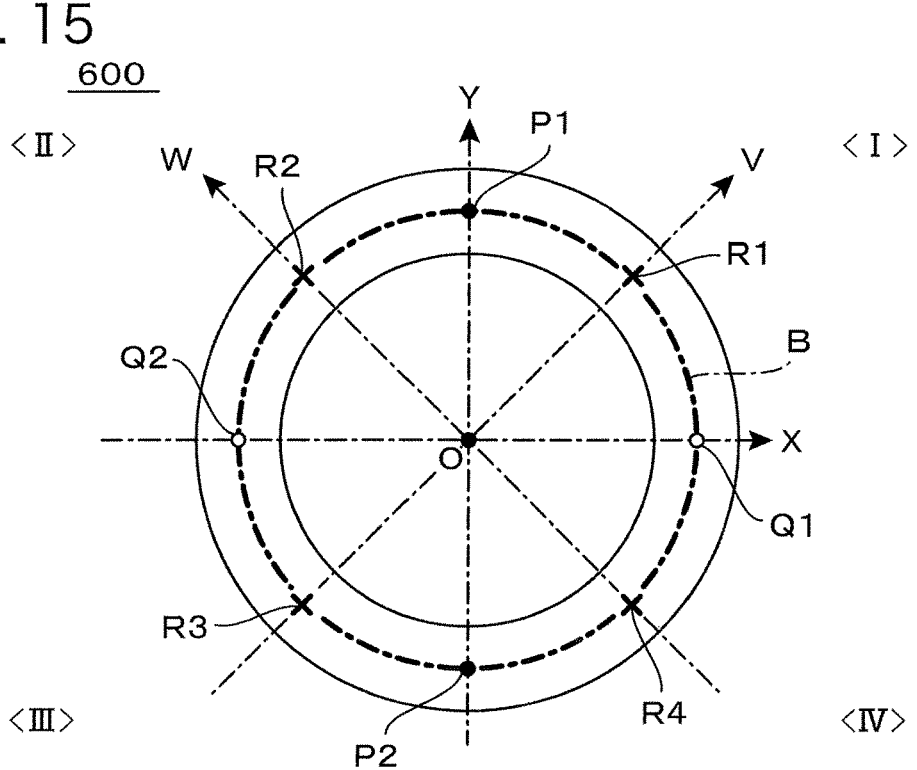
FIG. 15 is a plan view of the detection ring 600 shown in FIG. 13 in which a basic annular channel B defined on the XY plane and individual points defined on the basic annular channel B are shown.

FIG. 15 is a plan view of the detection ring 600 shown in FIG. 13 which shows a basic annular channel B defined on the XY plane and individual points defined on the basic annular channel B. The basic annular channel B which is indicated by the thick alternate long and short dashed line in the drawing is a circle around the origin O arranged on the XY plane, and the detection ring 600 is an annular structure body which extends along the basic annular channel B. In the drawing, positions of an inner contour line and an outer contour line of the detection ring 600 are indicated by the solid lines. In the case of the example shown in the drawing, the basic annular channel B is a circle on the XY plane which passes through an intermediate position between the inner contour line and the outer contour line of the detection ring 600, serving as a center line of annular thick parts (coupling portions L1 to L4) of the detection ring 600.

Four sets of detection points R1 to R4 are defined as points on the basic annular channel B. Specifically, a first detection point R1 is defined at a position at which the basic annular channel B intersects with the positive V-axis, a second detection point R2 is defined at a position at which the basic annular channel B intersects with the positive W-axis, a third detection point R3 is defined at a position at which the basic annular channel B intersects with the negative V-axis, and a fourth detection point R4 is defined at a position at which the basic annular channel B intersects with the negative W-axis. These detection points R1 to R4 indicate respectively arrangements of the detection portions D1 to D4. That is, as indicated by mesh-line hatching domains in FIG. 14, the first detection portion D1 is arranged at a position of the first detection point R1, the second detection portion D2 is arranged at a position of the second detection point R2, the third detection portion D3 is arranged at a position of the third detection point R3, and the fourth detection portion D4 is arranged at a position of the fourth detection point R4.

On the other hand, points P1, P2 which are indicated by black circles in FIG. 15 are fixing points, while points Q1, Q2 which are indicated by open circles are exertion points. As will be described below, the fixing points P1, P2 are points which are fixed to the supporting substrate 300, and the exertion points Q1, Q2 are points on which force from the force receiving body 100 is exerted. In the case of the example shown in the drawing, the fixing points P1, P2 are defined at a position at which the basic annular channel B intersects with the Y-axis, and the exertion points Q1, Q2 are defined at a position at which the basic annular channel B intersect with the X-axis. Therefore, in the force sensor which uses the detection ring 600, in a state that the two points P1, P2 on the Y-axis are fixed, force or moment exerted on the two points Q1, Q2 on the X-axis is detected on the basis of elastic deformation of four sets of the detection portions D1 to D4 arranged at the detection points R1 to R4 on the V-axis and the W-axis.

As shown in FIG. 15, the fixing points P1, P2 and the exertion points Q1, Q2 are alternately arranged along the basic annular channel B. The alternate arrangement is, as will be described below, important in causing effective deformation to the detection ring 600 upon exertion of an external force to be detected. Further, four sets of the detection points R1 to R4 are each arranged between a fixing point and an exertion point which are adjacent to each other. This arrangement is also important in causing effective displacement to each of the detection portions D1 to D4 upon exertion of an external force to be detected.

<3-2. Structure of Basic Embodiment>

Figure 16:
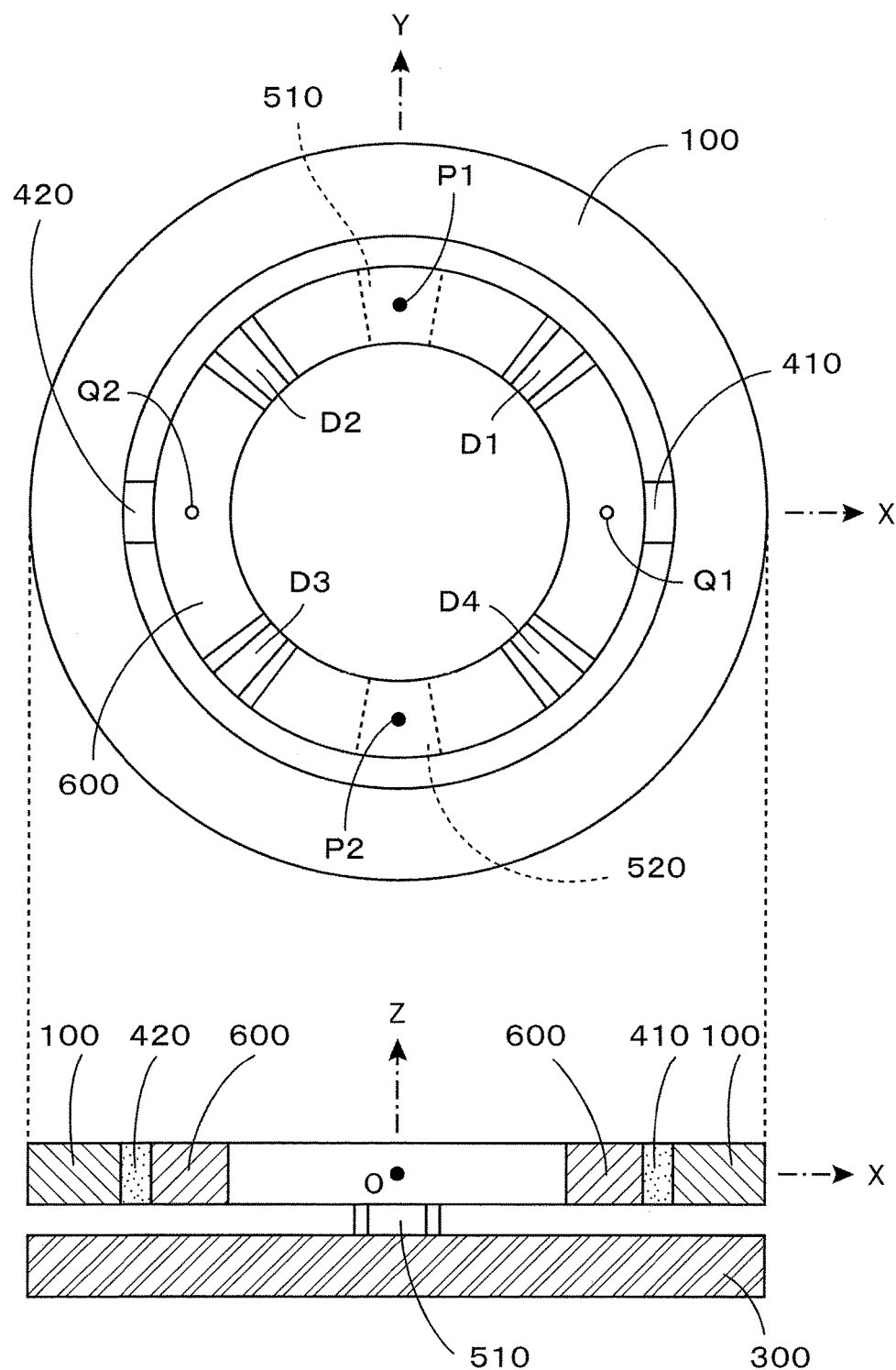
FIG. 16 is a top view (view shown in the upper part of the figure) which shows the basic structure portion of the force sensor according to the First Embodiment of the present invention and a side sectional view (view shown in the lower part of the figure) in which the basic structure portion is cut along the XZ plane.

Next, a description will be given of a structure of the force sensor according to the basic embodiment (First Embodiment) of the present invention. FIG. 16 is a top view (view shown in the upper part of the figure) of a basic structure portion of the force sensor according to this embodiment and a side sectional view (view shown in the lower part of the figure) in which the force sensor is cut along the XZ plane. As shown in the drawing, the basic structure portion is provided with the force receiving body 100, the detection ring 600 and the supporting substrate 300.

As described in detail in Chapter 3-1, the detection ring 600 is a circular annular member having a structure shown in FIG. 13 and provided with four sets of the detection portions D1 to D4. The force receiving body 100 is a circular annular member which is arranged so as to surround an exterior of the detection ring 600. On the other hand, the supporting substrate 300 is, as shown in the side sectional view at the lower part, a circular-disk shaped member which is arranged below the detection ring 600 and the force receiving body 100. A space between an inner circumferential face of the force receiving body 100 and an outer circumferential face of the detection ring 600 is connected by two connection members 410, 420 arranged at positions along the X-axis. And, a space between a lower face of the detection ring 600 and an upper face of the supporting substrate 300 is connected by fixing members 510, 520 arranged at positions along the Y-axis.

When the basic structure portion of the sensor of the prior application shown in FIG. 2 is compared with the basic structure portion of the present invention show in FIG. 16, an essential difference between them is only in that the detection ring 200 of the former is replaced by the detection ring 600 of the latter. Other individual constituents are slightly different in dimension and shape but not essentially different in functions. Therefore, in FIG. 16, the corresponding constituents between them are indicated by the same symbols except for the detection ring. The detection ring 200 shown in FIG. 2 is simply a washer-shaped circular annular structure body, whereas the detection ring 600 shown in FIG. 16 is a circular annular structure body having the detection portions D1 to D4 at four sites. Therefore, when an external force (force or moment) is exerted on the detection ring 600, as described above, deformation concentrates exclusively at the detection portions D1 to D4.

Figure 17:
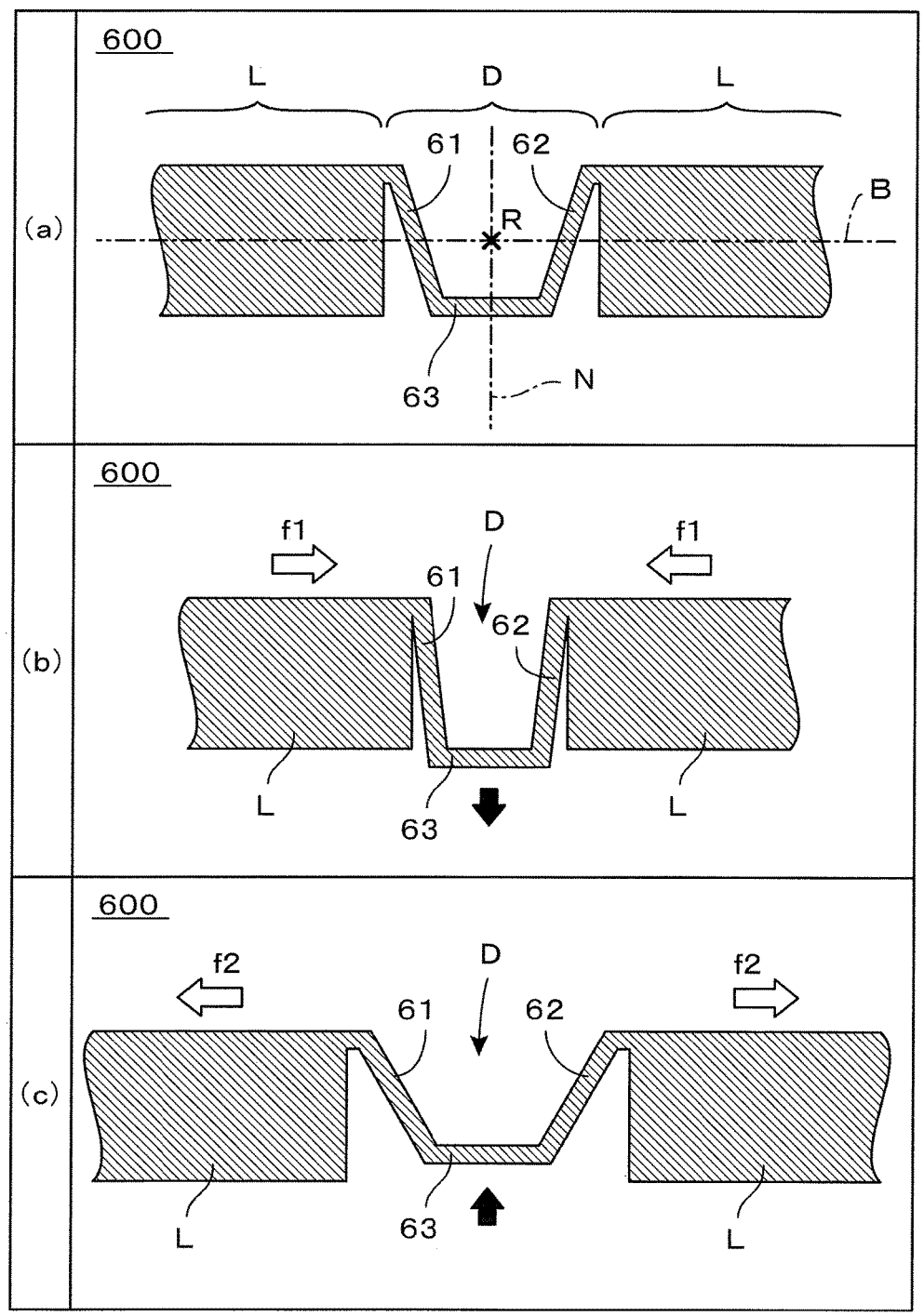
FIG. 17 is a partial sectional view which shows a detailed structure of each of the detection portions D1 to D4 of the detection ring 600 shown in FIG. 13 (indicated by a representative symbol of D).

Thus, hereinafter, a description will be given of a structure of each of the detection portions D1 to D4 and a deformed state thereof. FIG. 17 is a partial sectional view which shows a detailed structure of the detection portions D1 to D4 of the detection ring 600 shown in FIG. 13. Each of four sets of the detection portions D1 to D4 is identical in structure. The detection portion D shown in FIG. 17 is a representative of these four sets of the detection portions D1 to D4, indicating a cross section when the detection ring 600 is cut along a cylindrical face including the basic annular channel B. FIG. 17(a), FIG. 17(b) and FIG. 17(c) show respectively a state that no external force is exerted, a state that a compressive force f1 is exerted on the detection portion D by exertion of an external force, and a state that an extension force f2 is exerted on the detection portion D by exertion of an external force.

As shown in FIG. 17(a), a coupling portion L is positioned on both right and left sides of the detection portion D. The coupling portion L corresponds to any one of four sets of the coupling portions L1 to L4. For example, where the detection portion D shown in FIG. 17(a) is the fourth detection portion D4 shown in FIG. 13, a coupling portion L arranged on the right side thereof corresponds to the coupling portion L1 shown in FIG. 13, and a coupling portion L arranged on the left side thereof corresponds to the coupling portion L4 shown in FIG. 13.

As shown in the drawing, the detection portion D is provided with a first deformation portion 61 which causes elastic deformation by exertion of an external force to be detected, a second deformation portion 62 which causes elastic deformation by exertion of an external force to be detected and a displacement portion 63 which causes displacement by elastic deformation of the first deformation portion 61 and the second deformation portion 62. And, the detection portion D is arranged between an end of the coupling portion L arranged on the left side and an end of the coupling portion L arranged on the right side.

In the case of the example shown here, the first deformation portion 61 is constituted with a first plate-shaped piece which is flexible, the second deformation portion 62 is constituted with a second plate-shaped piece which is flexible, and the displacement portion 63 is constituted with a third plate-shaped piece. Actually, the detection ring 600 is constituted with a structure body which is composed of the same material such as a metal (stainless steel, aluminum) or a synthetic resin (plastic). The first plate-shaped piece 61, the second plate-shaped piece 62 and the displacement portion 63 are plate-shaped members thinner in thickness than the coupling portion L and, therefore, given flexibility.

In the case of the example shown here, the displacement portion 63 is also a thin plate-shaped member and, therefore, given flexibility. However, the displacement portion 63 is not necessarily a flexible member. (As a matter of course, it may be given flexibility). A role of the displacement portion 63 is to cause displacement upon exertion of an external force. In order to cause such displacement, it is sufficient that the first deformation portion 61 and the second deformation portion 62 are flexible. Therefore, the displacement portion 63 is not necessarily constituted with a thin plate-shaped member and may be a member greater in thickness. On the other hand, the coupling portion L may be given some flexibility. It is, however, preferable that the coupling portion L is least likely to undergo deformation in causing effective deformation to the first deformation portion 61 and the second deformation portion 62 by exertion of an external force.

An external end of the first deformation portion 61 is connected to a coupling portion L adjacent thereto, and an internal end of the first deformation portion 61 is connected to the displacement portion 63. Further, an external end of the second deformation portion 62 is connected to a coupling portion L adjacent thereto and an internal end of the second deformation portion 62 is connected to the displacement portion 63. In the case of the example shown in FIG. 17(a), the first deformation portion, the second deformation portion and the displacement portion are constituted respectively by a first plate-shaped piece 61, a second plate-shaped piece 62 and a third plate-shaped piece 63. An external end (left end) of the first plate-shaped piece 61 is connected to a right end portion of the coupling portion L arranged on the left side, an internal end (right end) of the first plate-shaped piece 61 is connected to a left end of the third plate-shaped piece 63, an external end (right end) of the second plate-shaped piece 62 is connected to a left end portion of the coupling portion L arranged on the right side, and an internal end of the second plate-shaped piece 62 is connected to a right end of the third plate-shaped piece 63.

As described above, the detection portion D is arranged at a position of the detection point R which is defined on the basic annular channel B. The normal line N shown in FIG. 17(a) is a normal line which is drawn at a position of the detection point R and orthogonal to a basic plane (XY plane) including the basic annular channel B, and the detection portion D is arranged so that the normal line N is located at the center. Further, in the cross sectional view of FIG. 17(a), the first plate-shaped piece 61 and the second plate-shaped piece 62 are inclined in relation to the normal line N, and also the plate-shaped piece 61 is reversed in inclination direction to the second plate-shaped piece 62, that is, the former is inclined downward to the right, while the latter is inclined upward to the right. In particular, in the case of the example shown in the drawing, a cross sectional shape of the detection portion D is line-symmetrical with the normal line N, and both upper and lower faces of the third plate-shaped piece 63 constitute a face parallel to the XY plane.

As described above, on the cross section including the basic annular channel B, the first plate-shaped piece 61 is reverse to the second plate-shaped piece 62 in inclination direction in relation to the normal line N. Therefore, the third plate-shaped piece 63 (displacement portion) is reversed in displacement direction depending on where a compressive force f1 is exerted in a direction along the basic annular channel B or where an extension force f2 is exerted. As will be described below, this is favorable in detecting a difference by using a plurality of capacitive elements.

That is, as shown in FIG. 17(b), where the compressive force f1 (the open arrow in the drawing) is exerted on the detection portion D in a direction along the basic annular channel B, stress is applied to the detection portion D in a direction which reduces the breadth. Therefore, postures of the first plate-shaped piece 61 and the second plate-shaped piece 62 are changed into a state that they are erected more perpendicularly. As a result, the third plate-shaped piece 63 (displacement portion) undergoes downward displacement as shown by the black arrow in the drawing. On the other hand, as shown in FIG. 17(c), where the extension force f2 (the open arrow in the drawing) is exerted on the detection portion D in a direction along the basic annular channel B, stress is applied to the detection portion D in such a direction that widens the breadth. Therefore, postures of the first plate-shaped piece 61 and the second plate-shaped piece 62 are changed into a state that they are laid more horizontally. As a result, the third plate-shaped piece 63 (displacement portion) undergoes upward displacement as shown by the black arrow in the drawing.

A description has been above given of a deformed state where the compressive force f1 or the extension force f2 is exerted on the detection portion D in a direction along the basic annular channel B. As a matter of course, where an external force is exerted in other directions, there develops a deformed state which is different from that shown in FIG. 17. For example, in FIG. 17(a), when force which causes upward movement is exerted on the coupling portion L on the right side and at the same time, force which causes downward movement is exerted on the coupling portion L on the left side, there develops deformation that is non-symmetrical with the normal line N. However, as will be described below, in the force sensor shown here according to the basic embodiment, in practice, a principle of motions thereof can be sufficiently understood, with only the deformed states shown in FIG. 17 taken into account.

<3-3. Detection Principle by Capacitive Element>

In the basic embodiment of the present invention, displacement of the displacement portion 63 occurring at four sets of the detection portions D1 to D4 is used to detect a direction and magnitude of an exerted external force. And, a capacitive element is used as a detection element for detecting displacement of the displacement portion 63. In other words, the force sensor according to the basic embodiment of the present invention is constituted by adding a capacitive element and a detection circuit to the basic structure portion shown in FIG. 16.

Figure 18:
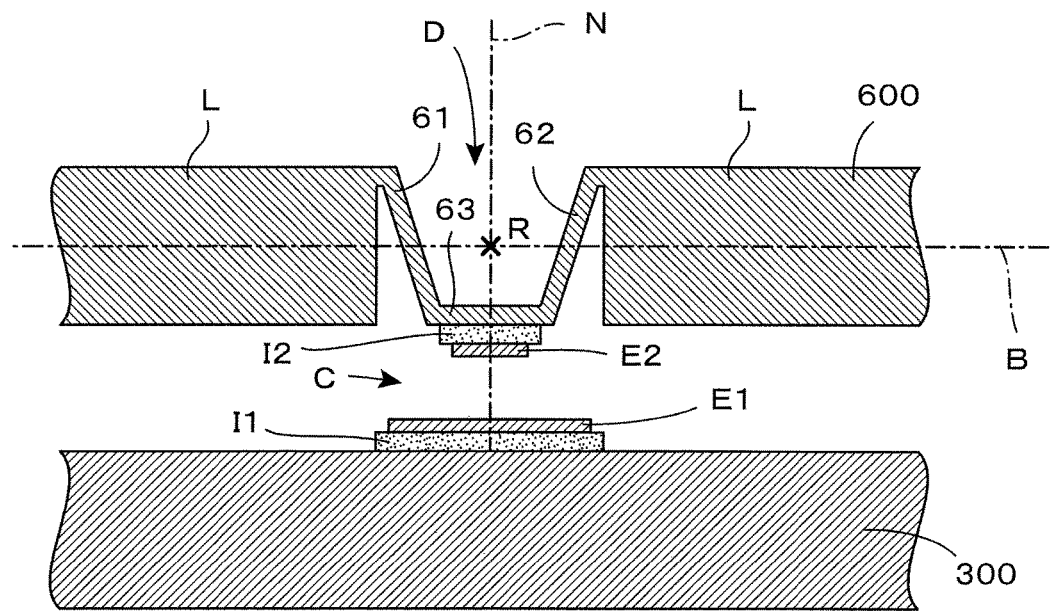
FIG. 18 is a partial sectional view that shows a detailed structure in which electrodes are installed at the detection portions D1 to D4 of the detection ring 600 shown in FIG. 13 (indicated by a representative symbol of D) and at predetermined sites of the supporting substrate 300 which face thereto.

FIG. 18 is a partial sectional view which shows the detection portions D1 to D4 of the detection ring 600 shown in FIG. 13 and a detailed structure in which an electrode is installed at a predetermined site of the supporting substrate 300 facing thereto. In FIG. 18 as well, the detection portion D is a representative of four sets of the detection portions D1 to D4, indicating a cross section obtained when the detection ring 600 is cut along a cylindrical face including the basic annular channel B. That is, a part of the detection ring 600 shown at the upper part of FIG. 18 corresponds to a part of the detection ring 600 shown in FIG. 13 (a).

As described above, in a state that no external force (force or moment) is exerted, both faces of the third plate-shaped piece 63 constitute a face parallel to the XY plane including the basic annular channel B. On the other hand, the supporting substrate 300 is arranged in such a manner that both upper and lower faces thereof are parallel to the XY plane. Therefore, as shown in the drawing, the third plate-shaped piece 63 (displacement portion) is kept parallel to a counter surface of the supporting substrate 300. Further, in the case of the example shown here, a cross sectional shape of the detection portion D is line-symmetrical with the normal line N. Thus, where the compressive force f1 or the extension force f2 shown in FIGS. 17(b) and (c) is exerted, the third plate-shaped piece 63 (displacement portion) undergoes displacement in such a manner as to move in parallel along the vertical direction in the drawing, thereby constantly keeping parallel the third plate-shaped piece 63 (displacement portion) and the counter surface of the supporting substrate 300. As a matter of course, where the third plate-shaped piece 63 undergoes deformation by external forces (f1, f2), the above-described parallel state is not kept. Nevertheless, if a distance between electrodes E1, E2 which will be described below is changed on the basis of the external force (f1, f2), no problem will be posed in detecting motions.

In order to detect displacement of the displacement portion, as shown in the drawing, a fixed electrode E1 is fixed to an upper face of the supporting substrate 300 via an insulation layer I1, and a displacement electrode E2 is fixed to a lower face of the third plate-shaped piece 63 (displacement portion) via an insulation layer I2. The supporting substrate 300 is kept fixed, by which a position of the fixed electrode E1 is fixed. However, displacement occurs at a position of the displacement electrode E2 in association with displacement of the third plate-shaped piece 63 (displacement portion). As shown in the drawing, the fixed electrode E1 and the displacement electrode E2 are arranged at a mutually facing position to constitute a capacitive element C. Here, when the third plate-shaped piece 63 (displacement portion) moves in the vertical direction in the drawing, a distance between the pair of electrodes which constitute the capacitive element C is varied. Therefore, it is possible to detect a displacement direction (upward or downward in the drawing) and a displacement amount of the third plate-shaped piece 63 (displacement portion) on the basis of a capacitance value of the capacitive element C.

Specifically, as shown in FIG. 17 (b), when the compressive force f1 is exerted on the detection portion D, a distance between both the electrodes will contract to increase a capacitance value of the capacitive element C. As shown in FIG. 17(c), when the extension force f2 is exerted on the detection portion D, a distance between the both electrodes will expand to decrease a capacitance value of the capacitive element C. In FIG. 18, there is shown an example in which the capacitive element C is formed at the detection portion D. As a matter of course, actually, the fixed electrode E1 and the displacement electrode E2 are installed at each of four sets of the detection portions D1 to D4 shown in FIG. 13, thereby forming four sets of capacitive elements C1 to C4. A concrete method for detecting individual components of an external force exerted by using these four sets of capacitive elements C1 to C4 will be described in the next Chapter 3-4.

In the example shown in FIG. 18, the displacement electrode E2 is fixed to the third plate-shaped piece 63 (displacement portion) via the insulation layer I2. This is because the detection ring 600 is constituted with a conductive material such as metal. Similarly, the fixed electrode E1 is fixed to the supporting substrate 300 via the insulation layer I1, and this is because the supporting substrate 300 is constituted with a conductive material such as metal. That is, in the case of the basic structure portion shown in FIG. 16, the force receiving body 100, the detection ring 600 and the supporting substrate 300 are all constituted with a conductive material such as metal. Therefore, the displacement electrode E2 is formed on the surface of the displacement portion 63 via the insulation layer I2, and the fixed electrode E1 is formed on the surface of the supporting substrate 300 via the insulation layer I1.

Therefore, where the detection ring 600 (at least, a face on which the displacement electrode E2 is formed) is constituted with an insulating material such as resin, it is not necessary to install the insulation layer I2. Similarly, where the supporting substrate 300 (at least, a face on which the fixed electrode E1 is formed) is constituted with an insulating material such as resin, it is not necessary to install the insulation layer I1.

Further, where the detection ring 600 is constituted with a conductive material such as metal, it is possible to use a part of the domain on the lower face of the detection ring 600 as the displacement electrode E2. For example, in the example shown in FIG. 18, where the detection ring 600 is constituted with a conductive material, the third plate-shaped piece 63 (displacement portion) is given as a conductive plate. Therefore, the detection ring 600 in itself functions as a displacement electrode, thereby eliminating a necessity for separately installing the displacement electrode E2. In this case, an entire surface of the detection ring 600 is electrically equal in potential. However, actually, a part which functions as the displacement electrode E2 of the four sets of capacitive elements C1 to C4 is only a domain facing the four sets of fixed electrodes E1 installed individually. Therefore, each of the four sets of capacitive elements C1 to C4 behaves as an independent capacitive element, thereby giving no theoretical difficulty.

In contrast, where the supporting substrate 300 is constituted with a conductive material such as metal, a part of the domain on the upper face of the supporting substrate 300 can be used as the fixed electrode E1. For example, in the example shown in FIG. 18, where the supporting substrate 300 is constituted with a conductive material, a part of the upper face can function as a fixed electrode, thereby eliminating a necessity for separately installing the fixed electrode E1. In this case, an entire surface of the supporting substrate 300 is electrically equal in potential. However, actually, a part which functions as the fixed electrode E1 of the four sets of capacitive elements C1 to C4 is only a domain facing the four sets of displacement electrodes E2 which are installed individually. Therefore, each of the four sets of capacitive elements C1 to C4 behaves as an independent capacitive element, thereby giving no theoretical difficulty.

As described above, if the detection ring 600 is constituted with a conductive material such as metal or the supporting substrate 300 is constituted with a conductive material such as metal, it is possible to save a step in which the displacement electrode E2 or the fixed electrode E1 is installed individually and to enhance further the production efficiency.

Nevertheless, if the above-described simplified structure is adopted, the detection ring 600 in its entirety or the supporting substrate 300 in its entirety is a common electrode, thereby forming stray capacitance at various parts which are not intended. Therefore, a noise component can be easily mixed with a detection value of electrostatic capacitance, which may reduce the detection accuracy. Therefore, in a force sensor which is required for high-accuracy detection, even where the detection ring 600 and the supporting substrate 300 are constituted with a conductive material, as shown in the example of FIG. 18, it is preferable to install individually the displacement electrode E2 and the fixed electrode E1 via a different insulation layer.

The ease of elastic deformation of the detection portion D is a parameter which influences the detection sensitivity of a sensor. The detection portion D which easily undergoes elastic deformation can be used to realize a sensor which is capable of detecting even a subtle external force and is high in sensitivity. However, a maximum value of a detectable external force will be suppressed. In contrast, the detection portion D which is less likely to undergo elastic deformation can be used to increase a maximum value of a detectable external force. However, the sensitivity is decreased to result in a failure of detecting a subtle external force.

The ease of elastic deformation of the detection portion D is determined depending on a configuration of the first deformation portion 61 (first plate-shaped piece) and that of the second deformation portion 62 (second plate-shaped piece) such as thickness (elastic deformation will occur more easily when the portion is made thinner), width (elastic deformation will occur more easily when the portion is made narrower) and length (elastic deformation will occur more easily when the portion is made longer). The ease thereof is determined also depending on a material thereof. It is also possible to design the detection portion D by a structure in which the displacement portion 63 (third plate-shaped piece) is allowed to undergo elastic deformation. Therefore, in practice, the detection portion D may be appropriately selected for a dimension and a material of individual parts thereof, depending on an application of the force sensor.

As described above, in the drawings of the present application, for the sake of convenience of illustration, various portions are depicted without regard for actual dimensions. For example, in FIG. 18, the fixed electrode E1 and the displacement electrode E2 as well as the insulation layer I1 and the insulation layer I2 are depicted so as to be approximately equal in thickness to each of the plate-shaped pieces 61, 62, 63. Each of these electrodes and the insulation layers can be constituted by vapor deposition or plating, and the thickness can be set in a range of several micrometers. On the contrary, it is preferable that the thickness of each of the plate-shaped pieces 61, 62, 63 is designed to be thicker, with the practical strength taken into account. For example, where constituted with metal, they are preferably set to be about one mm.

On the other hand, the force receiving body 100 and the supporting substrate 300 shown in FIG. 16 are not required to be made with a material which causes elastic deformation in terms of a principle of detecting an external force. Rather, in order that exertion of an external force contributes completely to deformation of the detection ring 600, it is preferable that the force receiving body 100 and the supporting substrate 300 are perfect rigid bodies. In the example shown in the drawing, a reason for using an annular structure body as the force receiving body 100 is not for causing elastic deformation easily but for constituting a thin-type force sensor as a whole by arranging the force receiving body 100 outside the detection ring 600.

That is, in the case of the basic embodiment shown in FIG. 16, each of the force receiving body 100, the detection ring 600 and the supporting substrate 300 can be constituted with a flat structure body thin in thickness in the direction of the Z-axis. Further, adopted is a structure in which the force receiving body 100 is arranged outside the detection ring 600, thus making it possible to design a sensor which is short in axis length thereof in its entirety (length in the direction of the Z-axis). Further, in the case of the basic embodiment shown in FIG. 16, it is sufficient that the displacement electrodes E2 are all arranged on the lower face of the detection ring 600 (lower faces of the respective displacement portions 63 of four sets of detection portions D1 to D4), by which enhanced production efficiency can be expected.

This effect can be easily understood by comparison with a constitution of capacitive elements in the force sensor of the prior application as shown in FIG. 12. In the force sensor of the prior application shown in FIG. 12, four sets of capacitive elements are constituted with displacement electrodes E21 to E24 formed on an inner circumferential face of the detection ring 200 and fixed electrodes E11 to E14 formed on an outer circumferential face of the fixation assisting body 350. Four sets of capacitive elements are additionally constituted with displacement electrodes E25 to E28 formed on a lower face of the detection ring 200 and fixed electrodes E15 to E18 formed on an upper face of the supporting substrate 300.

As described above, in order to form both electrodes along a horizontal face and electrodes along a perpendicular face, there is accordingly needed a certain time-consuming step. A great workload is also needed in adjusting positions thereof, inevitably resulting in reduction in production efficiency. For example, only if the central axis of the fixation assisting body 350 slightly deviates from the Z-axis, will positions of the fixed electrodes E11 to E14 vary, causing a difference in capacitance values of the capacitive elements. As a matter of course, this is also true where the central axis of the detection ring 200 slightly deviates from the Z-axis.

Therefore, in a production process of the force sensor of the prior application, it is necessary to align the center axes at high accuracy upon attachment of the fixation assisting body 350 and the detection ring 200.

In contrast, in the case of the force sensor in which the basic structure portion shown in FIG. 16 is used, the displacement electrode E2 may be individually formed on a lower face of each displacement portion 63 of four sets of detection portions D1 to D4, and the fixed electrode E1 may be individually formed at a position facing thereto on the supporting substrate 300. Any of the electrodes are electrodes along a horizontal face, and they can be controlled accurately for thickness by using a generally conducted film-forming step. Further, none of the electrodes is required for a strictly accurate formation position in the horizontal direction. Still further, an interval between the displacement electrode E2 and the fixed electrode E1 facing thereto is regulated by the height of the fixing members 510, 520, thereby easily securing the positional accuracy of each of the electrodes in the perpendicular direction. Therefore, such adjustment can be easily attained even on commercial mass-production that a counter electrode is made parallel to each capacitive element and an electrode interval is also made equal to each other in the plurality of capacitive elements. Due to the above-described reasons, the force sensor according to the basic embodiment which is described here is able to secure high production efficiency.

In the case of the example shown in FIG. 18, the size of the fixed electrode E1 (planar size, that is, occupation area of a projection image on the XY plane) is designed to be larger than the size of the displacement electrode E2 (planar size, that is, occupation area of a projection image on the XY plane). This is due to consideration that even if the displacement electrode E2 undergoes displacement in a lateral direction in the drawing or in a direction perpendicular to the sheet surface in the drawing (direction along the XY plane), there is made no change in area of the displacement electrode E2 facing the fixed electrode E1. In other words, even if the displacement electrode E2 undergoes displacement in any direction of the three dimensions, the capacitive element C is always kept constant in effective area, as long as the positional relationship of both the electrodes is kept parallel to each other.

Figure 19:
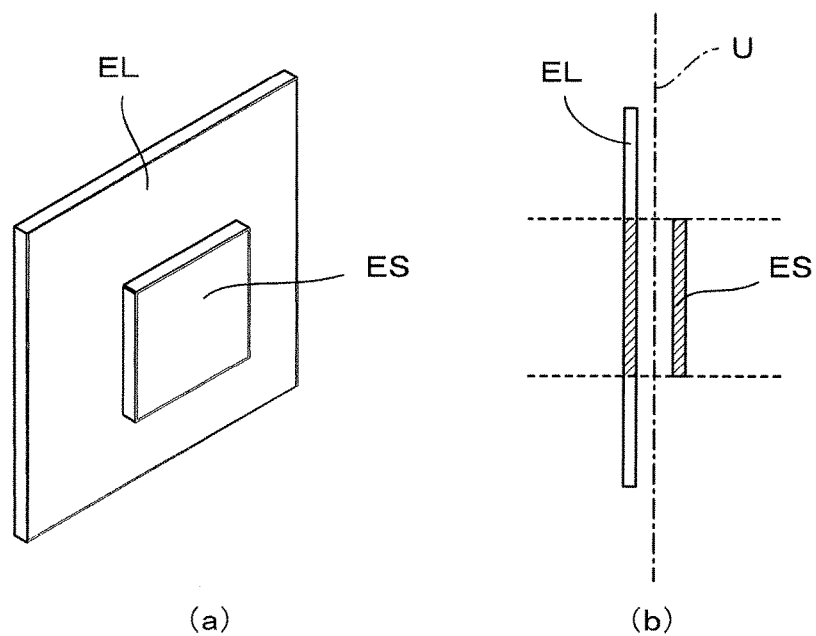
FIG. 19 is a drawing which shows a principle of keeping constant an effective area of the capacitive element even when a relative position of a displacement electrode in relation to a fixed electrode is changed.

FIG. 19 is a drawing which shows a principle that even where a relative position of the displacement electrode E2 to the fixed electrode E1 is changed as described above, the capacitive element C is kept constant in effective area. Now, consideration is given to a case that a pair of electrodes EL, ES are arranged so as to face each other, as shown in FIG. 19(*a*). The electrodes EL, ES are both arranged so as to be parallel to each other, with a predetermined interval kept, thereby constituting a capacitive element. However, the electrode EL is larger in area than the electrode ES. Where a contour of the electrode ES is projected on the surface of the electrode EL to form an orthographic projection image, a projection image of the electrode ES is included completely within the surface of the electrode EL. In this case, an effective area as a capacitive element is an area of the electrode ES.

FIG. 19(*b*) is a side view of the pair of electrodes ES, EL shown in FIG. 19(*a*). In the drawing, a domain to which hatching is given is a part which functions as an actual capacitive element. And, an effective area as the capacitive element is an area of the electrode to which this hatching is given (that is, an area of the electrode ES).

Now, a perpendicular face U indicated by the alternate long and short dashed line is assumed to be formed in the drawing. Each of the electrodes ES, EL is arranged so as to be parallel to the perpendicular face U. Here, if the electrode ES is moved upward in a perpendicular direction along the perpendicular face U, a part of the electrode EL facing thereto moves upward, with no change in area of the part facing thereto. Even if the electrode ES is moved downward or moved in a depth direction or in a forward direction on the sheet surface, there is still found no change in area of the part of the electrode EL facing thereto.

In brief, where the contour of the electrode ES smaller in area is projected on the surface of the electrode EL larger in area to form an orthographic projection image, an effective area of the capacitive element constituted with the both electrodes is equal to an area of the electrode ES and always constant, as long as there is kept such a state that a projection image of the electrode ES is completely included within the surface of the electrode EL.

Therefore, where a relationship between the displacement electrode E2 and the fixed electrode E1 shown in FIG. 18 is similar to that between the electrode ES and the electrode EL shown in FIG. 19 and even if the displacement electrode E2 undergoes displacement in any direction by exertion of an external force, the pair of electrodes which constitute the capacitive element C is kept constant in effective facing area, as long as the displacement electrode E2 is kept parallel to the fixed electrode E1. This denotes that a change in capacitance value of the capacitive element C is exclusively caused depending on a distance between the displacement electrode E2 and the fixed electrode E1. In other words, a change in capacitance value of the capacitive element C is caused by only depending on displacement of the displacement portion 63 in a direction along the normal line N, denoting that the change does not depend on displacement in a direction orthogonal to the normal line N. This is helpful in accurately detecting an external force exerted on the basis of the above-described principle.

As described above, in the embodiment in which a capacitive element is used as a detection element, it is preferable that, of the fixed electrode E1 and the displacement electrode E2, one of them is set to be larger in area than the other of them so that the pair of electrodes which constitute the capacitive element C will not be changed in effective facing area, even where a predetermined external force is exerted on the detection ring 600 to result in parallel movement of the displacement electrode E2 to the fixed electrode E1. In FIG. 19, there is shown an example in which a rectangular electrode is used as two sheets of the electrodes EL, ES. However, the displacement electrode E2 and the fixed electrode E1 used in the force sensor according to the present invention may be formed in any shape, and, for example, a circular electrode may be used.

<3-4. Concrete Detection Method for Individual Components of External Force>

Next, consideration is given to motions of the force sensor which uses the basic structure portion shown in FIG. 16, where force Fx, Fy, Fz in the direction of each coordinate axis and moment Mx, My, Mz around each coordinate axis are exerted on the force receiving body 100 in a state that the supporting substrate 300 is fixed. As shown in the example of FIG. 18, the displacement electrode E2 is arranged on a lower face of each of the detection portions D (lower face of the displacement portion 63), and the fixed electrode E1 is arranged at a part facing thereto on the upper face of the supporting substrate 300. Then, the capacitive element C is constituted with the pair of electrodes E1, E2. Thus, here, capacitive elements formed by four sets of the detection portions D1 to D4 are respectively termed the capacitive elements C1 to C4, and capacitance values of these capacitive elements C1 to C4 are expressed by the same symbols of C1 to C4.

The table of FIG. 20 shows a variation amount (extent of increase and decrease) of capacitance values of the individual capacitive elements C1 to C4 upon exertion of external forces Fx, Fy, Fz, Mx, My, Mz on the force receiving body 100. In this table, [+] indicates an increase in capacitance value (decrease in electrode interval of the capacitive element C) and [−] indicates a decrease in capacitance value (increase in electrode interval of the capacitive element C). Further, [++] indicates that an increased extent of the capacitance value is greater than [+], and [(+)] indicates that an increased extent of the capacitance value is smaller than [+]. Similarly, [−−] indicates that a decreased extent of the capacitance value is greater than [−] and [(−)] indicates that an decreased extent of the capacitance value is smaller than [−].

Nevertheless, an absolute value of increase and decrease in individual capacitance values is actually an amount which depends on dimensions and thicknesses of individual portions of the detection ring 600, in particular, dimensions and thicknesses of the plate-shaped pieces 61, 62, 63 which constitute the detection portion D. Therefore, a difference in [(+)], [+], [++] and a difference in [(−)], [−], [−−] in the table shown in the present application are thoroughly relative. In particular, forces, Fx, Fy, Fz (unit: N) are different from moments Mx, My, Mz (unit: N·m) in physical quantity, and it is impossible to make a direct comparison between them.

The table of FIG. 20 is prepared on the basis of measured values where force with the same magnitude is applied to an outer circumference of the force receiving body 100 in individual directions (directions at which external forces of Fx, Fy, Fz, Mx, My, Mz are exerted). Therefore, a value of moment is to be converted as a value obtained by multiplying force applied to the outer circumference of the force receiving body 100 by a radius of the outer circumference of the force receiving body 100. The table of FIG. 20 shows that on the basis of the conversion value, where an absolute value is less than 5, it is indicated by [(+)], [(−)], where an absolute value is from 5 or more to less than 50, it is indicated by [+], [−], and where an absolute value is 50 or more, it is indicated by [++], [−−].

The fact that the results shown in the table of FIG. 20 are obtained will be understood by recognizing what kind of stress is exerted on a position of each of the detection portions D1 to D4 of the detection ring 600 shown in FIG. 16 with reference to deformed states of the detection ring 200 in the force sensor of the prior application shown in FIG. 4 to FIG. 7 and considering a displacement direction of the displacement portion 63 shown in FIG. 17. The detection ring 200 and the detection ring 600 are different in a structure portion of each of the detection portions D1 to D4 but common in that they are both a circular annular ring and undergo deformation upon exertion of an external force on the exertion points Q1, Q2 on the X-axis in a state that the fixing points P1, P2 on the Y-axis are fixed. Therefore, stress applied to a position of each of the detection portions D1 to D4 of the detection ring 600 is similar to stress which is applied to corresponding positions of the detection ring 200 shown in FIG. 4 to FIG. 7.

For example, when force +Fx in the positive direction of the X-axis is exerted on the force receiving body 100, the detection ring 200 undergoes deformation, as shown in FIG. 4, and an extension force f2 is exerted between the points P1 and Q1 as well as between the points P2 and Q1, and a compressive force f1 is exerted between the points P1 and Q2 as well as between the points P2 and Q2. Therefore, in the case of the detection ring 600 shown in FIG. 16, the extension force f2 is exerted on the detection portions D1, D4, thereby, as shown in FIG. 17(c), the displacement portion 63 moves upward to decrease the capacitance values C1, C4. On the other hand, the compressive force f1 is exerted on the detection portions D2, D3, thereby, as shown in FIG. 17(b), the displacement portion 63 moves downward to increase the capacitance values C2, C3. Individual fields of the row of Fx in the table of FIG. 20 show the above-described results.

Similarly, when force +Fy in the positive direction of the Y-axis is exerted on the force receiving body 100, the compressive force f1 is exerted between the points P1 and Q1 as well as between the points P1 and Q2, and the extension force f2 is exerted between the points P2 and Q1 as well as the points P2 and Q2. Therefore, in the case of the detection ring 600 shown in FIG. 16, the compressive force f1 is exerted on the detection portions D1, D2, by which the capacitance values C1, C2 are increased. On the other hand, the extension force f2 is exerted on the detection portions D3, D4, by which the capacitance values C3, C4 are decreased. Individual fields of the row of Fy in the table of FIG. 20 show the above-described results.

Further, when force +Fz in the positive direction of the Z-axis is exerted on the force receiving body 100, the detection ring 200 undergoes deformation, as shown in FIG. 5. Therefore, in the case of the detection ring 600 shown in FIG. 16, each of the four sets of detection portions D1 to D4 moves upward (in the positive direction of the Z-axis). Thus, an electrode interval of each of the four sets of capacitive elements C1 to C4 expands, by which the capacitance values C1 to C4 are decreased. Individual fields of the row of Fz in the table of FIG. 20 show the above-described results. Since the fixing points P1, P2 are not varied in position, the detection portions D1 to D4 are inclined to some extent in relation to the XY plane, by which a pair of electrodes which constitute each of the capacitive elements C1 to C4 are not parallel to each other. Therefore, the pair of electrodes are slightly varied in effective facing area. The capacitance values C1 to C4 are mainly influenced by variation in electrode distance.

On the other hand, when moment +My which is positive rotation around the Y-axis is exerted on the force receiving body 100, the detection ring 200 undergoes deformation, as shown in FIG. 6, and the right half of the drawing undergoes downward displacement, while the left half of the drawing undergoes upward displacement. Therefore, in the case of the detection ring 600 shown in FIG. 16, the detection portions D1, D4 positioned at the right half of the drawing undergo downward displacement, while the detection portions D2, D3 positioned at the left half of the drawing undergo upward displacement. Therefore, the capacitive elements C1, C4 are decreased in electrode interval to result in an increase in capacitance values C1, C4. Further, the capacitive elements C2, C3 are increased in electrode interval to result in a decrease in capacitance values C2, C3. Individual fields of the row of My in the table of FIG. 20 show the above-described results.

Similarly, when moment +Mx which is positive rotation around the X-axis is exerted on the force receiving body 100, in the case of the detection ring 600 shown in FIG. 16, the detection portions D3, D4 positioned at the lower half of the drawing undergo downward displacement, while the detection portions D1, D2 positioned at the upper half of the drawing undergo upward displacement. Therefore, the capacitive elements C3, C4 are decreased in electrode interval to result in an increase in capacitance values C3, C4. Further, the capacitive elements C1, C2 are increased in electrode interval to result in a decrease in capacitance values C1, C2. Individual fields of the row of Mx in the table of FIG. 20 show the above-described results.

Upon exertion of moments +Mx and +My, the detection portions D1 to D4 are slightly inclined to the XY plane, and a pair of electrodes which constitute each of the capacitive elements C1 to C4 are not parallel to each other. Therefore, the pair of electrodes are slightly varied in effective facing area. However, the capacitance values C1 to C4 are mainly influenced by variation in distance between electrodes.

Lastly, when moment +Mz which is positive rotation around the Z-axis is exerted on the force receiving body 100, the detection ring 200 undergoes deformation as shown in FIG. 7. The compressive force f1 is exerted between the points P1 and Q1 as well as the points between P2 and Q2, while the extension force f2 is exerted between the points P1 and Q2 as well as between the points P2 and Q1. Therefore, in the case of the detection ring 600 shown in FIG. 16, the compressive force f1 is exerted on the detection portions D1 and D3 to result in an increase in capacitance values C1, C3. On the other hand, the extension force f2 is exerted on the detection portion D2, D4 to result in a decrease in capacitance values C2, C4. Individual fields of the row of Mz in the table of FIG. 20 show the above-described results.

In the table of FIG. 20, the row of Fx and the row of Fy are [(+)] or [(−)] in each of the fields, and this is because where Fx and Fy are exerted, a displacement amount occurring at the displacement portion 63 of each of the detection portions D1 to D4 is smaller than a case where Fz and Mz are exerted. On the other hand, the row of Mx and the row of My are [++] or [−−] in each of the fields, and this is because where Mx and My are exerted, as shown in FIG. 6, the detection ring is significantly inclined and the displacement electrode E2 undergoes displacement to a great extent.

The table of FIG. 20 shows the results where force in the positive direction and moment which is positive rotation are exerted. Where force in the negative direction and moment which is negative rotation are exerted, obtained are such results that [+] and [−] are reversed.

In the force sensor according to the basic embodiment (First Embodiment) of the present invention, four sets of capacitive elements C1 to C4 (four sets of displacement electrodes and four sets of fixed electrodes) and a detection circuit are added to the basic structure portion shown in FIG. 16. This force sensor has functions to detect electrically a change in capacitance value of each of the capacitive elements C1 to C4 arranged at each of the detection portions D1 to D4 to measure displacement at a specific site, thereby detecting a direction and magnitude of the exerted force and moment. Here, there are shown a principle of detecting force and moment in each coordinate axis by the force sensor and one example of the concrete detection circuit.

As described above, in the force sensor, where external forces, Fx, Fy, Fz, Mx, My, Mz are applied to the force receiving body 100, each of the capacitive elements C1 to C4 is varied in capacitance value as shown in the table of FIG. 20. Here, [(+)] and [(−)] are smaller in variation amount than [+] and [−] and, therefore, they are to be approximately handled as zero. Then, the table of FIG. 20 can be replaced approximately by the table of FIG. 21. On the premise of the table of FIG. 21, four axis components Fz, Mx, My, Mz of external forces exerted on the force receiving body 100, can be calculated by the arithmetic expression shown in FIG. 22.

First, it will be understood that by referring to individual fields of the row of Fz in the table of FIG. 21, Fz in the direction of the Z-axis can be obtained by operation of Fz=−(C1+C2+C3+C4). It is also found that axis components other than Fz are offset by each other, even if they would be present, by the use of this arithmetic expression. For example, the results of fields of the rows of Mx, My, Mz are individually calculated by being substituted in the above-described arithmetic expression to obtain such a result of Fz=0 in each case. Therefore, the value Fz obtained by the arithmetic expression is a value which indicates only a force component Fz in the direction of the Z-axis which is free of other axis components. This is because a structure of each of the detection portions D1 to D4 and a structure of each of the capacitive elements C1 to C4 are symmetrical with both the XZ plane and the YZ plane.

Then, it will be understood that moment Mx around the X-axis can be obtained by operation of Mx=−C1−C2+C3+C4 by referring to individual fields of the row of Mx in the table of FIG. 21. Similarly, moment My around the Y-axis is obtained by operation of My=+C1−C2−C3+C4 by referring to individual fields of the row of My in the table of FIG. 21. Moment Mz around the Z-axis is obtained by operation of Mz=+C1−C2+C3−C4 by referring to individual fields of the row of Mz in the table of FIG. 21. In any of these arithmetic expressions, other axis components are offset by each other, thereby providing only a component which is free of other axis components.

Accordingly, the four arithmetic expressions shown in FIG. 22 can be used to detect values of four axis components, Fz, Mx, My, Mz without interference with other axis components. As a matter of course, the table of FIG. 21 has been obtained by approximation in which fields of [(+)] and [(−)] in the table of FIG. 20 are made zero and, therefore, actually, other axis components are mixed slightly as a detection error. However, in a force sensor which is used in an application where this error is within an allowable range, no problem is posed in practice.

FIG. 23 is a circuit diagram which shows one example of a detection circuit that outputs electric signals indicating four axis components of force Fz and moments Mx, My, Mz on the basis of the arithmetic expressions shown in FIG. 22. The capacitive elements C1 to C4 shown in the circuit diagram are the capacitive elements C1 to C4 installed in each of the detection portions D1 to D4. Each of the capacitive elements C1 to C4 is constituted with a fixed electrode E1 and a displacement electrode E2 (refer to FIG. 18). In this circuit, the four sets of fixed electrodes E1 are connected to each other to give a common ground potential, and the four sets of displacement electrodes E2 are to give each electrode which is electrically independent. Therefore, in the circuit diagram of FIG. 23, any of the fixed electrodes are indicated by the same symbol E1, and the displacement electrodes are indicated by individually different symbols of E2(D1), E2(D2), E2(D3), E2(D4). In contrast, the four sets of displacement electrodes E2 may be connected to each other, thereby giving the four sets of fixed electrodes E1 as electrodes which are electrically independent of each other.

C/V conversion circuits 11 to 14 are circuits for converting capacitance values C1 to C4 of the capacitive elements C1 to C4 respectively into voltage values V1 to V4, and the voltage values V1 to V4 after conversion are made into values corresponding respectively to the capacitance values C1 to C4. Adder/subtractor computing elements 15 to 18 have functions to perform operation on the basis of the arithmetic expressions respectively shown in FIG. 22, thereby outputting the results to output terminals T1 to T4. Thus, voltage values corresponding to four axis components Fz, Mx, My, Mz are output to the output terminals T1 to T4.

As a matter of course, in place of the adder/subtractor computing elements 15 to 18, a microprocessor may be used to perform operation.

Accordingly, the capacitive element C shown in FIG. 18 is added to a position of each of the four sets of detection portions D1 to D4 at the basic structure portion shown in FIG. 16 and the detection circuit shown in FIG. 23 is also provided, thus making it possible to realize a force sensor capable of detecting four axis components, Fz, Mx, My, Mz. Here, any of the four sets of capacitive elements (detection elements) can be constituted with the displacement electrode E2 formed on the lower face of the detection ring 600 (the lower face of the displacement portion 63) and the fixed electrode E1 formed on the upper face of the supporting substrate 300, thereby simplifying a production process.

Further, an electrode distance between one pair of electrodes (the fixed electrode E1 and the displacement electrode E2) which constitute each of the capacitive elements C1 to C4 is regulated by height dimensions of the fixing members 510, 520 shown in FIG. 16, thereby easily securing sufficient accuracy. A necessity of complicated work for adjusting an interval between electrodes can be, therefore, eliminated, making it possible to secure high production efficiency, even on commercial mass-production.

As a matter of course, the force sensor is unable to detect Fx, Fy. As described above, detection is conducted on the basis of the approximate table shown in FIG. 21, resulting in a slight mixture of other axis components. However, in an application where detection of four axis components, Fz, Mx, My, Mz or some of them is sufficient and an error based on the above-described approximation is within an allowable range, this force sensor can be used sufficiently in industries. A force sensor capable of detecting all six-axis components, Fx, Fy, Fz, Mx, My, Mz and a force sensor capable of obtaining more accurate detection values will be described as another embodiment in Chapter 5 and thereafter.

Chapter 4. Essential Characteristics of Force Sensor According to the Present Invention The force sensor according to the present invention is a force sensor which detects force or moment at least on one axis, among force in the direction of each coordinate axis and moment around each coordinate axis in an XYZ three-dimensional orthogonal coordinate system. The force sensor according to the basic embodiment described in Chapter 3 is one example thereof and has functions to detect four axis components Fz, Mx, My, Mz. Here, a description will be given of essential characteristics of the force sensor according to the present invention by referring to the force sensor described in Chapter 3.

The force sensor according to the present invention is provided with a force receiving body on which exerted force or moment to be detected, a detection ring which is structured so that at least a part thereof undergoes elastic deformation and a supporting body which supports the detection ring. It has functions to detect exerted force or moment on the other of them in a state that loads are applied to one of the force receiving body and the supporting body. In the case of the basic embodiment described in Chapter 3, the supporting substrate 300 is used as a supporting body. The supporting body is not necessarily a substrate-shaped structure body but may be a member formed in any shape. Further, the force receiving body 100 is not necessarily formed in a circular annular member but may be a member formed in any given shape.

Nevertheless, where such a mode is adopted that the plate-shaped supporting substrate 300 is used as a supporting body, other members are arranged above the supporting substrate 300 and the force receiving body 100 is an annular member and arranged outside the detection ring 600, it is possible to realize a thin-type sensor as a whole. In making the sensor thin, it is preferable that the supporting substrate 300 is used as a supporting body and the force receiving body 100 is an annular member.

The detection ring 600 is a constituent which plays the most important role in the present invention and provided with an annular structure which extends along a predetermined basic annular channel B. Detection points R are defined on the basic annular channel B. In the case of the detection ring 600 shown in FIG. 13, four detection points R1 to R4 are defined on the basic annular channel B as shown in FIG. 15. The detection ring 600 is, as shown in FIG. 14, provided with detection portions D1 to D4 positioned respectively on detection points R1 to R4 and coupling portions L1 to L4 positioned on both sides of each detection portion.

As shown in FIG. 16, there are installed connection members 410, 420 which connect the force receiving body 100 to positions of exertion points Q1, Q2 of the detection ring 600 and fixing members 510, 520 which fix positions of fixing points P1, P2 of the detection ring 600 to the supporting body (supporting substrate 300). Here, each of the exertion points Q1, Q2 and each of the fixing points P1, P2 are arranged at mutually different positions of the coupling portions L1 to L4.

The detection portions D1 to D4 are each structured so that when force is exerted between the exertion points Q1, Q2 and the fixing points P1, P2, at least a part thereof causes elastic deformation on the basis of the exerted force. The detection portion D shown in FIG. 17 is constituted with three plate-shaped pieces 61, 62, 63, each of which is an elastic-deformation causing member. However, for example, the displacement portion 63 may be increased in thickness to give a member which will not cause elastic deformation.

The force sensor according to the present invention is additionally provided with a detection element which detects elastic deformation occurring at the detection portions D1 to D4 and a detection circuit that outputs an electric signal which indicates force or moment exerted on one of the force receiving body 100 and the supporting body (supporting substrate 300) on the basis of results detected by the detection element in a state that loads are applied to the other of them.

In the case of the basic embodiment described in Chapter 3, as shown in FIG. 18, the detection element is constituted with the capacitive element C having a displacement electrode E2 fixed at a predetermined site of the detection portion D and a fixed electrode E1 fixed at a position facing the displacement electrode E2 of the supporting body (the supporting substrate 300). Here, the displacement electrode E2 is arranged at a position where displacement is caused against the fixed electrode E1 on the basis of elastic deformation occurring at the detection portion D (specifically, the lower face of the displacement portion 63 in the case of the example shown in FIG. 18). Then, as shown in the example of FIG. 23, the detection circuit outputs an electric signal which indicates force or moment exerted on the basis of variation in capacitance values of individual capacitive elements C1 to C4.

In the basic embodiment described in Chapter 3, for the sake of convenience, a description has been given that there is detected exerted force or moment on the force receiving body 100 in a state that the supporting substrate 300 (supporting body) is fixed. In contrast, if there is detected exerted force or moment on the supporting substrate 300 (supporting body) in a state that the force receiving body 100 is fixed, the principle of motions thereof is the same due to a law of action and reaction.

In the present application, for the sake of convenience, one of them is termed a supporting body (the supporting substrate 300) and the other of them is termed the force receiving body 100. A description will be given of only detection motions for detecting force or moment applied to the force receiving body in a state that the supporting body is fixed. Even if the supporting body is replaced by the force receiving body, no difference is found in terms of a detection principle. Therefore, for example, in the basic structure portion shown in FIG. 16, even if the circular annular member 100 is interpreted as a supporting body and the substrate-shaped member 300 is interpreted as a force receiving body, there is found no difference in the principle of motions of the force sensor (in this case, the points P1, P2 are exertion points, while the points Q1, Q2 are fixing points).

In the example shown in FIG. 16, the detection ring 600 is provided with a circular annular structure which extends along the basic annular channel B positioned on the XY plane, with the Z-axis given as the central axis, when the XY plane is taken on a horizontal face and the Z-axis is given as an axis moving perpendicularly upward. Then, the supporting body is constituted with the supporting substrate 300 which is arranged below the detection ring 600, with a predetermined interval kept. Where the above-described arrangement is adopted, individual displacement electrodes E2 are fixed on lower faces of the detection portions D1 to D4 and individual fixed electrodes E1 are fixed to an upper face of the supporting substrate 300, thereby constituting the capacitive elements C1 to C4. It is, therefore, possible to facilitate work for adjusting electrode intervals and also enhance production efficiency.

Further, in the basic embodiment, as shown in FIG. 17, the detection portion D is provided with a first deformation portion 61 and a second deformation portion 62, each of which undergoes elastic deformation upon exertion of force or moment to be detected, and a displacement portion 63 which undergoes displacement by elastic deformation of the first deformation portion 61 and the second deformation portion 62. Here, an external end of the first deformation portion 61 is connected to a coupling portion L adjacent thereto and an internal end thereof is connected to the displacement portion 63. Still further, an external end of the second deformation portion 62 is connected to a coupling portion L adjacent thereto, and an internal end thereof is connected to the displacement portion 63. Therefore, the lower face of the displacement portion 63 is a face parallel to the upper face of the supporting substrate 300. As shown in the example of FIG. 18, the displacement electrode E2 is formed on the lower face of the displacement portion 63 and the fixed substrate E1 is formed on the upper face of the supporting substrate 300, thus making it possible to constitute a capacitive element C composed of a pair of parallel electrodes.

Since four sets of detection portions D1 to D4 are installed on the detection ring 600 shown in FIG. 13, a total of four sets of capacitive elements C1 to C4 (detection elements) are to be formed, as described above. However, in carrying out the present invention, a number n of detection portions D are not necessarily restricted to four. It will be sufficient that at least one set of detection portion D is installed.

Nevertheless, only one set of detection portion D limits an axis component to be detected, resulting in a failure of attaining sufficient detection accuracy. In practice, it is preferable that a number n of detection portions D (that is, the number n of detection points R), is set to be equal to or more than 2, thereby installing the plurality of detection portions D. In other words, it is preferable that n number (n is equal to or more than 2) of plural detection points R1, R2, . . . Rn are defined on the basic annular channel B to arrange a detection portion at each of the detection points, by which n number of detection portions D1, D2, . . . Dn and n number of coupling portions L1, L2, . . . Ln are alternately arranged along the basic annular channel B to constitute the detection ring.

It is also preferable in practice that n number of detection portions D are set to be even-numbered, n even-numbered detection points are defined on the basic annular channel B, a detection portion is arranged at each of the detection points, and n even-numbered detection portions and n even-numbered coupling portions are alternately arranged along the basic annular channel B, thereby constituting the detection ring. This is because the detection portions with the n even numbers are installed, by which a basic structure portion symmetrical with both the XZ plane and the YZ plane in an XYZ three-dimensional orthogonal coordinate system can be constituted to provide such an advantage that interference with other axis components is eliminated to simplify operation processing performed by the detection circuit.

In this case, it is preferable that when n even number of coupling portions are numbered sequentially from a predetermined starting point along the basic annular channel B, the exertion points Q1, Q2 . . . are arranged at odd-numbered coupling portions, and the fixing points P1, P2 . . . are arranged at even-numbered coupling portions. Thereby, an external force exerted on each of the exertion points Q can be transmitted efficiently to each of the detection portions D in a state that each of the fixing points P is fixed, thereby realizing efficient detection motions.

For example, when n number of the detection points R are set so that n is equal to 2, it is possible to constitute the detection ring by arranging in the order of a first coupling portion L1, a first detection portion D1, a second coupling portion L2 and a second detection portion D2 along the basic annular channel B. In this case, the exertion point Q1 may be arranged at the first coupling portion L1, and the fixing point P1 may be arranged at the second coupling portion L2.

The force sensor according to the basic embodiment described in Chapter 3 is a more practical example in which n number of the detection points R are set so that n is equal to 4. That is, as shown in FIG. 15, where the V-axis is defined as a coordinate axis in which the X-axis is rotated counter-clockwise by 45 degrees around the origin O and the W-axis is defined as a coordinate axis in which the Y-axis is rotated counter-clockwise by 45 degrees around the origin O on the XY plane, the first detection point R1, the second detection point R2, the third detection point R3 and the fourth detection point R4 are arranged respectively on the positive V-axis, the positive W-axis, the negative V-axis and the negative W-axis.

As a result, as shown in FIG. 14, the four sets of detection portions D1 to D4 are to be arranged on the V-axis or the W-axis. Then, the detection ring 600 is constituted by arranging counter-clockwise in the order of the first coupling portion L1, the first detection portion D1, the second coupling portion L2, the second detection portion D2, the third coupling portion L3, the third detection portion D3, the fourth coupling portion L4 and the fourth detection portion D4 along the basic annular channel B.

Further, as shown in FIG. 15, the first exertion point Q1 is arranged on the positive X-axis (the first coupling portion L1), the second exertion point Q2 is arranged on the negative X-axis (the third coupling portion L3), the first fixing point P1 is arranged on the positive Y-axis (the second coupling portion L2) and the second fixing point P2 is arranged on the negative Y-axis (the fourth coupling portion L4). In other words, the exertion points, Q1, Q2 are arranged at odd-numbered coupling portions, while the fixing points P1, P2 are arranged at even-numbered coupling portions.

Then, in the basic structure portion shown in FIG. 16, there are installed a first connection member 410 which connects a position of the first exertion point Q1 of the detection ring 600 to the force receiving body 100, a second connection member 420 which connects a position of the second exertion point Q2 of the detection ring 600 to the force receiving body 100, a first fixing member 510 which fixes a position of the first fixing point P1 of the detection ring 600 to the supporting substrate 300, and a second fixing member 520 which fixes a position of the second fixing point P2 of the detection ring 600 to the supporting substrate 300. At the above-described basic structure portion, it is possible to efficiently transmit stress resulting from an external force exerted on the force receiving body 100 to the four sets of detection portions D1 to D4 in a state that the supporting substrate 300 is fixed.

As shown in FIG. 18, at each of the detection portions D, there is formed a capacitive element C in which an increase and decrease in capacitance value is reversed depending on exertion of a compression stress or exertion of an extension stress along the basic annular channel B.

Therefore, when a capacitance value of the first capacitive element C1 having the displacement electrode E2 (D1) fixed to the first detection portion D1 positioned at the first detection point R1 is given as C1, a capacitance value of the second capacitive element C2 having the displacement electrode E2 (D2) fixed to the second detection portion D2 positioned at the second detection point R2 is given as C2, a capacitance value of the third capacitive element C3 having the displacement electrode E2 (D3) fixed to the third detection portion D3 positioned at the third detection point R3 is given as C3, and a capacitance value of the fourth capacitive element C4 having the displacement electrode E2 (D4) fixed to the fourth detection portion D4 positioned at the fourth detection point R4 is given as C4, as shown in FIG. 22, operation is performed on the basis of the following arithmetic expressions:

$Fz=-(C1+C2+C3+C4)$ $Mx=-C1-C2+C3+C4$ $My=+C1-C2-C3+C4$ $Mz=+C1-C2+C3-C4,$ by which it is possible to calculate force Fz exerted in the direction of the Z-axis, moment Mx exerted around the X-axis, moment My exerted around the Y-axis, and moment Mz exerted around the Z-axis.

It has been already described that, for example, the circuit shown in FIG. 23 can be used as a detection circuit which outputs electric signals corresponding to detection values Fz, Mx, My, Mz on the basis of the above operation.

Where the capacitive element is used as a detection element, it is preferable to output a detection value by performing operation for determining a difference of capacitance values between a plurality of capacitive elements. For example, of the above-described four arithmetic expressions, only the arithmetic expression on Fz is an arithmetic expression for determining a sum of four capacitance values C1 to C4. Other arithmetic expressions are formulae of difference operation which determine a difference in capacitance value between a plurality of capacitive elements. The above-described difference operation is effective in removing errors occurring in production steps (for example, dimensional errors of parts and errors of attachment sites) and errors occurring in use environments (for example, errors resulting from expansion of members by temperatures).

For example, in the case of the example shown in FIG. 16, an electrode interval between the four sets of capacitive elements C1 to C4 is regulated by a dimension in the height direction of a pair of fixing members 510, 520. However, even when dimensional errors occur in the height direction of the fixing members 510, 520 due to dimensional errors in a production step or at ambient temperatures, difference operation can be performed to offset the dimensional errors. Therefore, it is possible to output an accurate detection value free of errors.

In terms of a general explanation, with regard to force or moment on a specific axis to be detected, among n number of the plural detection portions, one of them behaves as a first attribute detection portion, and the other of them behaves as a second attribute detection portion. Here, the first attribute detection portion is a detection portion in which the displacement portion 63 is liable to undergo displacement in a direction moving close to the supporting substrate 300 upon exertion of a positive component on a specific axis and the displacement portion 63 is liable to undergo displacement in a direction moving away from the supporting substrate 300 upon exertion of a negative component on a specific axis. In contrast, the second attribute detection portion is a detection portion in which the displacement portion 63 is liable to undergo displacement in a direction moving away from the supporting substrate 300 upon exertion of a positive component on a specific axis and the displacement portion 63 is liable to undergo displacement in a direction moving close to the supporting substrate 300 upon exertion of a negative component on a specific axis.

Then, when detection is made for a component of the specific axis, a capacitive element which is constituted with a first attribute displacement electrode E2 fixed to the displacement portion 63 of the first attribute detection portion and a first attribute fixed electrode E1 fixed to a position facing the supporting substrate 300 is termed a first attribute capacitive element, and a capacitive element which is constituted with a second attribute displacement electrode E2 fixed to the displacement portion 63 of the second attribute detection portion and a second attribute fixed electrode E1 fixed to a position facing the supporting substrate 300 is termed a second attribute capacitive element. Thereby, an electric signal corresponding to a difference between a capacitance value of the first attribute capacitive element and a capacitance value of the second attribute capacitive element is determined by using the detection circuit and may be output as an electric signal indicating a component detected for the specific axis of force or moment to be detected.

As a matter of course, whether a certain specific capacitive element behaves as the first attribute capacitive element or the second attribute capacitive element depends on exertion of a specific axis component. Therefore, depending on exertion of any one of the six-axis components, Fx, Fy, Fz, Mx, My, Mz, an attribute is to be defined individually. Specifically, a capacitive element in which [+] or [++] is described in a specific row of the table shown in FIG. 21 is given as the first attribute capacitive element, as long as a specific axis component corresponding to the row is concerned. A capacitive element in which [−] or [−−] is described is given as the second attribute capacitive element, as long as a specific axis component corresponding to the row is concerned.

The adder/subtractor computing elements 16, 17, 18 shown in FIG. 23 perform a difference operation for determining a difference between a capacitance value of the first attribute capacitive element and a capacitance value of the second attribute capacitive element about a specific axis component, with the above-described attribute taken into account. Only operation for determining a sum is performed in the adder/subtractor computing element 15. Therefore, error offsetting functions on the basis of the above-described difference operation will not work.

Chapter 5. Embodiment which Uses Eight Sets of Detection Portions

Next, here, a description will be given of an embodiment (Second Embodiment) in which n number of detection points R are set so that n is equal to 8 to use a total of eight sets of detection portions. In the basic embodiment (First Embodiment) described in Chapter 3, the number of detection points R is set so that n is equal to 4 to use a total of four sets of detection portions D1 to D4. However, since force Fx or Fy cannot be sufficiently detected, a description has been given of an example in which the approximate table shown in FIG. 21 is used to detect four axis components Fz, Mx, My, Mz. In the embodiment described here with the use of eight sets of detection portions, although production costs will be increased with an increase in the number of detection portions, it is possible to perform detection motions with practically sufficient accuracy for all the six-axis components, Fx, Fy, Fz, Mx, My, Mz.

Figure 24:
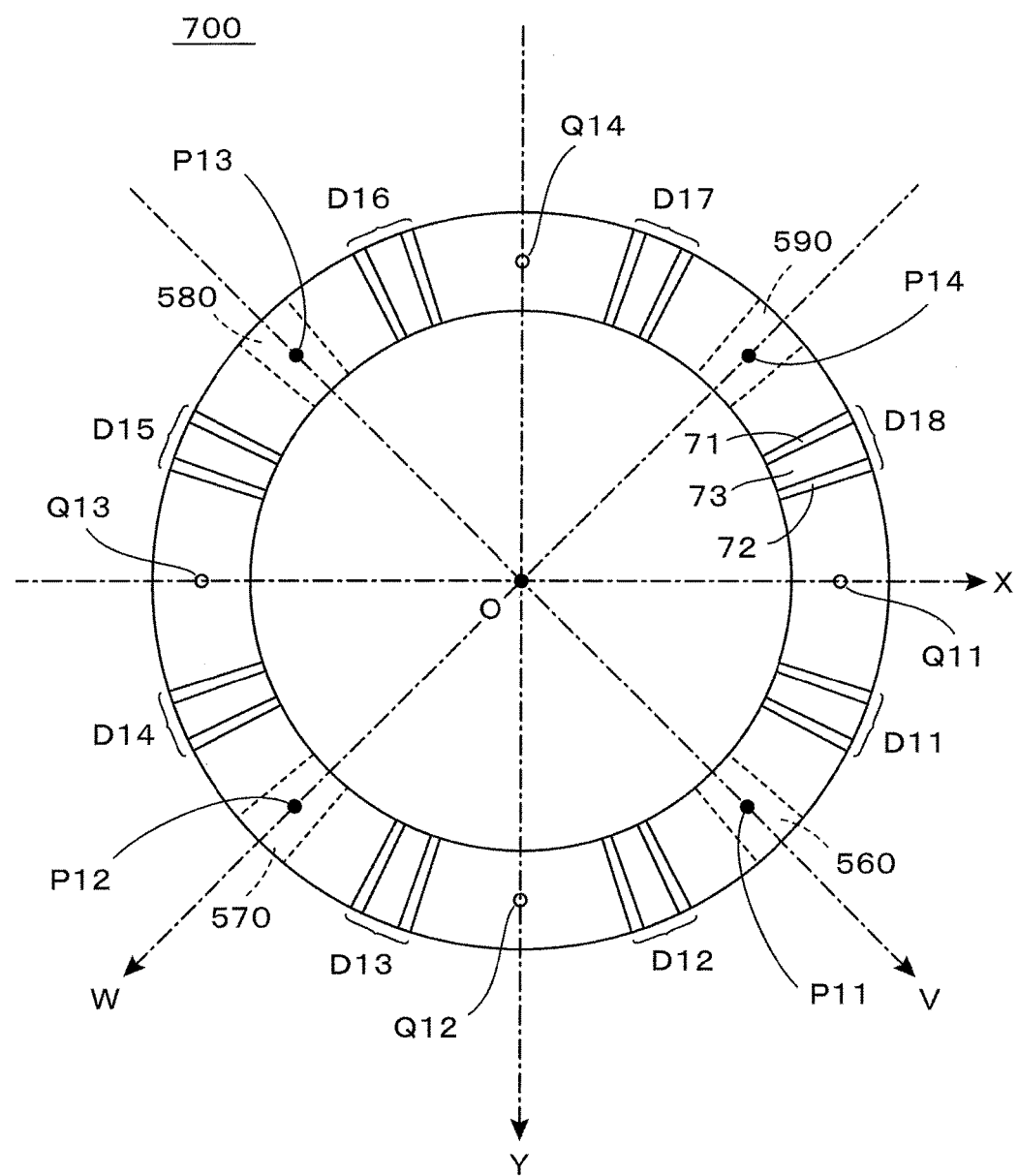
FIG. 24 is a bottom view of a detection ring 700 which is used in a force sensor according to the Second Embodiment of the present invention.

FIG. 24 is a bottom view of a detection ring 700 which is used in a force sensor according to the embodiment which uses the eight sets of detection portions. As apparent from comparison between the detection ring 600 shown in FIG. 13(c) and the detection ring 700 shown in FIG. 24, both are practically different only in the number of detection portions D. FIG. 24 is a bottom view in which the detection ring 700 is viewed from below, and the eight sets of detection portions D11 to D18 are arranged in a clockwise sequence. A structure of each of the detection portions D11 to D18 is similar to that of the detection portion D shown in FIG. 17. FIG. 24 shows an example in which the detection portion D18 is constituted with three plate-shaped pieces, or a first deformation portion 71, a second deformation portion 72 and a displacement portion 73. Other detection portions D11 to D17 are also similar in structure.

Figure 25:
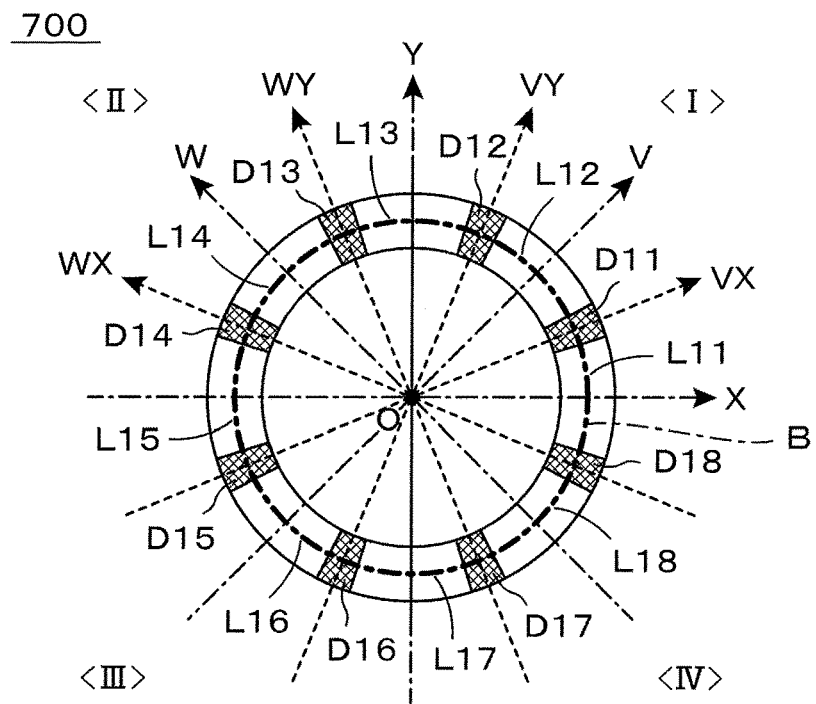
FIG. 25 is a top view which shows a distribution of domains of the detection ring 700 shown in FIG. 24 (mesh-like hatching is given for indicating domains of detection portions D11 to D18 and not for indicating a cross section).

FIG. 25 is a top view which shows a distribution of domains of the detection ring 700 shown in FIG. 24, (mesh-like hatching indicates domains of the detection portions D11 to D18 and does not indicate a cross section). As shown in the drawing, the detection ring 700 is structured so that the eight sets of detection portions D11 to D18 are coupled with eight sets of coupling portions L11 to L18. Whereas each of the detection portions D11 to D18 is constituted with three plate-shaped pieces, each of the coupling portions L11 to L18 is constituted with a thick member. Where an external force is exerted on the detection ring 700, elastic deformation of the detection ring 700 resulting from the external force will occur at the detection portions D11 to D18 in a concentrated manner.

Since FIG. 25 is a top view, the coupling portions and the detection portions are arranged counter-clockwise in the order of the first coupling portion L11, the first detection portion D11, the second coupling portion L12, the second detection portion D12, the third coupling portion L13, the third detection portion D13, the fourth coupling portion L14, the fourth detection portion D14, the fifth coupling portion L15, the fifth detection portion D15, the sixth coupling portion L16, the sixth detection portion D16, the seventh coupling portion L17, the seventh detection portion D17, the eighth coupling portion L18 and the eighth detection portion D18 along the basic annular channel B indicated by the thick alternate long and short dashed line in the drawing, thereby constituting the detection ring 700.

In this drawing as well, on the XY plane, the V-axis is defined as a coordinate axis in which the X-axis is rotated counter-clockwise by 45 degrees around the origin O, and the W-axis is defined as a coordinate axis in which the Y-axis is rotated counter-clockwise by 45 degrees around the origin O. <I>, <II>, <III> and <IV> given in the drawing indicate respectively a first quadrant to a fourth quadrant in an XY two dimensional coordinate system. The eight sets of detection portions D11 to D18 are arranged so that two of them are given in each of the quadrants.

Figure 26:
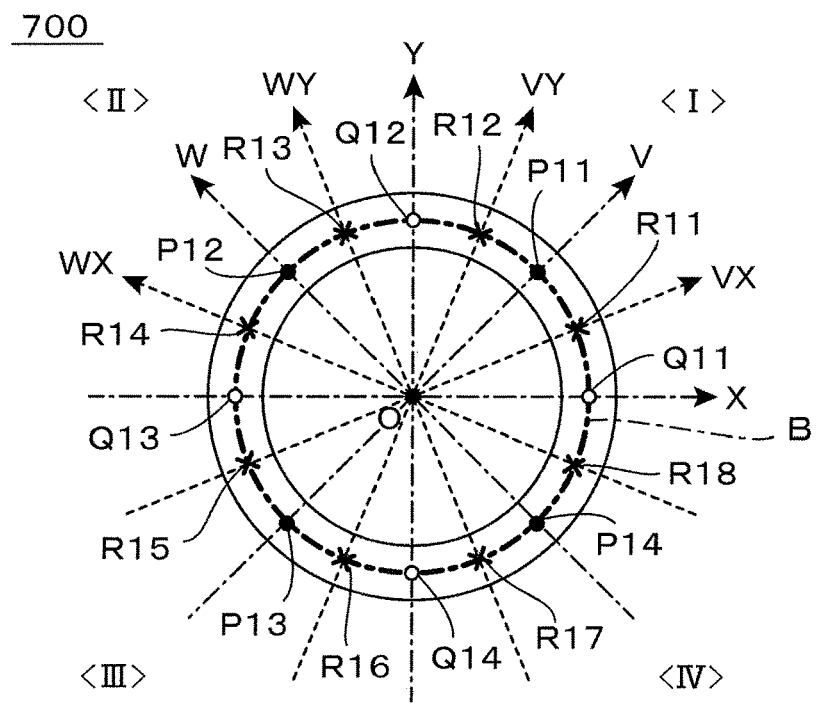
FIG. 26 is a plan view which shows a basic annular channel B defined on the XY plane at a position of the detection ring 700 shown in FIG. 24 and individual points defined on the basic annular channel B.

FIG. 26 is a plan view which shows a basic annular channel B defined for the detection ring 700 shown in FIG. 24 on the XY plane and individual points defined on the basic annular channel B. The basic annular channel B indicated by the thick alternate long and short dashed line in the drawing is a circle arranged on the XY plane around the origin O, and the detection ring 700 is an annular structure body which extends along the basic annular channel B. In the drawing, positions of an inner contour line and an outer contour line of the detection ring 700 are indicated by the solid lines. In the case of the example shown in the drawing, the basic annular channel B is a circle on the XY plane which passes through an intermediate position between the inner contour line and the outer contour line of the detection ring 700, serving as a center line of annular thick parts (coupling portions L11 to L18) of the detection ring 700.

The eight sets of detection points R11 to R18 are arranged on the basic annular channel B at an equal interval. As shown in the example of FIG. 26, in order that the eight detection points R11 to R18 are defined at an equal interval on the basic annular channel B which is composed of a circle, a direction vector Vec ($\theta$) giving an angle $\theta$ may be defined on the XY plane, with the origin O given as a starting point, in a counter-clockwise rotation in the positive direction of the X-axis, and the i-th (where, $1 \le i \le 8$) detection point R1$i$ may be arranged at a position where a direction vector Vec ($\pi/8+(i-1)\cdot\pi/4$) intersects with the basic annular channel B. For example, the first detection point R11 shown in FIG. 26 is arranged at a position where a direction vector Vec ($\theta$) giving an angle $\theta$ in a counter-clockwise rotation in the positive direction of the X-axis, with $\theta=\pi/8$, intersects with the basic annular channel B.

In the drawing, a VX-axis is defined at an intermediate position between the X-axis and the V-axis, a VY-axis is defined at an intermediate position between the V-axis and the Y-axis, a WY-axis is defined at an intermediate position between the Y-axis and the W-axis, and a WX-axis is defined at an intermediate position between the X-axis and the W-axis. The eight sets of detection points R11 to R18 are, accordingly, arranged in positive and negative domains of the VX-axis, the VY-axis, the WY-axis and WX-axis. These detection points R11 to R18 indicate respectively arrangements of the detection portions D11 to D18. As shown in a mesh-like hatching domain in FIG. 25, the eight sets of detection portions D11 to D18 are arranged at the respective positions of the detection points R11 to R18.

In the detection ring 600 having the four sets of detection portions described in Chapter 3, there are defined the two sets of fixing points P1, P2 and the two sets of exertion points Q1, Q2. In the detection ring 700 having the eight sets of detection portions shown here, as shown in FIG. 26, there are defined four sets of fixing points P11 to P14 (black circles) and four sets of exertion points Q11 to Q14 (open circles). As a matter of course, the four sets of fixing points P11 to P14 are points to be fixed to the supporting substrate 300, and the four sets of exertion points Q11 to Q14 are points on which force from the force receiving body 100 is exerted.

As shown in FIG. 26, the first exertion point Q11 is arranged on the positive X-axis; the second exertion point Q12, on the positive Y-axis; the third exertion point Q13, on the negative X-axis; the fourth exertion point Q14, on the negative Y-axis; the first fixing point P11, on the positive V-axis; the second fixing point P12, on the positive W-axis; the third fixing point P13, on the negative V-axis; and the fourth fixing point P14, on the negative W-axis. Therefore, in the force sensor which uses the detection ring 700, in a state that the four points P11 to P14 on the V-axis and the W-axis are fixed, force or moment exerted on the four points Q11 to Q14 on the X-axis and the Y-axis is to be detected on the basis of elastic deformation of the eight sets of detection portions D11 to D18 arranged at the detection points R11 to R18 on the VX-axis, the VY-axis, the WY-axis and WX-axis.

In this embodiment as well, the fixing points P11 to P14 and the exertion points Q11 to Q14 are alternately arranged along the basic annular channel B. This alternate arrangement is important in causing effective deformation to the detection ring 700 upon exertion of an external force to be detected. Further, the eight sets of detection points R11 to R18 are individually arranged between an exertion point and a fixing point which are adjacent to each other. This arrangement is also important in causing effective displacement to each of the detection portions D11 to D18 upon exertion of an external force to be detected.

As apparent from comparison between FIG. 25 and FIG. 26, the first exertion point Q11 is arranged at the first coupling portion L11, the first fixing point P11 is arranged at the second coupling portion L12, the second exertion point Q12 is arranged at the third coupling portion L13, the second fixing point P12 is arranged at the fourth coupling portion L14, the third exertion point Q13 is arranged at the fifth coupling portion L15, the third fixing point P13 is arranged at the sixth coupling portion L16, the fourth exertion point Q14 is arranged at the seventh coupling portion L17, and the fourth fixing point P14 is arranged at the eighth coupling portion L18.

Here, positions of the four sets of fixing points P11 to P14 on the detection ring 700 are fixed to the supporting substrate 300 by fixing members. In FIG. 24, connecting positions of the fixing members 560, 570, 580, 590 for fixing the positions of these fixing points P11 to P14 are indicated by the broken lines. On the other hand, positions of the four sets of exertion points Q11 to Q14 indicated by the open circles in FIG. 24 are connected to the force receiving body 100 by the connection members.

Figure 27:
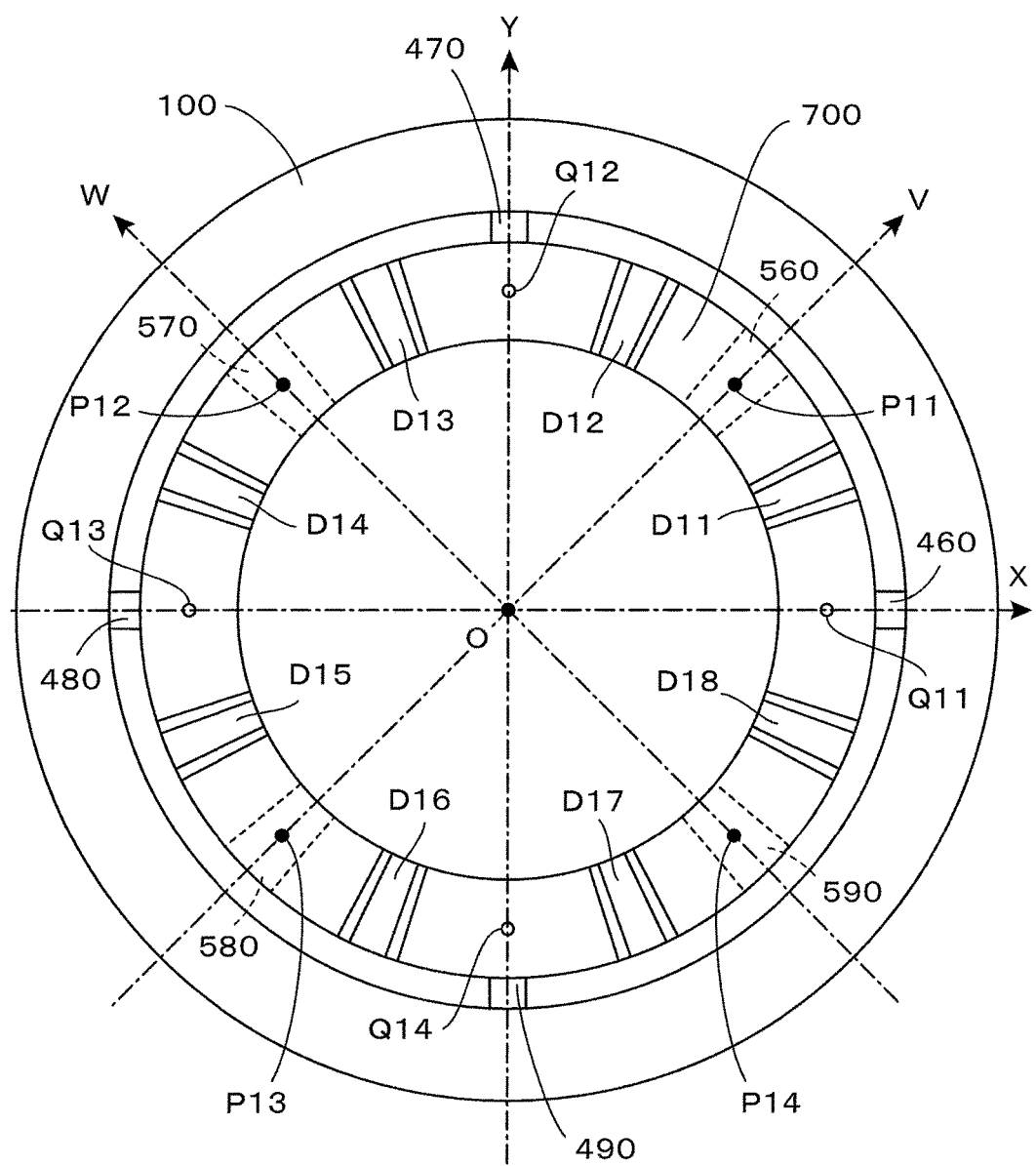
FIG. 27 is a top view of a basic structure portion of the force sensor according to the Second Embodiment of the present invention.

FIG. 27 is a top view of a basic structure portion of the force sensor according to an embodiment in which eight sets of detection portions are used. The basic structure portion is provided with a force receiving body 100, a detection ring 700 and a supporting substrate 300. The supporting substrate 300 which does not appear in the top view is a circular-disk shaped member, the diameter of which is equal to an outer diameter of the force receiving body 100, and arranged below the force receiving body 100 and the detection ring 700. The force receiving body 100 is, as with the embodiment shown in FIG. 16, a circular annular member and arranged so as to surround the outside of the detection ring 700. The supporting substrate 300 is, as with the embodiment shown in FIG. 16, a circular-disk shaped member. As described above, the force receiving body 100 and the supporting substrate 300 shown in FIG. 27 are not essentially different from the force receiving body and the supporting substrate in the embodiment shown in FIG. 16. Therefore, they are indicated by using the same symbols.

The basic structure portion shown in FIG. 16 is mainly different from the basic structure portion shown in FIG. 27 in that whereas in the former, there is used the detection ring 600 having the four sets of detection portions D1 to D4, in the latter, there is used the detection ring 700 having the eight sets of detection portions D11 to D18. Further, a difference in association therewith is that whereas in the former, the two sets of connection members 410, 420 and the two sets of fixing members 510, 520 are installed, in the latter, the four sets of connection members 460, 470, 480, 490 and the four sets of fixing members 560, 570, 580, 590 are installed.

That is, an outer circumferential face of the detection ring 700 in the vicinity of the first exertion point Q11 is connected to an inner circumferential face of the force receiving body 100 by the first connection member 460 arranged along a positive domain of the X-axis, and an outer circumferential face of the detection ring 700 in the vicinity of the second exertion point Q12 is connected to an inner circumferential face of the force receiving body 100 by the second connection member 470 arranged along a positive domain of the Y-axis. Similarly, an outer circumferential face of the detection ring 700 in the vicinity of the third exertion point Q13 is connected to an inner circumferential face of the force receiving body 100 by the third connection member 480 arranged along a negative domain of the X-axis, and an outer circumferential face of the detection ring 700 in the vicinity of the fourth exertion point Q14 is connected to an inner circumferential face of the force receiving body 100 by the fourth connection member 490 arranged along a negative domain of the Y-axis.

On the other hand, a lower face of the detection ring 700 at a position of the first fixing point P11 (position of a positive domain of the V-axis) is fixed to an upper face of the supporting substrate 300 by the first fixing member 560, and a lower face of the detection ring 700 at a position of the second fixing point P12 (position of a positive domain of the W-axis) is fixed to the upper face of the supporting substrate 300 by the second fixing member 570. Similarly, a lower face of the detection ring 700 at a position of the third fixing point P13 (position of a negative domain of the V-axis) is fixed to the upper face of the supporting substrate 300 by the third fixing member 580, and a lower face of the detection ring 700 at a position of the fourth fixing point P14 (position of a negative domain of the W-axis) is fixed to the upper face of the supporting substrate 300 by the fourth fixing member 590.

The force sensor according to a Second Embodiment of the present invention is constituted by adding a capacitive element and a detection circuit to the basic structure portion shown in FIG. 27. Here, the capacitive element is formed by a displacement electrode E2 formed on a lower face of each displacement portion 73 at eight sets of detection portions D11 to D18 shown in FIG. 24 and a fixed electrode E1 formed at a position of the upper face of the supporting substrate 300 facing thereto. A detailed structure of the above-described capacitive element C is as already described by referring to FIG. 18 in Chapter 3. According to this structure, there is formed a capacitive element in which an increase and decrease in capacitance value is reversed, depending on when a compression stress is exerted or when an extension stress is exerted along the basic annular channel B. Here, capacitive elements formed on the eight sets of detection portions D11 to D18 are individually termed capacitive elements C11 to C18, and capacitance values of these capacitive elements C11 to C18 are indicated by using the same symbols of C11 to C18.

Then, the table of FIG. 28 shows a variation amount (extent of increase and decrease) of capacitance values of the capacitive elements C11 to C18 upon exertion of external forces Fx, Fy, Fz, Mx, My, Mz on the force receiving body 100 in a state that the supporting substrate 300 is fixed. In this table as well, [+] indicates an increase in capacitance value (a decrease in electrode interval of the capacitive element C), while H indicates a decrease in capacitance value (an increase in electrode interval of the capacitive element C). Further, [++] indicates a greater extent of increase in capacitance value than [+], while [(+)] indicates a smaller extent of increase in capacitance value than [+]. Similarly, [−−] indicates a greater extent of decrease in capacitance value than H, while [(−)] indicates a smaller extent of decrease in capacitance value than H.

Here, a reason for obtaining the results shown in the table of FIG. 28 is not described in detail. However, the reason will be easily understood by evaluating a way of displacement undergone by a displacement electrode E2 of each of the detection portions D11 to D18, with consideration given to a deformed state of the detection ring 700 where an external force in a predetermined direction is exerted on a position of each of four sets of exertion points Q11 to Q14 (open circles) in a state that positions of the four sets of fixing points P11 to P14 (black circles) shown in FIG. 27 are fixed.

In the table shown in FIG. 28, results of the row of Fx and the row of Fy are [(+)] or [(−)] (that is, an extent of increase and decrease is smaller). This is because, as shown in FIG. 27, the detection portions D11 to D18 are arranged so as to deviate from the X-axis or the Y-axis and, therefore, the displacement electrode E2 will not undergo displacement significantly upon exertion of force Fx or Fy. In contrast, results of the row of Mx and the row of My are [++] or [−−] (that is, an extent of increase and decrease is great). This is because, as shown in FIG. 6, the detection ring is inclined significantly upon exertion of moment Mx or My, by which the displacement electrode E2 undergoes displacement significantly.

The table of FIG. 28 shows results obtained when force in the positive direction and moment which is positive rotation are exerted. Where force in the negative direction and moment which is negative rotation are exerted, there are obtained such results that [+] and [−] are reversed. On the premise of the results shown in the table of FIG. 28, six-axis components, Fx, Fy, Fz, Mx, My, Mz of an external force exerted on the force receiving body 100 can be calculated by referring to the arithmetic expressions shown in FIG. 29.

First, force Fx in the direction of the X-axis is obtained from operation of Fx=−C11+C12−C13+C14+C15−C16+C17−C18 by referring to individual fields of the row of Fx in the table of FIG. 28. Similarly, force Fy in the direction of the Y-axis is obtained from operation of Fy+C11−C12−C13+C14−C15+C16+C17−C18 by referring to individual fields of the row of Fy in the table of FIG. 28. Then, force Fz in the direction of the Z-axis is obtained from operation of Fz=−(C11+C12+C13+C14+C15+C16+17+C18) by referring to individual fields of the row of Fz in the table of FIG. 28.

On the other hand, moment Mx around the X-axis is obtained from operation of Mx=−C11−C12−C13−C14+C15+C16+C17+C18 by referring to individual fields of the row of Mx in the table of FIG. 28. Similarly, moment My around the Y-axis is obtained from operation of My=+C11+C12−C13−C14−C15−C16+C17+C18 by referring to individual fields of the row of My in the table of FIG. 28. Then, moment Mz around the Z-axis is obtained from operation of Mz=+C11−C12+C13−C14+C15−C16+C17−C18 by referring to individual fields of the row of Mz in the table of FIG. 28.

The basic structure portion shown in FIG. 27 is symmetrical with both the XZ plane and the YZ plane and also symmetrical with the VZ plane and the WZ plane. Therefore, other axis components are substantially offset by the use of individual arithmetic expressions shown in FIG. 29, thereby obtaining only a component free of other axis components. Nevertheless, to be exact, an absolute value of variation amount expressed by (+) and (−), an absolute value of variation amount expressed by + and −, and an absolute value of variation amount expressed by ++ and −− shown in the table of FIG. 28 are not completely in agreement. Therefore, although it is difficult to completely remove interference with other axis components, the variation amount can be suppressed to such a level that will not pose any problem in practice. Further, if necessary, operation can be performed by using a microcomputer, etc., to make correction to remove other axis components which have been mixed. Accordingly, there is provided a detection circuit which performs operation based on the arithmetic expressions shown in FIG. 29 (illustration is omitted), thus making it possible to output voltage values corresponding to the six-axis components, Fx, Fy, Fz, Mx, My, Mz, as electric signals.

Any of the arithmetic expressions shown in FIG. 29 are to perform operation which uses all the eight sets of capacitance values C11 to C18. However, the arithmetic expressions are not necessarily required to use all the capacitance values and may use only some of them.

For example, of the eight capacitance values C11 to C18, four sets of them are used, by which force Fx can be determined by an arithmetic expression which is Fx=−C11+C12+C17−C18 or Fx=+C12−C13−C16+C17, force Fy can be determined by an arithmetic expression which is Fy=+C11−C12−C13+C14 or Fy=−C15+C16+C17−C18, and force Fz can be determined by an arithmetic expression which is Fz=−(C11+C14+C15+C18) or Fz=−(C12+C13+C16+C17).

Similarly, moment Mx can be determined by an arithmetic expression which is Mx=−C11−C12+C17+C18 or Mx=−C13−C14+C15+C16, moment My can be determined by an arithmetic expression which is My=+C11+C12−C13−C14 or My=−C15−C16+C17+C18, and moment Mz can be determined by an arithmetic expression which is Mz=+C11−C12+C15−C16 or Mz=+C13−C14+C17−C18 or Mz=+C11−C14+C15−C18.

FIG. 30 is a drawing which shows variations of these arithmetic expressions. Whereas each of the arithmetic expressions shown in FIG. 29 is an arithmetic expression which uses all the eight sets of capacitance values C11 to C18, in the variations shown in FIG. 30, it will be sufficient to perform operation which uses only four sets of capacitance values C11 to C18, of eight sets of them. Theoretically, more accurate detection values can be obtained when operation is performed by using all the eight sets of capacitance values C11 to C18. However, actually, operation is performed on the basis of the individual arithmetic expressions shown in FIG. 30, by which it is possible to obtain detection results with practically sufficient accuracy. Therefore, where the operation load of a detection circuit is desired to be reduced as much as possible, variations shown in FIG. 30 may be adopted.

Chapter 6. Embodiment to which Auxiliary Connection Member is Added

Here, a description will be given of the embodiment (Third Embodiment) to which an auxiliary connection member is added. In Chapter 3, a description has been given of variation in capacitance values as shown in the table of FIG. 20 for four sets of capacitance values C1 to C4, where external forces of six-axis components, Fx, Fy, Fz, Mx, My, Mz are applied to the force sensor according to the basic embodiment (First Embodiment). In this table, whereas [++] and [−−] indicate a greater extent of increase in capacitance value than [+] and [−], [(+)] and [(−)] indicate a smaller extent of increase in capacitance value than [+] and [−].

As described above, the magnitude of variation in four sets of capacitance values C1 to C4 is different depending on an exerted external force component, thereby differing in detection sensitivity of each axis component. Therefore, for example, even when four axis components Fz, Mx, My, Mz are detected on the basis of the arithmetic expressions shown in FIG. 22, the detection values Mx, My are relatively higher in sensitivity than the detection values Fz, Mz. On the other hand, Fx, Fy are relatively low in detection sensitivity and, therefore, in practice, as shown in the approximate table of FIG. 21, there is no way but to perform processing by which the variation amount is made zero, resulting in a failure of obtaining a detection value.

As a matter of course, the detection sensitivity can be adjusted by changing dimensions of individual portions of the detection ring 600. For example, the first deformation portion 61 and the second deformation portion 62 which constitute the detection portion D are decreased in thickness so as to cause elastic deformation easily, thereby enhancing the detection sensitivity. However, although the above-described change in dimensions is effective in adjusting the detection sensitivity of the force sensor as a whole, it is impossible to correct a difference in detection sensitivity of each of the axis components. In providing a force sensor capable of detecting multi-axis components, it is not desirable to differ in detection sensitivity. Here, a description will be given of a way of correcting a difference in the detection sensitivity in an inventive manner.

In the force sensor which has been described above, in general, components Mx, My tend to be higher in detection sensitivity than other components. This is because the basic structure portion used in the present invention is structured so as to cause deformation relatively easily upon exertion of moment My around the Y-axis, for example, as shown in FIG. 6. Deformation is also easily caused upon exertion of moment Mx around the X-axis.

Figure 31:
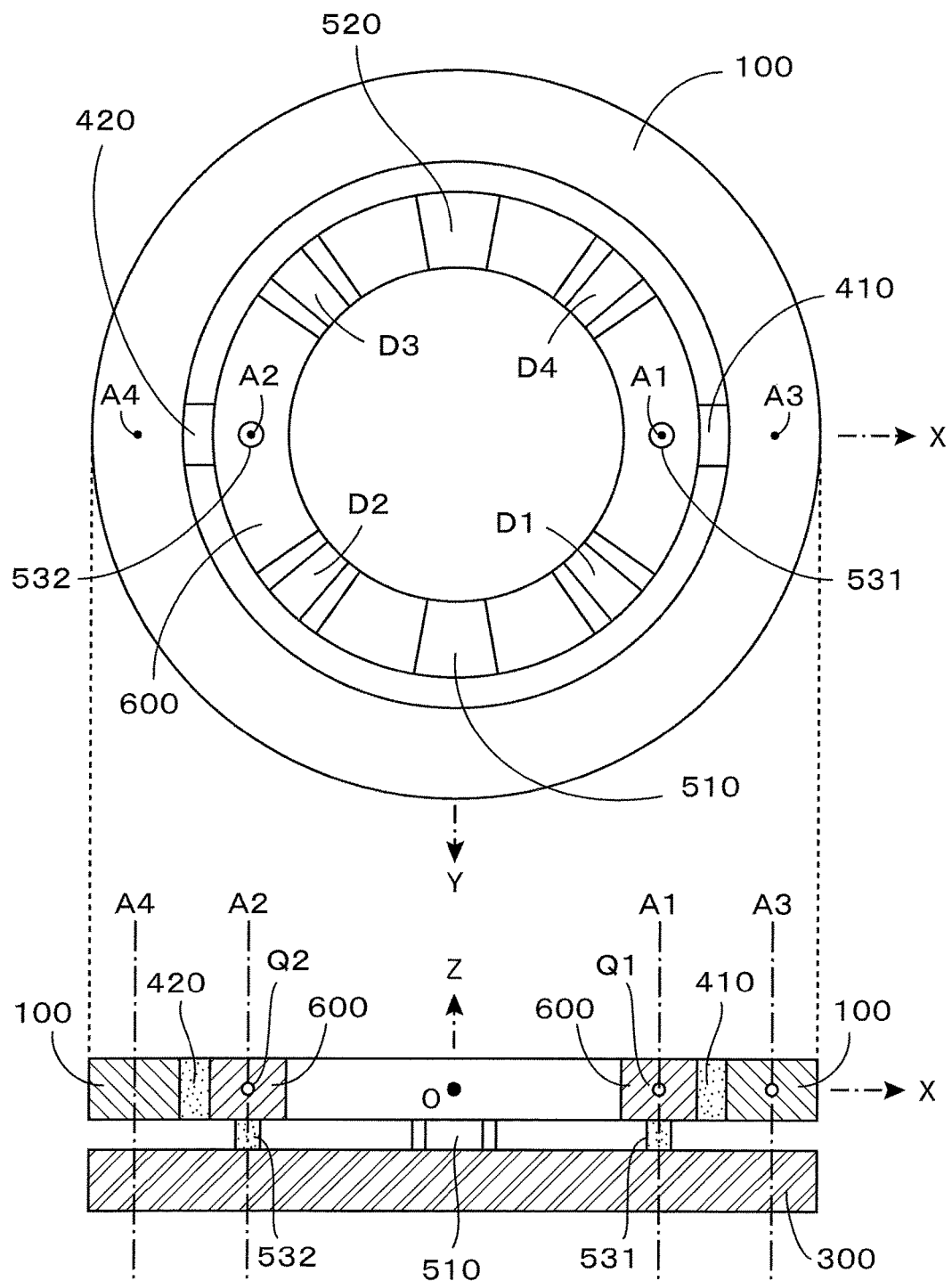
FIG. 31 is a bottom view (view shown in the upper part of the figure) of a basic structure portion of a force sensor according to the Third Embodiment of the present invention and a side sectional view (view shown in the lower part of the figure) in which the basic structure portion is cut along the XZ plane.

FIG. 31 is a bottom view (view shown in the upper part of the figure) of the basic structure portion of the force sensor according to a Third Embodiment in which a difference in detection sensitivity is corrected in an inventive manner, with the above-described structural characteristics taken into account, and a side sectional view (view shown in the lower part of the figure) in which the basic structure portion is cut along the XZ plane. In the bottom view at the upper part, for the sake of convenience, there is shown a state that the supporting substrate 300 is removed.

A difference between the basic structure portion shown in FIG. 16 according to the First Embodiment and the basic structure portion shown in FIG. 31 according to the Third Embodiment is only that auxiliary connection members 531, 532 are added to the latter. As shown in the side sectional view at the lower part, the auxiliary connection member 531 is a cylindrical member arranged at a position in which a connection reference line A1 passing through an exertion point Q1 and parallel to the Z-axis is given as the central axis, and an upper end thereof is connected to the lower face of the detection ring 600, and a lower end thereof is connected to the upper face of the supporting substrate 300. Similarly, the auxiliary connection member 532 is a cylindrical member arranged at a position in which a connection reference line A2 passing through an exertion point Q2 and parallel to the Z-axis is given as the central axis, and an upper end thereof is connected to the lower face of the detection ring 600 and a lower end thereof is connected to the upper face of the supporting substrate 300.

The detection ring 600 is originally connected with the supporting substrate 300 by a pair of fixing members 510, 520. In the Third Embodiment shown here, the auxiliary connection members 531, 532 are also added as members for connecting both of them. Here, whereas the fixing members 510, 520 are connected at positions of the fixing points P1, P2, the auxiliary connection members 531, 532 are connected at positions of the exertion points Q1, Q2. The pair of auxiliary connection members 531, 532 function to suppress displacement of the detection ring 600 occurring upon exertion of moment My or Mx on the force receiving body 100.

FIG. 6 shows a deformed state of the detection ring 200 upon exertion of moment My. It will be easily understood that the deformation can be suppressed by adding the auxiliary connection member 531, 532 to positions of the exertion points Q1, Q2. As described above, the auxiliary connection members 531, 532 function to suppress the deformation upon exertion of moment My and also function to suppress the deformation upon exertion of moment Mx. As a matter of course, they also function to suppress the deformation when moment Mz and forces Fx, Fy, Fz are exerted.

In brief, the auxiliary connection members 531, 532 function as "a supporting rod" for keeping a constant interval between the detection ring 600 and the supporting substrate 300 at positions of the connection reference lines A1, A2. Where only any one of the auxiliary connection members 531, 532 is installed, certain effects can be obtained. In practice, it is preferable to install both of them.

According to an experiment performed by the inventor of the present application, the effect of suppressing displacement by the auxiliary connection members 531, 532 are most noticeable with regard to moment My, noticeable to some extent with regard to moment Mx, but only slightly noticeable with regard to force Fx or Fy. This is considered to be because where forces Fx, Fy are exerted on the force receiving body 100, the auxiliary connection members 531, 532 are inclined to the connection reference lines A1, A2, but displacement which allows the auxiliary connection members 531, 532 to incline to the connection reference lines A1, A2 may be caused more easily than displacement which allows the auxiliary connection member 531, 532 to expand or contract in a direction along the connection reference lines A1, A2. As a result, there are obtained effects of correcting a difference between the detection sensitivity to moments Mx, My and the detection sensitivity to forces Fx, Fy.

Figures 32, 33:
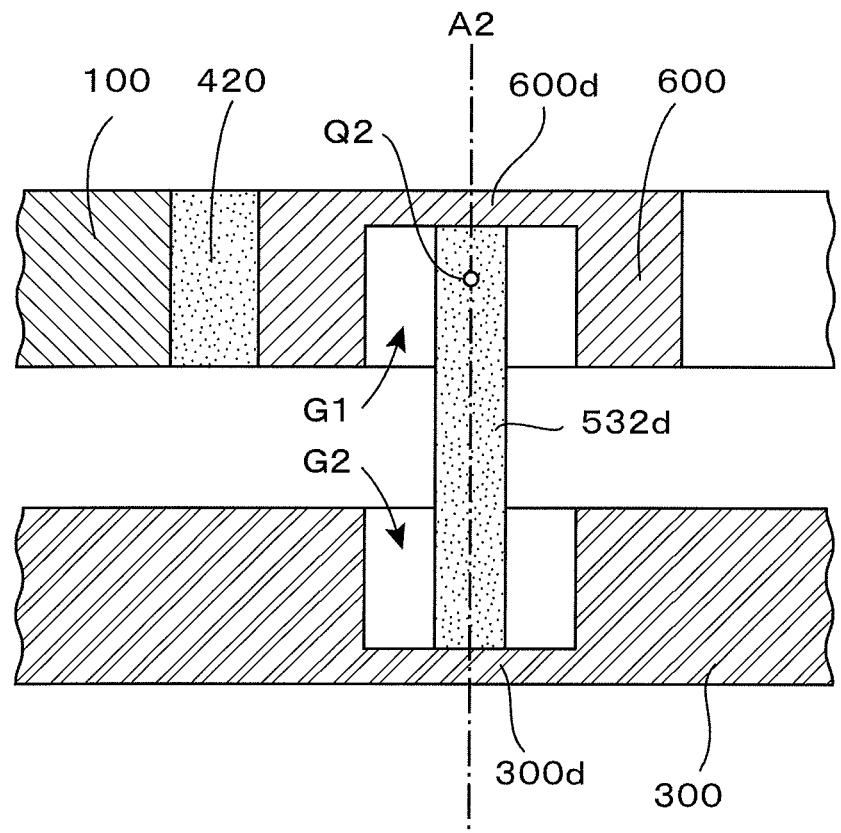
FIG. 32 is a table which shows a variation amount (extent of increase and decrease) of capacitance values of individual capacitive elements when force in the direction of each axis or moment around each axis is exerted on a force receiving body 100 in the Third Embodiment shown in FIG. 31.
FIG. 33 is a partial side sectional view which shows a modification example of a part at which an auxiliary connection member 532 is attached in the Third Embodiment shown in FIG. 31.

FIG. 32 is a table which shows a variation amount (extent of increase and decrease) of capacitance values of individual capacitive elements when force in the direction of each axis or moment around each axis is exerted on the force receiving body 100 in the Third Embodiment shown in FIG. 31. A symbol of each field is given as [+] or [−]. Comparison with the table shown in FIG. 20 reveals that a difference in detection sensitivity between individual axis components is significantly corrected.

As a matter of course, a symbol of each field in these tables shows relative detection sensitivity. Therefore, forces Fx, Fy are not enhanced in detection sensitivity by adding the auxiliary connection members 531, 532. As described above, the auxiliary connection members 531, 532 are added, by which any of the axis directional components are decreased in detection sensitivity. Moments Mx, My are significantly decreased in detection sensitivity but forces Fx, Fy are slightly decreased in detection sensitivity. Therefore, each of the axis components is balanced in terms of the detection sensitivity. In order to enhance the detection sensitivity of the force sensor as a whole, as described above, the first deformation portion 61 and the second deformation portion 62 which constitute the detection portion D may be decreased in thickness.

In the embodiment shown in FIG. 31, the connection reference lines A1, A2 which indicate arrangement positions of the auxiliary connection members 531, 532 are each set as a line which passes through the exertion point Q1 or Q2 and is parallel to the Z-axis. However, the positions of the connection reference lines are not necessarily restricted to these positions. For example, the auxiliary connection member 531 may be arranged so that a connection reference line A3 shown in FIG. 31 is given as the central axis. Alternatively, the auxiliary connection member 532 may be arranged so that a connection reference line A4 shown in FIG. 31 is given as the central axis. Here, the connection reference line A3 is a straight line which passes through a movement point at which the exertion point Q1 is moved in the positive direction of the X-axis and which is parallel to the Z-axis, and the connection reference line A4 is a straight line which passes through a movement point at which the exertion point Q2 is moved in the negative direction of the X-axis and which is parallel to the Z-axis. The auxiliary connection members arranged at positions of the connection reference lines A3, A4 function to connect the lower face of the force receiving body 100 with the upper face of the connection member 300.

Each of the connection reference lines A1 to A4 is a straight line which is orthogonal to the X-axis. Therefore, where the auxiliary connection members are arranged at the positions thereof, it is possible to suppress effectively the detection sensitivity of moment My which is highest in detection sensitivity, of six-axis components. As a matter of course, the auxiliary connection members are not necessarily arranged exactly at positions at which the connection reference lines A1 to A4 are given as a central axis. Even where they are arranged at positions slightly deviated from the connection reference lines A1 to A4, there can be obtained the effect of correcting a difference in detection sensitivity.

Accordingly, in order to correct a difference in detection sensitivity, connection reference lines A1 to A4 may be defined which are parallel to the Z-axis and pass through the exertion points Q1, Q2 or movement points at which the exertion points Q1, Q2 are moved along a line connecting the origin O with the exertion points Q1, Q2, and the auxiliary connection members 531, 532 may be installed for connecting the lower face of the detection ring 600 or that of the force receiving body 100 with the upper face of the supporting substrate 300 along the connection reference lines A1 to A4 or along the vicinities thereof.

Roles of the auxiliary connection members 531, 532 are to balance the detection sensitivity of the individual axis components. It is, therefore, necessary to keep the detection sensitivity to forces Fx, Fy as much as possible and decrease the detection sensitivity to moment My as much as possible. To that end, it is preferable that, as the auxiliary connection members 531, 532, such a member is used that causes elastic deformation more easily when force is exerted in a direction orthogonal to the connection reference lines A1 to A4 than when force is exerted in a direction along the connection reference lines A1 to A4. In other words, preferably used is such a member that is less likely to develop elastic deformation where force is exerted in a direction parallel to the Z-axis and more likely to develop elastic deformation where force is exerted in a direction perpendicular to the Z-axis.

Each of the auxiliary connection members 531, 532 shown in FIG. 31 is a cylindrical member extending in the direction of the Z-axis and less liable to expand and contract in the direction of the Z-axis but more liable to incline in the direction of the Z-axis, and these properties are suitable for the auxiliary connection members. Actually, an extent of elastic deformation may be adjusted by the thickness of the auxiliary connection members. As a matter of course, the shape of the auxiliary connection member shall not be restricted to a cylindrical shape but any given shape may be adopted.

Specifically, a long and narrow rod-shaped member composed of a material which is elastic to some extent such as metal or resin is used as the auxiliary connection members 531, 532 and may be arranged along a predetermined connection reference line. Thereby, when force is exerted on the force receiving body 100 in a direction along the connection reference line in a state that the supporting substrate 300 is fixed, elastic deformation is less likely to occur, and when force is exerted in a direction orthogonal to the connection reference line, elastic deformation is more likely to occur. In other words, the auxiliary connection members 531, 532, each of which is composed of a long and narrow rod-shaped member, are less likely to undergo deformation which expands and contracts in the longitudinal direction but more likely to undergo deformation which causes an entire inclination. As a result, it is possible to suppress displacement of the detection ring 600 in the direction of the Z-axis more effectively than displacement in the direction of the X-axis or in the direction of the Y-axis and to correct a difference in detection sensitivity of each of the axis components.

FIG. 33 is a partial sectional view which shows a modification example of a structure in the vicinity of the auxiliary connection member 532 shown in FIG. 31. In this modification example, the auxiliary connection member 532 is modified in an inventive manner so as to be inclined more easily and a diaphragm structure is adopted at a part of connecting both ends of the auxiliary connection member.

As with the auxiliary connection member 532 shown in FIG. 31, an auxiliary connection member 532d shown in FIG. 33 is a cylindrical structure body arranged so as to give a connection reference line A2 passing through an exertion point Q2 as the central axis, playing a role in connecting a detection ring 600 with a supporting substrate 300. However, an upper end of the auxiliary connection member 532d is connected to a lower face of a diaphragm portion 600d, and a lower end thereof is connected to an upper face of a diaphragm portion 300d. Here, the diaphragm portion 600d is a part which is thin in thickness and formed at a coupling portion L of the detection ring 600. In order to form the diaphragm portion 600d, a groove portion G1 is formed on the lower face of the detection ring 600. On the other hand, the diaphragm portion 300d is a part which is thin in thickness and formed at the supporting substrate 300. In order to form the diaphragm portion 300d, a groove portion G2 is formed on the upper face of the supporting substrate 300.

FIG. 33 shows a structure of the auxiliary connection member 532d in the vicinity thereof, with a connection reference line A2 given as the central axis. Similar diaphragm portions 600d, 300d are also formed at upper and lower connection parts of an auxiliary connection member 531d, with a connection reference line A1 given as the central axis. A connection structure using the above-described diaphragm is adopted, by which the auxiliary connection members 531d, 532d undergo displacement resulting from deformation of the diaphragm portions 600d, 300d, eliminating a necessity for deformation of the auxiliary connection members 531d, 532d in themselves. Therefore, there may be used a thick rigid member as the auxiliary connection members 531d, 532d. It is preferable in securing a sufficient inclination angle to make the auxiliary connection members 531d, 532d as long as possible.

In the example shown in FIG. 33, there is adopted such a constitution that the upper end of the auxiliary connection member 532d is connected to the detection ring 600 via the diaphragm portion 600d and the lower end of the auxiliary connection member 532d is connected to the supporting substrate 300 via the diaphragm portion 300d. There may be adopted such a constitution that only the upper end or the lower end thereof is connected via the diaphragm portion.

Accordingly, when there is adopted such a constitution that the auxiliary connection member is connected via a diaphragm portion, a part connecting to the auxiliary connection member of the detection ring or of the force receiving body, a part connecting to the auxiliary connection member of the supporting substrate, or both of these parts are constituted with the diaphragm portions, by which the auxiliary connection member may be inclined to a connection reference line by deformation of the diaphragm portion on the basis of exertion of force or moment.

In the Third Embodiment shown in FIG. 31, the auxiliary connection members 531, 532 are added to the force sensor according to the First Embodiment shown in FIG. 16. According to the Third Embodiment, the results shown in the table of FIG. 32 are obtained in place of the table of FIG. 20. However, on the basis of the table of FIG. 32, accurate detection values free of interference with other axis components are not necessarily obtained for all the six-axis components, Fx, Fy, Fz, Mx, My, Mz. Rather, since it becomes impossible to perform approximation in which the variation amount of capacitance value upon exertion of forces Fz, Fy is made zero, other axis components will interfere to a greater extent.

In order to obtain accurate detection values free of interference with other axis components for all the six-axis components, Fx, Fy, Fz, Mx, My Mz, there may be adopted such a constitution that auxiliary connection members are added to the Second Embodiment described in Chapter 5 (the embodiment in which eight sets of detection portions are used). Specifically, in the basic structure portion according to the Second Embodiment shown in FIG. 27, connection reference lines parallel to the Z-axis are individually defined at positions of four sets of exertion points Q11 to Q14 (or positions of movement points at which they are moved to the outside), and the four sets of auxiliary connection members may be installed on the individual connection reference lines or in the vicinities thereof. These auxiliary connection members play a role in connecting a lower face of the coupling portion L of the detection ring 700 with an upper face of the supporting substrate 300. As a matter of course, the upper end or the lower end of the auxiliary connection member may be connected via the diaphragm portion shown in FIG. 33, whenever necessary.

FIG. 34 is a table which shows the variation amount (extent of increase and decrease) of capacitance values of individual capacitive elements when force in the direction of each axis or moment around each axis is exerted on the force sensor in which four sets of auxiliary connection members are added to the Second Embodiment described in Chapter 5. A symbol of each field is [+] or [−], and comparison with the table shown in FIG. 28 reveals that a difference in detection sensitivity of each axis component is significantly corrected. In the Second Embodiment, as described in Chapter 5, operation based on the arithmetic expressions shown in FIG. 29 can be performed to obtain a detection value free of interference with other axis components for all the six-axis components, Fx, Fy, Fz, Mx, My, Mz. Therefore, the four sets of auxiliary connection members are added to the Second Embodiment, thus making it possible to detect the six-axis components accurately and also to correct a difference in detection sensitivity of each of the axis components. As described above, although it is difficult to completely remove interference with other axis components, the variation amount can be suppressed to such a level which will not pose any problem in practice. And, if necessary, correction for removing other axis components can be made by performing operation using a microcomputer, etc.

It is not necessary to use all the four sets of auxiliary connection members, and use of at least one set of them could provide the effect of correcting a difference in detection sensitivity. For example, an auxiliary connection member is installed at a position of each of two sets of exertion points Q11, Q13 on the Second Embodiment shown in FIG. 27, thereby making it possible to suppress significantly displacement upon exertion of moment My and also to make correction for decreasing at least detection sensitivity to moment My.

Chapter 7. Embodiment Using Square-Shaped Detection Ring

All the above-described embodiments are force sensors, each portion of which is circular in shape. For example, in the case of the force sensor according to the First Embodiment shown in FIG. 16, the detection ring 600 is an annular structure body in which a circle arranged on the XY plane, with the Z-axis given as the central axis, is the basic annular channel B. The supporting body (supporting substrate) 300 is a circular plate-shaped structure body arranged in a negative domain of the Z-axis, with the Z-axis given as the central axis. The force receiving body 100 is a circular annular structure body arranged on the XY plane, with the Z-axis given as the central axis.

Figure 35:
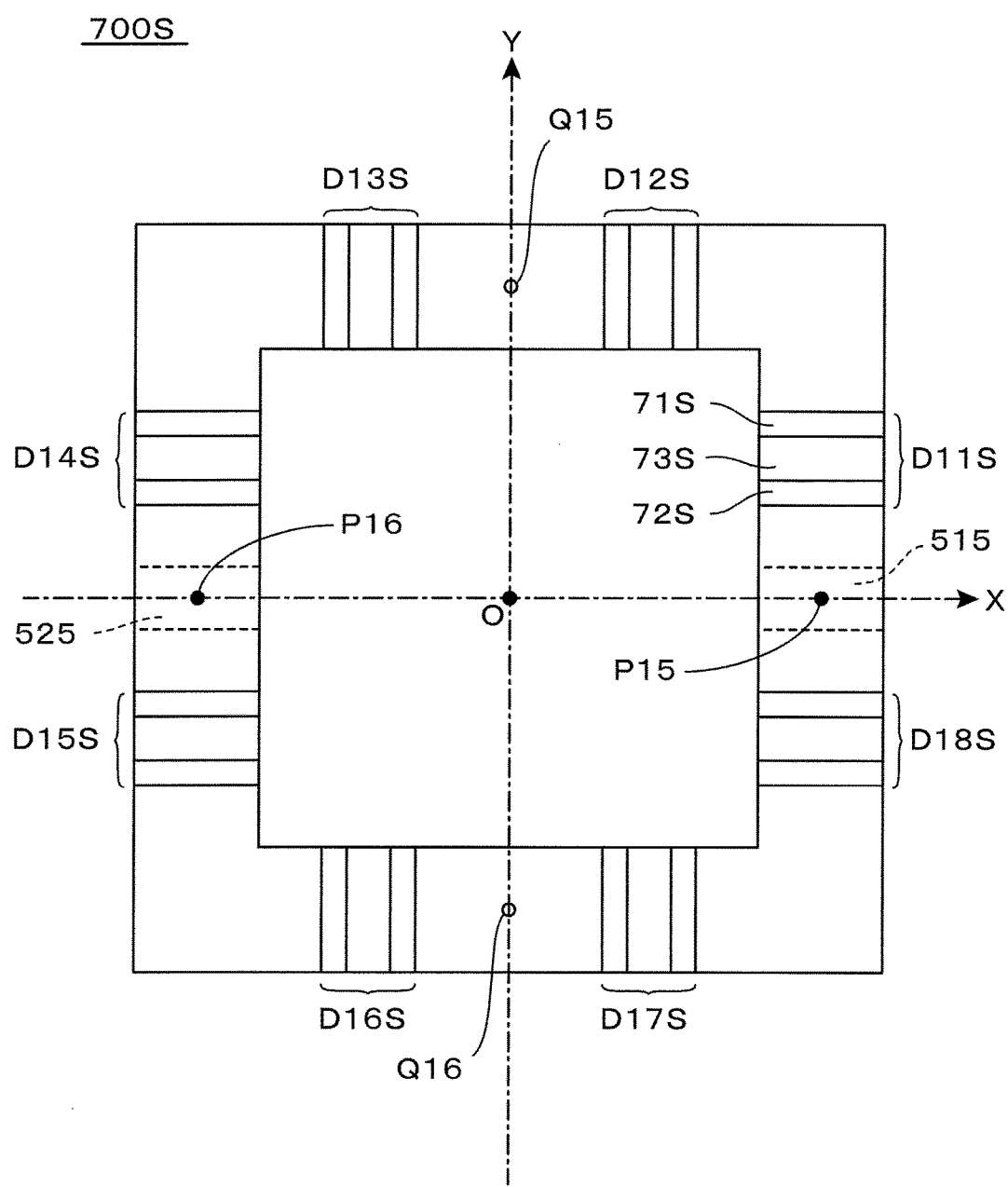
FIG. 35 is a top view of a square-shaped detection ring 700S which is used in a force sensor according to the Fourth Embodiment of the present invention.

In a Fourth Embodiment described here, each portion is constituted with a square-shaped member. For example, a square-shaped detection ring 700S shown in FIG. 35 can be used as a detection ring. The detection ring 700S is modified so that the detection ring 700 shown in FIG. 24 is made square in shape, and both of them are similar in fundamental structure. Thus, a symbol of each portion of the detection ring 700S shown in FIG. 35 is given a name having a letter of S (initial letter of Square) added to the end of a symbol of each corresponding portion of the detection ring 700 shown in FIG. 24. FIG. 24 is a bottom view, while FIG. 35 is a top view and, therefore, the direction of the Y-axis is reversed.

In the case of the detection ring 700 shown in FIG. 24, the eight sets of detection portions D11 to D18 are arranged clockwise on the circular detection ring 700. On the other hand, since FIG. 35 is a top view, eight sets of detection portion D11S to D18S are arranged counterclockwise on the square detection ring 700S. As shown in the drawing, a first detection portion D11S is provided with a first deformation portion 71S, a second deformation portion 72S and a displacement portion 73S which is supported at both ends by them. Second to eighth detection portions D12S to D18S are also similar in structure.

The detection portions D11S to D18S are similar in fundamental structure and deformed state to the detection portions D shown in FIG. 17. As a matter of course, although the detection portion formed on the circular detection ring 700 is slightly different in shape from a detection portion formed on the square detection ring 700S, there is no change in essential structure and deformed state. Therefore, where a capacitive element C is formed by a displacement electrode E2 formed on the displacement portion 73S of each of the detection portions D11S to D18S and a fixed electrode E1 formed at a position of the supporting substrate facing thereto, an increase and decrease in capacitance value of the capacitive element C is reversed depending on when a compression stress is exerted or when an extension stress is exerted along a basic annular channel BS.

Although illustration is omitted here, there are provided a force receiving body 100S which is composed of a square annular structure body so as to surround the exterior of the detection ring 700S in compliance with the shape of the square detection ring 700S and a supporting body (supporting substrate) 300S which is composed of a plate-shaped structure body having the same square shape as an outer contour line of the force receiving body 100S. That is, in a Fourth Embodiment described here, the detection ring 700S is an annular structure body in which a square arranged on the XY plane, with the Z-axis given as the central axis, is a basic annular channel BS. The supporting body (supporting substrate) 300S is a square plate-shaped structure body which is arranged at a negative domain of the Z-axis, with the Z-axis given as the central axis. The force receiving body 100S is a square annular structure body which is arranged on the XY plane, with the Z-axis given as the central axis.

As a matter of course, a connection member is connected between the force receiving body 100S and the detection ring 700S, and a fixing member is connected between the detection ring 700S and the supporting substrate 300S. However, connecting positions thereof are slightly different from those of the Second Embodiment described in Chapter 5. In the case of the Fourth Embodiment, as shown in FIG. 35, two sets of fixing points P15, P16 are defined on the X-axis of the detection ring 700S, and positions of the fixing points P15, P16 are fixed to the supporting substrate 300S by fixing members 515, 525. On the other hand, two sets of exertion points Q15, Q16 are defined on the Y-axis of the detection ring 700S, and positions of the exertion points Q15, Q16 are connected to the force receiving body 100S by a connection member which is not shown.

Figure 36:
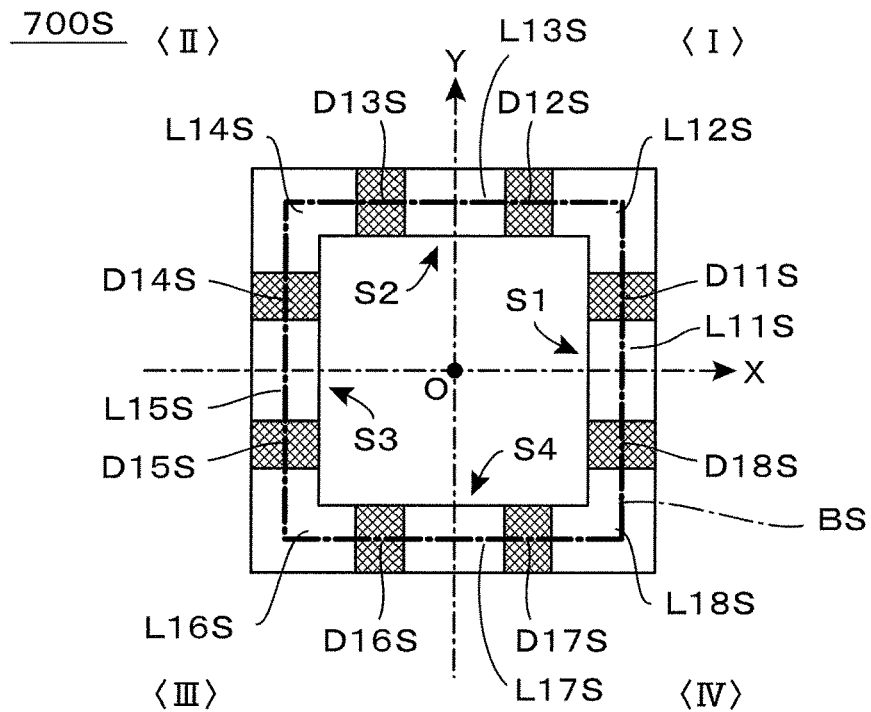
FIG. 36 is a top view which shows a distribution of domains of the detection ring 700S shown in FIG. 35 (mesh-like hatching is given for indicating the domains of detection portions D11S to D18S and not for indicating the cross section).

FIG. 36 is a top view which shows a distribution of domains on the detection ring 700S shown in FIG. 35 (mesh-like hatching indicates domains of the detection portions D11S to D18S and does not indicate a cross section). As shown in the drawing, the detection ring 700S is structured so that eight sets of detection portions D11S to D18S are coupled by eight sets of coupling portions L11S to L18S. Whereas each of the detection portions D11S to D18S is constituted with three plate-shaped pieces, each of the coupling portions L11S to L18S is constituted with a member great in thickness. Where an external force is exerted on the detection ring 700S, elastic deformation of the detection ring 700S on the basis of the external force will occur at the detection portions D11S to D18S in a concentrated manner.

Where there is defined a square-shaped basic annular channel BS indicated by the thick alternate long and short dashed line in FIG. 36, the detection ring 700S is constituted by arranging counter-clockwise the coupling portions and the detection portions in the order of the first coupling portion L11S, the first detection portion D11S, the second coupling portion L12S, the second detection portion D12S, the third coupling portion L13S, the third detection portion D13S, the fourth coupling portion L14S, the fourth detection portion D14S, the fifth coupling portion L15S, the fifth detection portion D15S, the sixth coupling portion L16S, the sixth detection portion D16S, the seventh coupling portion L17S, the seventh detection portion D17S, the eighth coupling portion L18S and the eighth detection portion D18S along the basic annular channel BS.

<I>, <II>, <III> and <IV> in the drawing indicate respectively a first quadrant to a fourth quadrant in an XY two-dimensional coordinate system. The eight sets of detection portions D11S to D18S are respectively arranged by two sets each in each of these quadrants.

Figure 37:
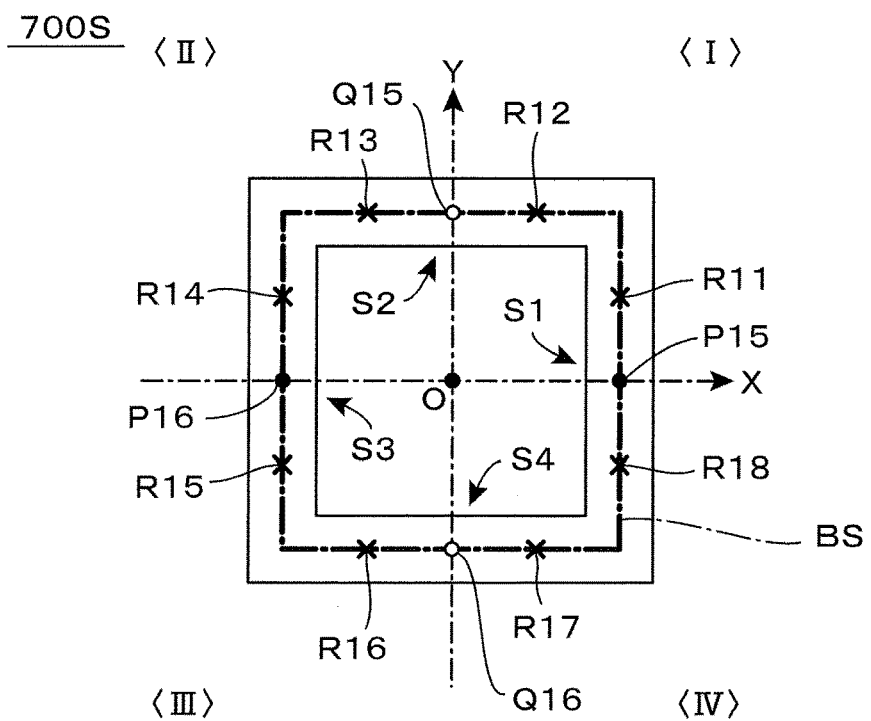
FIG. 37 is plan view which shows a basic annular channel BS defined on the XY plane at a position of the detection ring 700S shown in FIG. 35 and individual points defined on the basic annular channel BS.

FIG. 37 is a plan view which shows the basic annular channel BS defined on the XY plane in the detection ring 700S shown in FIG. 35 and individual points defined on the basic annular channel BS. The basic annular channel BS indicated by the thick alternate long and short dashed line in the drawing is a square arranged on the XY plane around the origin O, and the detection ring 700S is a square-shaped annular structure body extending along the basic annular channel BS. In the drawing, positions of an inner contour line and an outer contour line of the detection ring 700S are indicated by the solid lines. In the case of the example shown in the drawing, the basic annular channel BS is a square on the XY plane which passes through an intermediate position between the inner contour line and the outer contour line of the detection ring 700S and given as the center line of the annular thick parts (coupling portions L11S to L18S) of the detection ring 700S.

As apparent from FIG. 37, in Fourth Embodiment, no fixings point P or exertion points Q are installed between the detection points R11 and R12. Similarly, no fixing points P or exertion points Q are installed between the detection points R13 and R14, between the detection points R15 and R16 or between the detection points R17 and R18. In other words, in the Fourth Embodiment, there is adopted such a policy that when n even number of coupling portions are numbered sequentially along the basic annular channel, all the exertion points Q and fixing points P are arranged at odd-numbered coupling portions, and also the exertion points Q and the fixing points P are alternately arranged along the basic annular channel BS.

Specifically, as apparent from comparison of FIG. 36 with FIG. 37, the first fixing point P15 is arranged at the first coupling portion L11S, the first exertion point Q15 is arranged at the third coupling portion L13S, the second fixing point P16 is arranged at the fifth coupling portion L15S, the second exertion point Q16 is arranged at the seventh coupling portion L17S. That is, any of the fixing points P15, P16 and the exertion points Q1, Q2 are arranged at odd numbered coupling portions in an alternate manner. No fixing point P or exertion point Q is arranged at an even-numbered coupling portion.

Here, a position of the first exertion point Q15 on the detection ring 700S is connected by the first connection member to the force receiving body 100S, and a position of the second exertion point Q16 on the detection ring 700S is connected by the second connection member to the force receiving body 100S (none of the connection members is illustrated). Similarly, a position of the first fixing point P15 on the detection ring 700S is fixed by the first fixing member 515 to the supporting substrate 300S, and a position of the second fixing point P16 on the detection ring 700S is fixed by the second fixing member 525 to the supporting substrate 300S (refer to FIG. 35).

More specifically, in the case of the example shown in the drawing, the first fixing point P15 is arranged on the positive X-axis, the second fixing point P16 is arranged on the negative X-axis, the first exertion point Q15 is arranged on the positive Y-axis, and the second exertion point Q16 is arranged on the negative Y-axis. Then, the detection ring 700S is a square annular structure body arranged on the XY plane around the origin O and provided with a first side S1 extending in a direction parallel to the Y-axis and intersecting with the positive X-axis, a second side S2 extending in a direction parallel to the X-axis and intersecting with the positive Y-axis, a third side S3 extending in a direction parallel to the Y-axis and intersecting with the negative X-axis, and a fourth side S4 extending in a direction parallel to the X-axis and intersecting with the negative Y-axis.

Then, the first detection point R11 is arranged at a position of the first side S1 having a positive Y coordinate, the second detection point R12 is arranged at a position of the second side S2 having a positive X coordinate, the third detection point R13 is arranged at a position of the second side S2 having a negative X coordinate, the fourth detection point R14 is arranged at a position of the third side S3 having a positive Y coordinate, the fifth detection point R15 is arranged at a position of the third side S3 having a negative Y coordinate, the sixth detection point R16 is arranged at a position of the fourth side S4 having a negative X coordinate, the seventh detection point R17 is arranged at a position of the fourth side S4 having a positive X coordinate, and the eighth detection point R18 is arranged at a position of the first side S1 having a negative Y coordinate.

In the force sensor according to the Fourth Embodiment described here, capacitive elements C11 to C18 are formed respectively at eight sets of detection portions D11S to D18S arranged at positions of the eight sets of detection points R11 to R18. The table of FIG. 38 shows a variation amount (extent of increase and decrease) of capacitance values C11 to C18 of the respective capacitive elements C11 to C18 when force in the direction of each axis or moment around each axis is exerted on the force sensor. Here, a field of "0" indicates no occurrence of a significant variation amount, and a field of [+] or [−] indicates an increase and decrease in capacitance value. Further, a field of [++] or [−−] indicates a greater extent of increase or a greater extent of decrease in capacitance value.

On the premise of the results shown in the table of FIG. 38, it is possible to calculate the six-axis components, Fx, Fy, Fz, Mx, My, Mz of an external force exerted on the force receiving body 100S by the arithmetic expressions shown in FIG. 39.

First, force Fx in the direction of the X-axis can be obtained by operation of Fx=+C12−C13−C16+C17 with reference to individual fields of the row of Fx in the table of FIG. 38. Similarly, force Fy in the direction of the Y-axis can be obtained by operation of Fy=−C11−C14+C15+C18 with reference to individual fields of the row of Fy in the table of FIG. 38. Then, force Fz in the direction of the Z-axis can be obtained by operation of Fz=−(C11+C12+C13+C14+C15+C16+C17+C18) with reference to individual fields of the row of Fz in the table of FIG. 38.

On the other hand, moment Mx around the X-axis can be obtained by operation of Mx=−C11−C12−C13−C14+C15+C16+C17+C18 with reference to individual fields of the row of Mx in the table of FIG. 38. Similarly, moment My around the Y-axis can be obtained by operation of My=+C11+C12−C13−C14−C15−C16+C17+C18 with reference to individual fields of the row of My in the table of FIG. 38. Then, moment Mz around the Z-axis can be obtained by operation of Mz=−C11−C12+C13+C14−C15−C16+C17+C18 with reference to individual fields of the row of Mz in the table of FIG. 38.

The basic structure portion constituted by using the detection ring 700S shown in FIG. 35 is symmetrical with both the XZ plane and the YZ plane. Therefore, each of the arithmetic expressions shown in FIG. 39 can be used to obtain a detection value which is free of interference with other axis components. Although illustration is omitted here, there is provided a detection circuit which performs operation on the basis of the arithmetic expressions shown in FIG. 39, thus making it possible to output voltage values corresponding to six-axis components, Fx, Fy, Fz, Mx, My, Mz, as electric signals. As described above, although it is difficult to completely remove interference with other axis components, the variation amount can be suppressed to such a level that will not pose any problem in practice. And, correction for removing other axis components can be made by performing operation by using a microcomputer, etc., if necessary.

The arithmetic expressions shown in FIG. 39 are one example of arithmetic expressions for calculating individual axis components. It is possible to calculate each of the axis components by using an arithmetic expression different from them. For example, force Fz can be obtained by an arithmetic expression which is Fz=−(C11+C13+C15+C17) or Fz=−(C12+C14+C16+C18). Moment Mx can be obtained by an arithmetic expression which is Mx=−C12−C13+C16+C17, moment My can be obtained by an arithmetic expression which is My=+C11−C14−C15+C18, and moment Mz can be obtained by an arithmetic expression which is Mz=−C11+C13−C15+C17 or Mz=−C12+C14−C16+C18.

FIG. 40 is a drawing which shows variations of these arithmetic expressions. Theoretically, it is possible to obtain more accurate detection values by operation which uses all the eight sets of capacitance values C11 to C18. However, actually, even when operation is performed on the basis of each of the arithmetic expressions shown in FIG. 40, it is possible to obtain detection results which are in practice sufficient in accuracy. Therefore, where the operation load of a detection circuit is desired to be reduced as much as possible, there may be adopted variations shown in FIG. 40.

Chapter 8. Other Modification Examples

A description has been above given of the force sensor of the present invention by referring to some embodiments. Here, some more modification examples will be described.

<8-1. Modification Example in which Positions of Exertion Points and Fixing Points are Changed>

Figure 41:
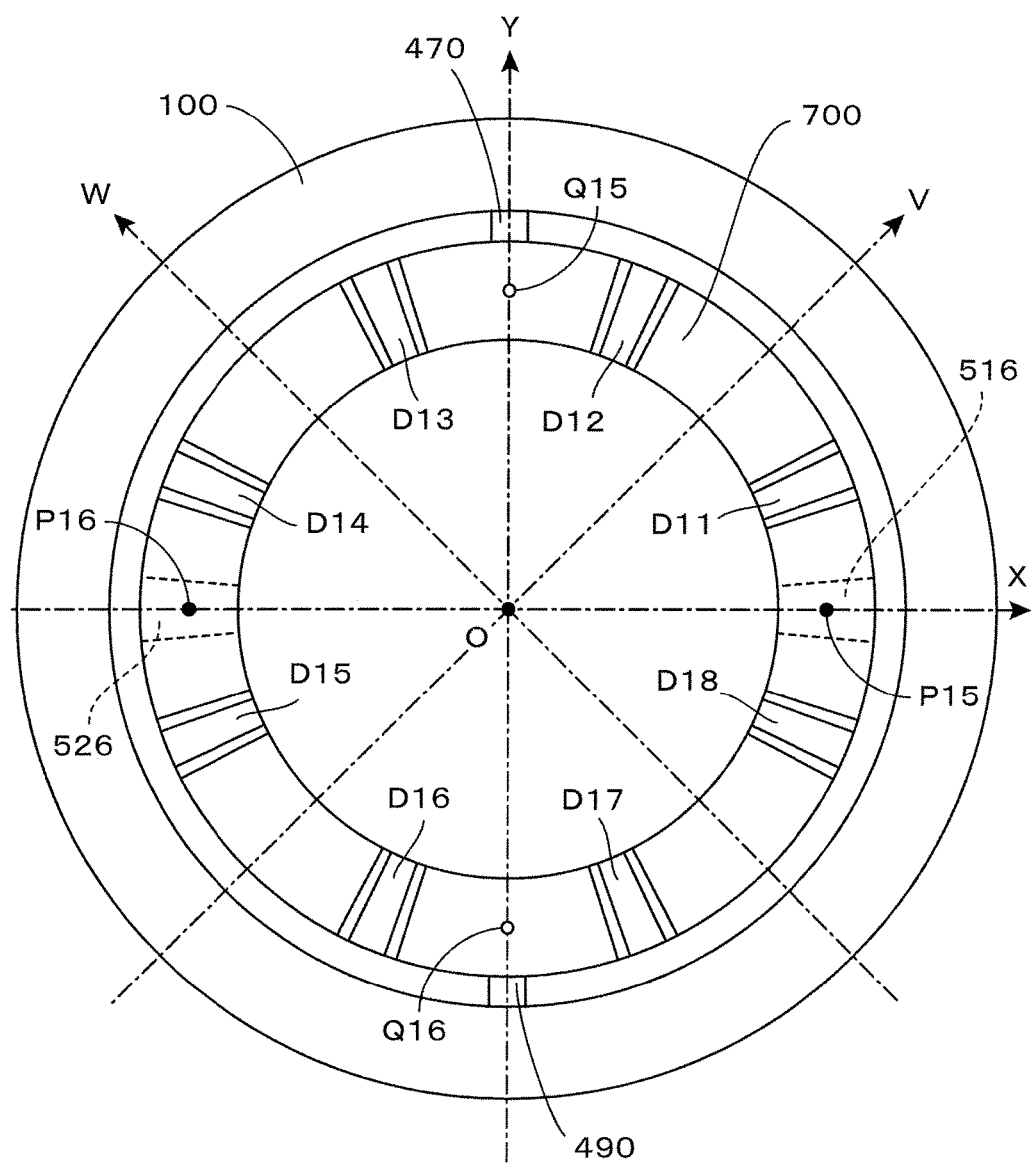
FIG. 41 is a top view of a basic structure portion of a force sensor according to the Fifth Embodiment of the present invention.

FIG. 41 is a top view of a basic structure portion of a force sensor according to a Fifth Embodiment of the present application. As with the Second Embodiment shown in FIG. 27, the Fifth Embodiment is a force sensor in which each portion is formed in a circular shape and eight sets of detection portions D11 to D18 are used. A basic structure portion of the force sensor according to the Fifth Embodiment shown in FIG. 41 is substantially similar to the basic structure portion of the force sensor according to the Second Embodiment shown in FIG. 27 and, actually, exactly the same members are used in a detection ring 700, a force receiving body 100 and a supporting substrate 300. Therefore, the eight sets of detection portions D11 to D18 are not changed in structure or arrangement, or eight sets of capacitive elements are not changed in structure or arrangement, either.

That is, in the basic structure portion shown in FIG. 41, the detection ring 700 is a circular annular structure body which is arranged on the XY plane around the origin O. When a direction vector Vec ($\theta$) giving an angle $\theta$ in counter-clockwise rotation in the positive direction of the X-axis is defined on the XY plane, with the origin O given as a starting point, an i-th (where, $1 \leq i \leq 8$) detection point is arranged at a position in which a direction vector Vec ($\pi/8+(i-1)\cdot\pi/4$) intersects with a basic annular channel B. This is a structure which is common to the basic structure portion shown in FIG. 27. They are different in positions of the exertion points Q and the fixing points P and a constitution (arithmetic expression to be used) of a detection circuit.

In the case of the basic structure portion shown in FIG. 27, the four sets of exertion points Q11 to Q14 (open circles) are arranged on the X-axis or the Y-axis, and the four sets of fixing points P11 to P14 (black circles) are arranged on the V-axis or the W-axis. Therefore, the detection ring 700 is connected to the force receiving body 100 by the four sets of connection members 460, 470, 480, 490, and also connected to the supporting substrate 300 by the four sets of fixing members 560, 570, 580, 590.

In contrast, in the case of the basic structure portion shown in FIG. 41, two sets of exertion points Q15, Q16 (open circles) are arranged on the Y-axis, and two sets of fixing points P15, P16 (black circles) are arranged on the X-axis. Therefore, the detection ring 700 is connected to the force receiving body 100 by two sets of connection members 470, 490 and connected to the supporting substrate 300 by two sets of fixing members 516, 526.

Accordingly, although the force sensor according to the Fifth Embodiment shown in FIG. 41 is similar in outer shape to the force sensor according to the Second embodiment shown in FIG. 27, as to an arrangement of the exertion points Q and that of the fixing points P, it is the same as the force sensor according to the Fourth Embodiment which uses a square-shaped member shown in FIG. 35. In the Fourth Embodiment, there is adopted such a policy that when n even number of coupling portions are numbered sequentially along the basic annular channel BS, any of the exertion points Q and the fixing points P are arranged at odd-numbered coupling portions and also exertion points Q and fixing points P are alternately arranged along the basic annular channel BS. In the Fifth Embodiment shown in FIG. 41 as well, the exertion points Q and fixing points P are arranged on the basis of the above-described policy, by which no exertion point Q or fixing point P is arranged on the V-axis or the W-axis.

Therefore, a variation mode of capacitance values of eight sets of capacitive elements C11 to C18 in the force sensor according to the Fifth Embodiment is different from that shown in the table of FIG. 28 (the table for the Second Embodiment). Arithmetic expressions used for detecting the individual axis components are also different from the arithmetic expressions shown in FIG. 29 (arithmetic expressions for the Second Embodiment). Here, there are omitted a description of the table which shows the variation mode of capacitance values and that of arithmetic expressions used for detecting the individual axis components in the Fifth Embodiment. Actually, there are obtained those similar to the table shown in FIG. 38 and the arithmetic expressions shown in FIG. 39.

As described above, in carrying out the present invention, even where a detection ring which is identical in physical structure is used, the detection ring is different in deformed state depending on positions of the exertion points Q and the fixing points P, and it is to be noted that an arithmetic expression for determining each of the axis components is also different.

<8-2. Modification Example in which Force Receiving Body is Arranged Inside>

In the above-described embodiments, an annular structure body capable of housing the detection ring internally is used as the force receiving body to arrange the force receiving body outside the detection ring. However, the force receiving body is not necessarily arranged outside the detection ring. For example, if the detection ring is an annular structure body capable of housing the force receiving body internally, the force receiving body may be arranged inside the detection ring.

Figure 42:
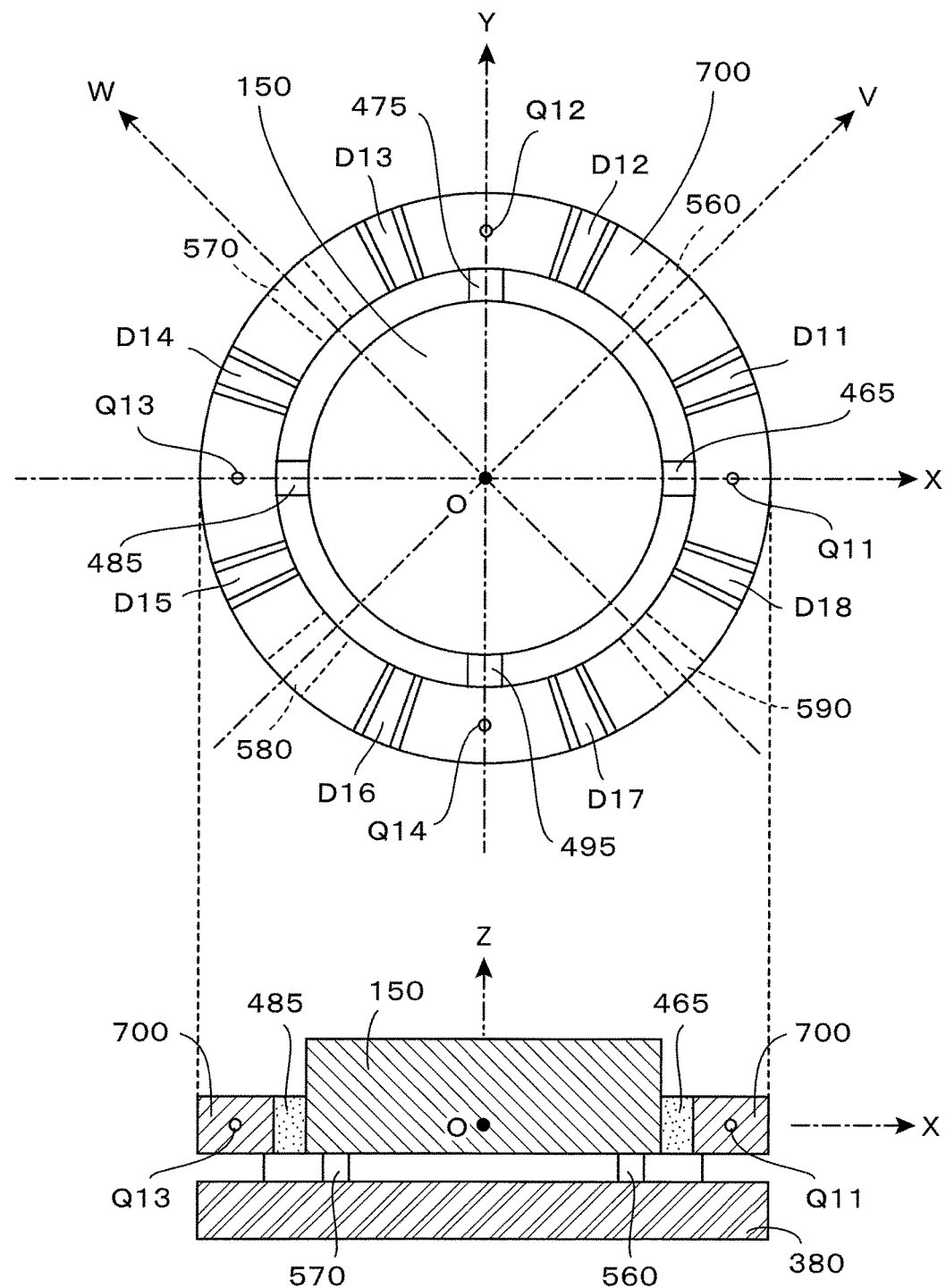
FIG. 42 is a top view (view shown in the upper part of the figure) of a basic structure portion of a force sensor according to the Sixth Embodiment of the present invention and a side sectional view (view shown in the lower part of the figure) in which the basic structure portion is cut along the XZ plane.

FIG. 42 is a top view (view shown in the upper part of the figure) of a basic structure portion of a force sensor according to a Sixth Embodiment of the present invention and a side sectional view (view shown in the lower part of the figure) in which the basic structure portion is cut along the XZ plane. A detection ring 700 of the basic structure portion shown in FIG. 42 is identical with the detection ring 700 of the basic structure portion according to the Second Embodiment shown in FIG. 27. No difference is found at all in structure and arrangement of eight sets of detection portions D11 to D18, structure and arrangement of eight sets of capacitive elements C11 to C18, arrangement of four sets of exertion points Q11 to Q14 or arrangement of four sets of fixing points P11 to P14. However, whereas the force receiving body 100 shown in FIG. 27 is an annular structure body and arranged outside the detection ring 700, a force receiving body 150 shown in FIG. 42 is a cylindrical structure body and arranged inside the detection ring 700.

Therefore, an arrangement of four sets of fixing members 560, 570, 580, 590 for fixing the detection ring 700 to a supporting substrate 380 is the same as that in the Second Embodiment. However, four sets of connection members 465, 475, 485, 495 for connecting the detection ring 700 to the force receiving body 150 are installed inside the detection ring 700. That is, the four sets of connection members 465, 475, 485, 495 connect positions of the exertion points Q11 to Q14 on the detection ring 700 to the force receiving body 150 and, therefore, are installed as members for connecting an inner circumferential face of the detection ring 700 to an outer circumferential face of the force receiving body 150.

As apparent from a side sectional view at the lower part of FIG. 42, the force receiving body 150 is housed inside the detection ring 700. Thus, the supporting substrate 380 is constituted with a circular-disk shaped member equal in outer diameter to the detection ring 700. Therefore, the basic structure portion can be set so as to be small in radial size. In the example shown in the drawing, since the force receiving body 150 is set to be greater in thickness than the detection ring 700, the force receiving body 150 is structured so that an upper end thereof protrudes upward. Where the sensor in its entirety is desired to be thin, the force receiving body 150 may be set equal in thickness to the detection ring 700.

As described above, such a structure that the force receiving body 150 is housed inside the detection ring 700 can be adopted to effectively utilize an internal hollow portion of the detection ring 700 and also downsize the device. However, the detection ring 700 which undergoes deformation upon exertion of an external force is in a state of being exposed to the outside. Then, the detection ring 700 comes into contact with any object, thereby preventing original deformation of the detection ring 700 (deformation necessary for the above-described detection principle), resulting in a failure of obtaining correct detection results. Therefore, when the Sixth Embodiment is adopted, it is preferable that attention is given so as not to prevent the original deformation of the detection ring 700, for example, by installing a protective cover outside.

Detection motions of each of the axis components in the force sensor according to the Sixth embodiment are similar to motions of the force sensor according to the Second Embodiment described in Chapter 5. Therefore, a description thereof will be omitted here.

<8-3. Modification Example in which Force Receiving Body is Arranged Above>

In Chapter 8-2, a description has been given of the modification example in which the force receiving body is arranged inside the detection ring. An arrangement of the force receiving body shall not be restricted to the outside or inside of the detection ring. Theoretically, the force receiving body may be arranged at any position, as long as force or moment to be detected can be transmitted to an exertion point Q of the detection ring, without preventing original deformation of the detection ring. Here, a description will be given of a modification example in which the force receiving body is arranged above the detection ring.

Figure 43:
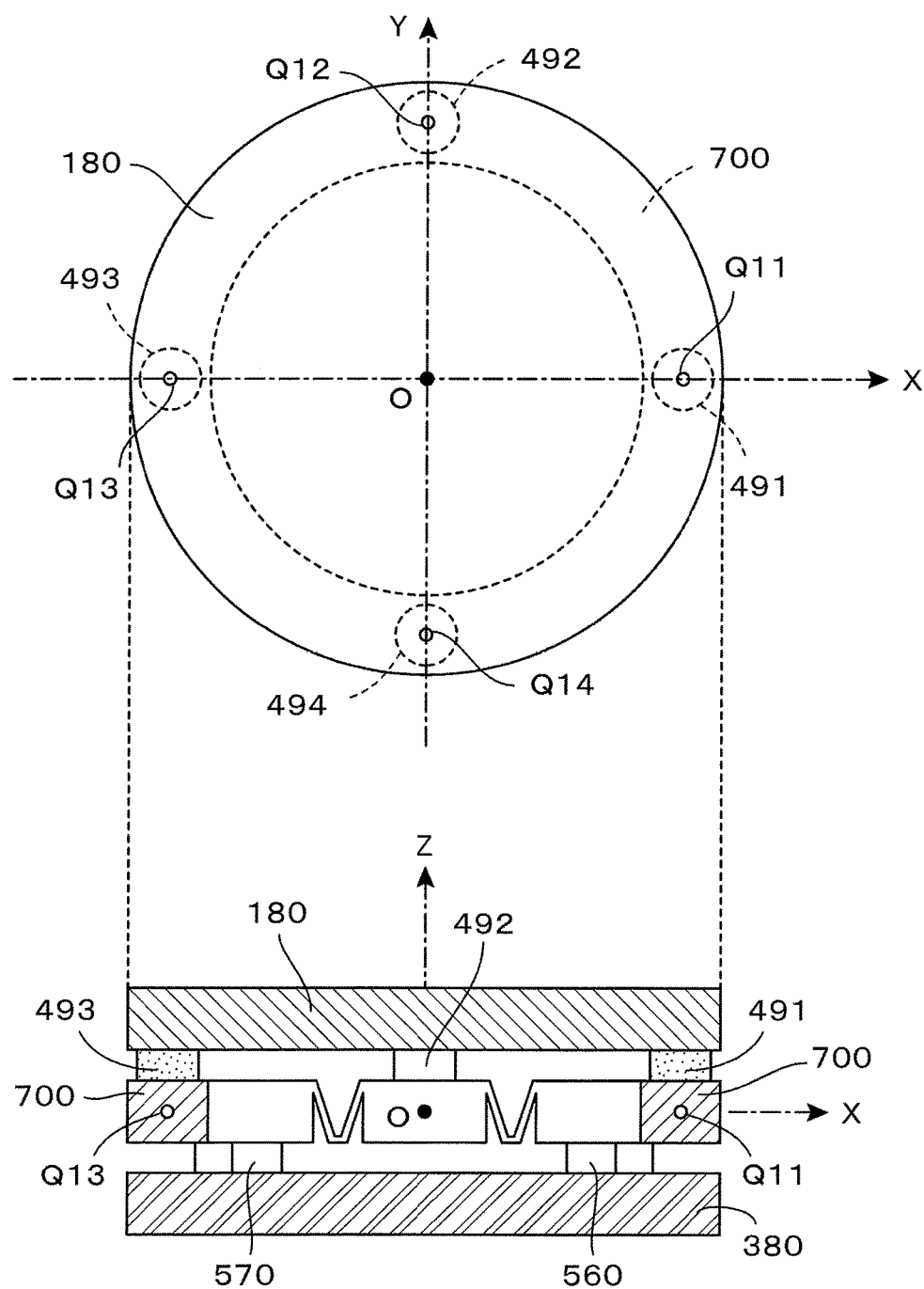
FIG. 43 is a top view (view shown in the upper part of the figure) of a basic structure portion of a force sensor according to the Seventh Embodiment of the present invention and a side sectional view (view shown in the lower part of the figure) in which the basic structure portion is cut along the XZ plane.

FIG. 43 is a top view (view shown in the upper part of the figure) of a basic structure portion of a force sensor according to a Seventh Embodiment of the present invention and a side sectional view (view shown in the lower part of the figure) in which the basic structure portion is cut along the XZ plane. A detection ring 700 and a supporting substrate 380 in the basic structure portion shown in FIG. 43 are identical with the detection ring 700 and the supporting substrate 380 at the basic structure portion according to the Sixth Embodiment shown in FIG. 42 and an arrangement of four sets of fixing members 560, 570, 580, 590 is also the same.

However, whereas the force receiving body 150 shown in FIG. 42 is a cylindrical structure body which is arranged inside the detection ring 700, a force receiving body 180 shown in FIG. 43 is a circular-disk shaped structure body which is arranged above the detection ring 700. In the case of the above example, the force receiving body 180 is constituted with a circular-disk shaped member equal in outer diameter to the detection ring 700, that is, a member which is identical in shape with the supporting substrate 380.

Therefore, an arrangement of the four sets of fixing members 560, 570, 580, 590 is the same as an arrangement of those for fixing the detection ring 700 to the supporting substrate 380 in the Sixth Embodiment. However, four sets of connection members 491, 492, 493, 494 for connecting the detection ring 700 to the force receiving body 180 are installed above the detection ring 700. As shown in the view at the upper part of FIG. 43 by the broken line, the four sets of connection members 491, 492, 493, 494 are cylindrical members and installed in order to connect positions of exertion points Q11 to Q14 of the detection ring 700 with the force receiving body 180. Therefore, they are provided as members for connecting an upper face of the detection ring 700 with a lower face of the force receiving body 180.

Accordingly, in the force sensor according to the Seventh Embodiment, when the XY plane is taken on a horizontal face and the Z-axis is given as an axis moving perpendicularly upward, there is adopted such a constitution that the detection ring 700 is arranged on the XY plane, the supporting body (supporting substrate 380) is arranged below the detection ring 700, with a predetermined interval kept, and the force receiving body 180 is arranged above the detection ring, with a predetermined interval kept.

As described above, even where the force receiving body 180 is arranged above the detection ring 700, there is found no change in functions to transmit force or moment to be detected to the exertion points Q11 to Q14 of the detection ring 700. Detection motions of each of the axis components in the force sensor according to the Seventh Embodiment are similar to motions of the force sensor of the Second Embodiment described in Chapter 5. Therefore, a description thereof will be omitted here.

<8-4. Other Modification Examples on Shape and Arrangement of Force Receiving Body and Supporting Body>

In the First to Fifth Embodiments described above, there has been used the force receiving body 100 composed of an annular structure body, which is convenient in arranging the force receiving body 100 outside the detection ring. On the other hand, the force receiving body 150 (FIG. 42) used in the Sixth Embodiment described in Chapter 8-2 is formed in a cylindrical shape, and the force receiving body 180 (FIG. 43) used in the Seventh Embodiment described in Chapter 8-3 is in a circular-disk shape. As described above, it will be sufficient that the force receiving body is designed so as to be formed in any appropriate shape in the individual embodiments. The force receiving body may be an annular structure body or may be a plate-shaped structure body. As a matter of course, it may be a circular structure body or may be a rectangular structure body.

Similarly, in the First to Seventh Embodiments described above, the supporting substrates 300, 380 each composed of a plate-shaped structure body are used as supporting bodies. It will be sufficient that the supporting body of the present invention is a member playing a role in supporting the detection ring, and it may be formed in any shape. Therefore, the supporting body is not necessarily formed in a plate-shaped structure body, and the annular structure body can be used as a supporting body.

Further, in the First to Seventh Embodiments described above, the supporting body (supporting substrates 300, 380)

is arranged below the detection ring. The supporting body is not necessarily arranged below the detection ring (in a negative domain of the Z-axis when the detection ring is arranged on the XY plane) and may be arranged at any given position. However, the supporting body is constituted with a supporting substrate arranged below the detection ring, by which a fixed electrode can be formed on the upper face thereof. In order to simplify production steps, it is preferable that the supporting body is constituted with a plate-shaped structure body arranged below the detection ring.

<8-5. Variations of Detection Portion>

Here, a description will be given of structural variations of a detection portion D. In any of the above-described embodiments, there is used the detection portion D having a structure shown by the example in FIG. 17. The detection portion D is provided with a first deformation portion 61 and a second deformation portion 62, each of which undergoes elastic deformation, as well as a displacement portion 63 which undergoes displacement resulting from elastic deformation of the deformation portions 61, 62.

More specifically, as shown in FIG. 17(a), the detection portion D arranged at a position of a detection point R is constituted with a first plate-shaped piece 61 and a second plate-shaped piece 62 each undergoing elastic deformation, and a third plate-shaped piece 63, the both ends of which are supported by the plate-shaped pieces 61, 62, and the third plate-shaped piece 63 functions as a displacement portion. Here, when there is drawn a normal line N which is orthogonal to the XY plane at the position of the detection point R, the first plate-shaped piece 61 and the second plate-shaped piece 62 are inclined to the normal line N and also an inclination direction of the first plate-shaped piece 61 is reverse to that of the second plate-shaped piece 62. Further, in a state that no force or moment is exerted, a counter surface of the third plate-shaped piece 63 (displacement portion) and a counter surface of the supporting substrate 300 are kept parallel.

Here, when noted is a planar shape of the detection portion in each of the examples shown in FIG. 13, FIG. 16, FIG. 24, FIG. 27, FIG. 31, FIG. 41 and FIG. 42 described above, any of projection images of the first plate-shaped pieces 61, 71, the second plate-shaped pieces 62, 72 and the third plate-shaped pieces 63, 73 on the XY plane are formed in a fan shape close to a trapezoid. Contour lines on both sides of the projection image are those along the radius toward the origin O. For example, any of the planar shapes of the plate-shaped pieces 61, 62, 63 which constitute the detection portion D4 shown in FIG. 13(c) are formed in a fan shape close to a trapezoid. This is because the detection ring 600 is formed in a circular annular shape, so that the detection portions D1 to D4 are each designed so as to be in agreement with the circular annular shape.

In contrast, in the example shown in FIG. 35, for example, any of the planar shapes of the plate-shaped pieces 71S, 72S, 73S which constitute the detection portion D11S are rectangular. This is because the detection ring 700S is formed in a square annular shape, the detection portions D11S to D18S are each designed so as to be in agreement with the square annular shape.

In the examples described above, the planar shape of each of the plate-shaped pieces which constitute the detection portion is designed to be a fan shape or rectangular in agreement with the shape of the detection ring. However, the planar shape of each of the plate-shaped pieces is not necessarily formed so as to be different depending on the case, as described in the above example. For example, as shown in FIG. 13(c), even where adopted is the circular-annular-shaped detection ring 600, each of the plate-shaped pieces 61, 62, 63 may be designed so as to be rectangular in planar shape. In the example shown in FIG. 13(c), each of the plate-shaped pieces 61, 62, 63 is formed rectangular in planar shape, as with each of the plate-shaped pieces 71S, 72S, 73S shown in FIG. 35. Thereby, where a three-dimensional structure of the detection portion D is formed by cutting processing or wire-cut processing, a simple step of driving tools in the same direction can be adopted, and this is preferable in mass-producing sensors.

Figure 44:
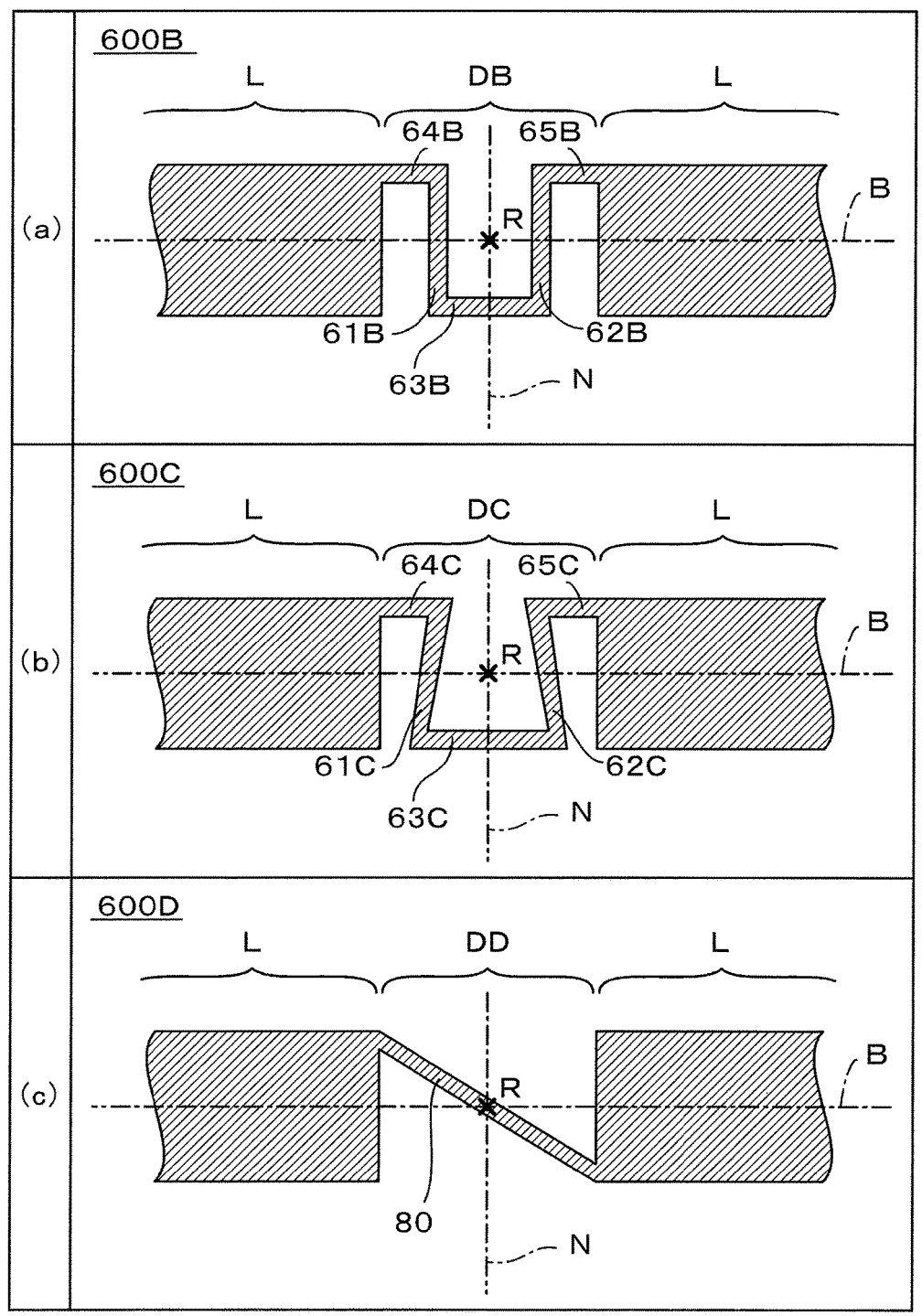
FIG. 44 is a partial sectional view which shows variations of a structure of the detection portion in the present invention.

The detection portion D having a cross sectional structure illustrated as an example in FIG. 17 (a) is one of the detection portions having the most preferable structure in carrying out the present invention. A structure of the detection portion D which can be used in the present invention shall not be, however, restricted to a structure illustrated in FIG. 17(a). FIG. 44 is a partial sectional view which shows structural variations of the detection portion D.

A detection portion DB shown in FIG. 44 (a) is a detection portion installed at a part of a detection ring 600B and provided with a first plate-shaped piece 61B, a second plate-shaped piece 62B, a displacement portion 63B, a first bridge portion 64B and a second bridge portion 65B. As shown in the drawing, each of the displacement portion 63B, the first bridge portion 64B and the second bridge portion 65B is a plate-shaped constituent which is arranged so as to be parallel to the XY plane (plane including the basic annular channel B). The first plate-shaped piece 61B and the second plate-shaped piece 62B are each a plate-shaped constituent which is arranged so as to be orthogonal to the XY plane (parallel to the normal line N).

In the case of the detection portion D shown in FIG. 17(a), the first plate-shaped piece 61 and the second plate-shaped piece 62 are inclined so as to face each other in a reverse direction. However, in the case of the detection portion DB shown in FIG. 44(a), the first plate-shaped piece 61B and the second plate-shaped piece 62B are kept parallel to each other. Therefore, in the detection portion DB, even upon exertion of a compressive force f1 or upon exertion of an extension force f2, the first plate-shaped piece 61B and the second plate-shaped piece 62B are inclined to the normal line N. In both of the above-described cases, the displacement portion 63B moves upward in the drawing. Therefore, it is impossible to detect a direction of force or moment exerted by an increase and decrease in capacitance value of the capacitive element C. However, in an application where a direction of the exerted force or moment is predetermined, it is possible to detect magnitude of force or moment exerted by the detection portion DB.

A detection portion DC shown in FIG. 44(b) is a detection portion which is installed at a part of the detection ring 600C and provided with a first plate-shaped piece 61C, a second plate-shaped piece 62C, a displacement portion 63C, a first bridge portion 64C and a second bridge portion 65C. As shown in the drawing, any of the displacement portion 63C, the first bridge portion 64C and the second bridge portion 65C are a plate-shaped constituent which is arranged so as to be parallel to the XY plane (plane including the basic annular channel B). The first plate-shaped piece 61C and the second plate-shaped piece 62C are a plate-shaped constituent which is arranged so as to be inclined to the normal line N in a reverse direction to each other. However, they are different in inclination mode from the detection portion D shown in FIG. 17 (a), and a distance between the plate-shaped pieces 61C, 62C is increased, as moving further downward in the drawing.

In the detection portion DC, upon exertion of a compressive force f1, the displacement portion 63C moves upward in the drawing, and upon exertion of an extension force f2, the displacement portion 63C moves downward in the drawing. And, displacement occurs in a direction reverse to that of the detection portion D shown in FIG. 17(a). It is, however, possible to detect a direction and magnitude of force and moment exerted by an increase and decrease in capacitance values of capacitive elements C.

A detection portion DD shown in FIG. 44(c) is a detection portion installed at a part of the detection ring 600D and quite simple in structure by being composed of a single plate-shaped deformation portion 80. The plate-shaped deformation portion 80 is a constituent which undergoes elastic deformation by exertion of force or moment to be detected, and a plate face thereof is arranged so as to be inclined to the XY plane (plane including the basic annular channel B). In the detection portion DD, deflection will occur at the plate-shaped deformation portion 80, upon exertion of a compressive force F1 or an extension force F2.

As with the above-described individual embodiments, where a capacitive element is used as a detection element, it is not preferable to adopt a simple structure such as the detection portion DD. However, as will be described below, where a strain gauge is used as a detection element, a simple structure such as the detection portion DD is significantly useful.

As a matter of course, various types of structures can be adopted additionally, as the detection portion D. As a detection portion used in the present invention, in brief, any structure will do as long as the structure causes displacement or deflection when a compressive force f1 or an extension force f2 is exerted in a direction along the basic annular channel B. On the other hand, a coupling portion may be flexible to some extent. However, in giving effective deformation to the detection portion by an exerted external force, it is preferable that the coupling portion is less likely to undergo deformation as much as possible. Therefore, it is, in practice, preferable that the detection portion is at least partially an elastic deformation body which causes significant elastic deformation detectable by a detection element and the coupling portion is a rigid body in which no significant deformation is detected in terms of detection sensitivity of the detection element.

Further, in the above-described embodiments, there is used the detection portion D which is structured so that the displacement portion 63 undergoes displacement in the direction of the Z-axis. The displacement portion 63 will not, however, necessarily undergo displacement in the direction of the Z-axis.

Figure 45:
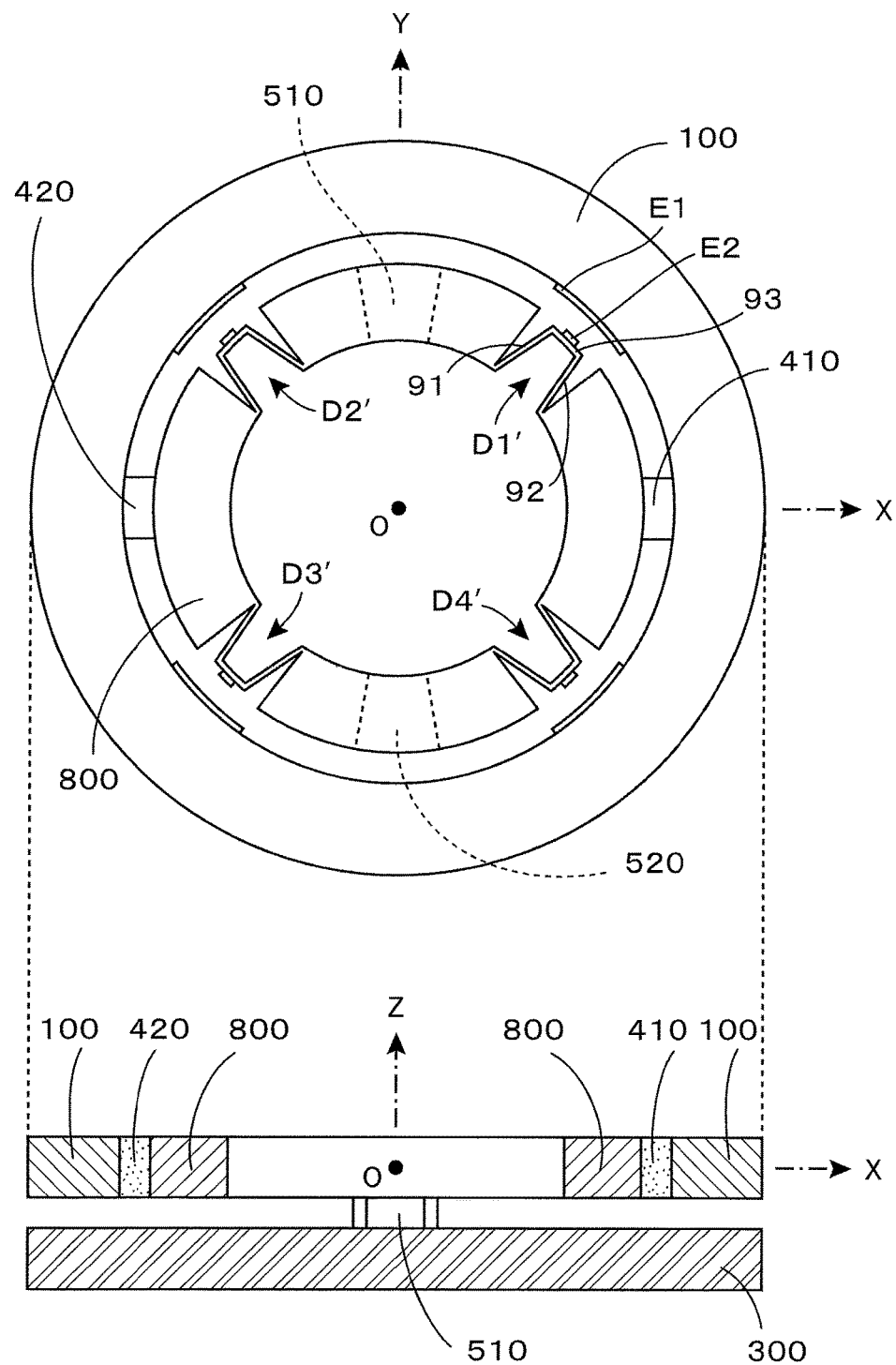
FIG. 45 is a top view (view shown in the upper part of the figure) of a basic structure portion of a force sensor according to a modification example in which, in place of the detection ring 600 of the First Embodiment shown in FIG. 16, a detection ring 800 which is changed in the direction of the detection portion is used and a side sectional view (view shown in the lower part of the figure) in which the detection ring 800 is cut along the XZ plane.

FIG. 45 is a top view (view shown in the upper part of the figure) of a basic structure portion of a force sensor according to a modification example in which a detection ring 800 which is changed in the direction of the detection portion is used in place of the detection ring 600 of the First Embodiment shown in FIG. 16 and a side sectional view (view shown in the lower part of the figure) in which the basic structure portion is cut along the XZ plane. The four sets of detection portions D1 to D4 installed on the detection ring 600 shown in FIG. 16 are replaced by four sets of detection portions D1' to D4' in the detection ring 800 shown in FIG. 45. Here, the four sets of detection portions D1' to D4' are each similar in fundamental structure to the detection portion D shown in FIG. 17 (a) but different in direction on the detection ring.

As apparent from the detection portion D1' of FIG. 45, the detection portion D1' is constituted with a first plate-shaped piece 91 and a second plate-shaped piece 92, each undergoing elastic deformation, as well as a third plate-shaped piece 93, the both ends of which are supported by the plate-shaped pieces 91, 92, and the third plate-shaped piece 93 functions as a displacement portion. Here, the plate-shaped pieces 91, 92, 93 correspond respectively to the plate-shaped pieces 61, 62, 63 shown in FIG. 17(a) but each of them is different in the direction at which they are arranged on the detection ring.

That is, in the four sets of detection portions D1 to D4 installed on the detection ring 600 shown in FIG. 16, the displacement portion 63 is positioned below the detection ring 600 and a lower face of the displacement portion 63 faces an upper face of the supporting substrate 300. In contrast, in the four sets of detection portions D1' to D4' installed on the detection ring 800 shown in FIG. 45, the displacement portion 93 is positioned outside the detection ring 800 and an external face of the displacement portion 93 faces an inner circumferential face of the force receiving body 100.

In other words, the four sets of detection portions D1' to D4' shown in FIG. 45 are structured so that the four sets of detection portions D1 to D4 shown in FIG. 16 are rotated by 90 degrees, with the basic annular channel B given as a rotating axis. Therefore, when a compressive force f1 is exerted along the basic annular channel B, the displacement portion 93 undergoes displacement to the outside (refer to FIG. 17(b)), and when an extension force f2 is exerted along the basic annular channel B, the displacement portion 93 undergoes displacement to the inside (refer to FIG. 17(c)).

As described above, in the four sets of detection portions D1 to D4 installed on the detection ring 600 shown in FIG. 16, the displacement portion 63 undergoes displacement in the direction of the Z-axis, while in the four sets of detection portions D1' to D4' installed on the detection ring 800 shown in FIG. 45, the displacement portion 93 undergoes displacement in a radial direction of a circle depicted on the XY plane around the origin O. Therefore, as shown in FIG. 45, a displacement electrode E2 is formed on an external face of the displacement portion 93 and a fixed electrode E1 is formed on an inner circumferential face of the force receiving body 100 facing thereto, by which a capacitive element C can be constituted with a pair of electrodes E1, E2. Then, a capacitance value of the capacitive element C can be used as a parameter which shows radial displacement of the displacement portion 93.

As a matter of course, the four sets of capacitive elements C1' to C4' formed by the four sets of detection portions D1' to D4' shown in FIG. 45 are different in behavior from the four sets of capacitive elements C1 to C4 formed by the four sets of detection portions D1 to D4 shown in FIG. 16. Therefore, a variation mode of capacitance values of the four sets of capacitive elements C1' to C4' is different from that shown in the table of FIG. 20. However, as a table for showing the variation mode of capacitance values of the four sets of capacitive elements C1' to C4', a table such as the table of FIG. 20 is prepared, thus making it possible to derive an arithmetic expression for calculating each axis component of force or moment to be detected.

Here, as to the force sensor described in FIG. 45, there is omitted a description of a concrete arithmetic expression for calculating each axis component. However, the modification example shown in FIG. 45 shows the following two important points. A first point is that where a capacitive element is used as a detection element, a change in electrode interval of the capacitive element concerned is not necessarily a change in the direction of the Z-axis. The example shown in the drawing is such that an electrode interval of the capacitive element is changed in a radial direction. As a matter of course, there may be used such a capacitive element that an electrode interval is changed in any other given direction.

Then, a second point is that where a capacitive element is used as a detection element, a displacement electrode E2 is required to be installed at a detection portion (that is, on a detection ring) but a fixed electrode E1 which faces the displacement electrode E2 is not necessarily installed at a supporting body (the supporting substrate 300) and may be installed at the force receiving body 100. In each of the embodiments described up to Chapter 8-4, the fixed electrodes E1 are all installed on the upper face of the supporting substrate 300. However, in the case of the modification example shown in FIG. 45, the fixed electrode E1 is not installed at the supporting substrate 300 but installed on an inner circumferential face of the circular annular force receiving body 100. Here, the force receiving body 100 undergoes displacement by exertion of an external force and, as a result, there is a possibility that displacement may occur at the fixed electrode E1 as well. However, this displacement is not completely associated with displacement of the displacement electrode E2, thus making it possible to detect an external force exerted on the force receiving body 100 on the basis of the variation mode of capacitance values of the individual capacitive elements C1' to C4'.

<8-6. Modification Example in which Strain Gauge is Used>

In the above-described embodiments, a capacitive element is used as a detection element for detecting elastic deformation occurring at a detection portion. In carrying out the present invention, a detection element is not necessarily restricted to a capacitive element. Here, there is shown a modification example in which a strain gauge fixed at a position of a detection portion which undergoes elastic deformation is used as a detection element and a circuit for outputting an electric signal which indicates force or moment exerted on the basis of variation in electrical resistance of the strain gauge is used as a detection circuit.

Figure 46:
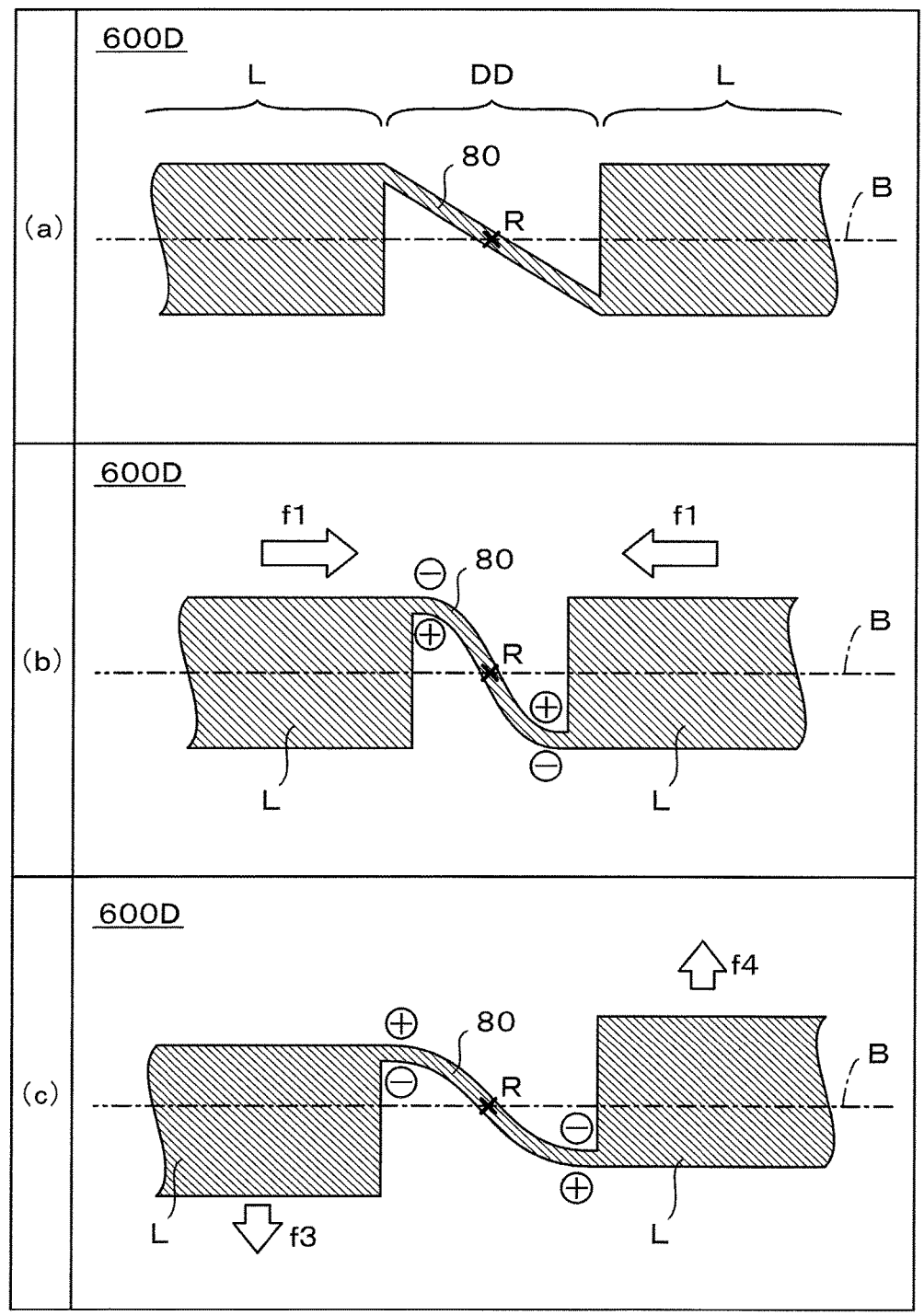
FIG. 46 is a partial sectional view which shows a mode of elastic deformation of a plate-shaped deformation portion 80 which constitutes a detection portion DD shown in FIG. 44(c).

FIG. 46 is a partial sectional view which shows a mode of elastic deformation of a plate-shaped deformation portion 80 which constitutes the detection portion DD shown in FIG. 44(c). FIG. 46(a) shows a state that no external force is exerted on the detection portion DD. As shown in the drawing, the detection portion DD is constituted with the plate-shaped deformation portion 80 which undergoes elastic deformation upon exertion of force or moment to be detected. Here, the plate-shaped deformation portion 80 is arranged so that a plate face thereof is inclined to a basic annular channel B. Actually, the above-described detection portion DD is arranged at a plurality of sites on a detection ring 600D. In other words, the detection ring 600D is an annular structure body in which a plurality of plate-shaped deformation portions 80 and a plurality of coupling portions L are alternately arranged.

Now, consideration is given to a case where a compressive force f1 shown in FIG. 46(b) is exerted at a position of the detection point R on the detection ring 600D. In this case, deflection will occur in the plate-shaped deformation portion 80 and stress which is indicated by [−] or [+] in the drawing will develop at individual sites on the surface thereof. Here, [+] indicates a compression stress (that is, stress in a contracting direction along the basic annular channel B), and [−] indicates an extension stress (that is, stress in a direction expanding along the basic annular channel B laterally in the drawing). As illustrated in the drawing, the stress developing on the surface of the plate-shaped deformation portion 80 concentrates in the vicinity of both ends of the plate-shaped deformation portion 80 which is connected with the coupling portions L. On the other hand, where an extension force f2 is exerted at a position of the detection point R, there is obtained stress distribution which is indicated by a symbol reverse to that in FIG. 46(b).

In contrast, FIG. 46(c) indicates stress distribution occurring where force in the longitudinal direction is exerted on an adjacent pair of coupling portions L. Specifically, the example shown in the drawing is to show stress distribution obtained when a force f3 which is downward in the drawing is exerted on a coupling portion L on the left-hand side, a force f4 which is upward in the drawing is exerted on a coupling portion L on the right-hand side. In this case as well, the stress occurring on the surface of the plate-shaped deformation portion 80 concentrates in the vicinity of both ends of the plate-shaped deformation portion 80 which is connected with the coupling portions L.

With consideration given to the above-described stress distribution, in order to detect elastic deformation occurring at the detection portion DD by using strain gauges with reference to the detection portion DD composed of the plate-shaped deformation portion 80 as shown in the drawing, it is found that effective detection can be made by arranging each of the strain gauges on both faces of the plate-shaped deformation portion 80 in the vicinity of an end thereof which is connected with the coupling portion L.

Figure 47:
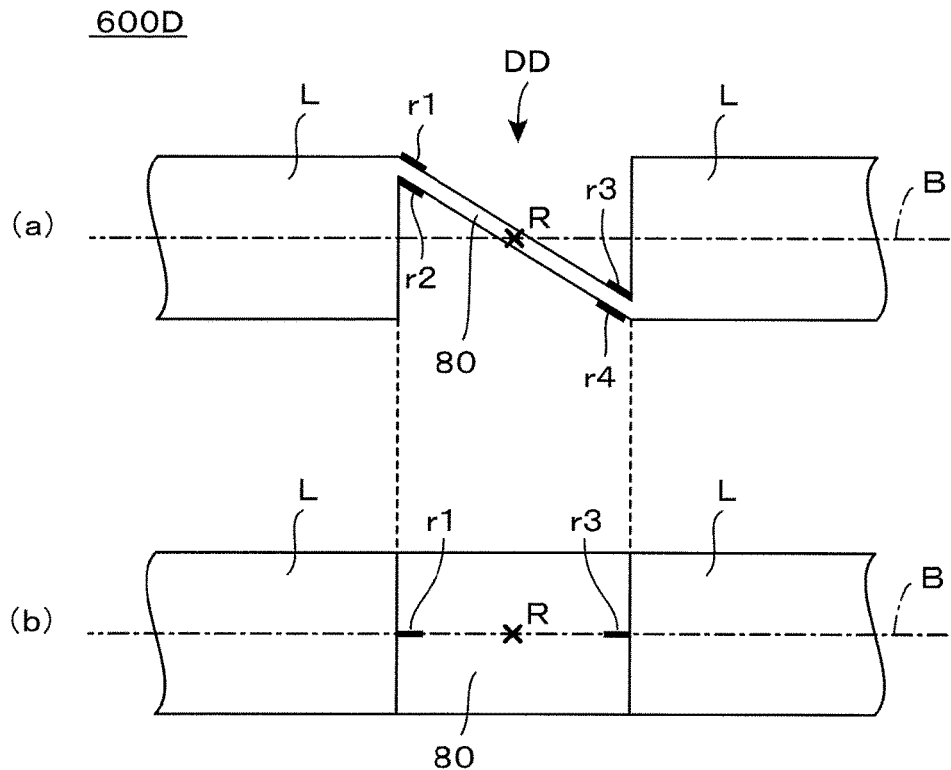
FIG. 47 is a side view (Fig. (a)) and a top view (Fig. (b)), each of which shows an example in which a strain gauge is used as a detection element for detecting elastic deformation occurring at the detection portion DD shown in FIG. 44(c).

FIG. 47 is a side view (Fig. (a)) and a top view (Fig. (b)) in which the strain gauge is used on the basis of the above consideration as a detection element for detecting elastic deformation occurring at the detection portion DD shown in FIG. 44(c). Where the detection ring is circular, the basic annular channel B is to constitute a circle. However, in FIG. 47, for the sake of convenience of description, a part of the basic annular channel B is indicated by the straight line.

As shown in the drawing, in the plate-shaped deformation portion 80 which constitutes the detection portion DD, a first strain gauge r1 is attached on a front face of the deformation portion 80 in the vicinity of a first connection end with the coupling portion L on the left-hand side, and a second strain gauge r2 is attached on a rear face thereof. Similarly, a third strain gauge r3 is attached on a front face of the deformation portion 80 in the vicinity of a second connection end with the coupling portion L on the right-hand side and a fourth strain gauge r4 is attached on a rear face thereof.

Figure 48:
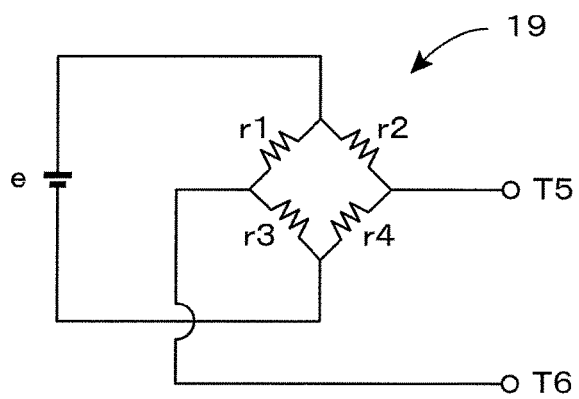
FIG. 48 is a circuit diagram which shows a bridge circuit for outputting electric signals on the basis of detection results of four sets of strain gauges shown in FIG. 47.

FIG. 48 is a circuit diagram which shows a bridge circuit 19 for outputting electric signals on the basis of detection results of the four sets of strain gauges r1 to r4 shown in FIG. 47. Specifically, the bridge circuit 19 is a circuit in which the first strain gauge r1 and the fourth strain gauge r4 are given as a first opposite side, while the second strain gauge r2 and the third strain gauge r3 are given as a second opposite side. The bridge circuit is actuated by application of a predetermined voltage from a bridge voltage source e. A detection circuit for detecting a bridge voltage developing between both output terminals T5 and T6 is installed on the bridge circuit 19, by which the bridge voltage can be used as a parameter which indicates an extent of deformation shown in FIG. 46(b) or that shown in FIG. 46(c).

Here, there is omitted a description of a concrete structure of the force sensor in which the strain gauge is used as a detection element and a concrete detection principle of individual axis components. Stress distribution occurring on the surface of the detection portion is determined by actual measurement or by simulation, thus making it possible to determine an effective arrangement of the strain gauges. It is also possible to obtain a detection value of directional component of a desired axis as an electric signal by performing predetermined operation on the basis of a bridge voltage of the bridge circuit constituted with these strain gauges.

INDUSTRIAL APPLICABILITY

The force sensor according to the present invention functions to detect force in the direction of any given coordinate axis or moment around any given coordinate axis in an XYZ three-dimensional orthogonal coordinate system. Further, the sensor can be produced at high efficiency and used in various types of industrial machines for measurement of force and moment. In particular, in an industrial machine in which a robot arm is used to perform automatic assembly, the sensor is optimally used in an application where it is incorporated into a joint portion of the arm, thereby monitoring and controlling force occurring at a leading end of the arm.

What is claimed is:

1. A force sensor which detects force or moment with regard to at least one axis, among force in a direction of each coordinate axis and moment around each coordinate axis, in an XYZ three-dimensional orthogonal coordinate system,
the force sensor comprising:
a force receiving body (100; 150; 180) which receives exertion of force or moment to be detected;
a detection ring (600; 600B; 600C; 600D; 700; 700S; 800) which has an annular structure extending along a predetermined basic annular channel (B; BS) and which is provided with a detection portion (D; D1 to D4; D1' to D4'; D11 to D18; D11S to D18S; DC; DD) which is positioned at a detection point (R; R1 to R4; R11 to R18) defined on the basic annular channel and also provided with a coupling portion (L; L1 to L4; L11 to L18; L11S to L18S) which is positioned on both sides of the detection portion;
a supporting body (300; 380) which supports the detection ring;
a connection member (410, 420; 460, 470; 480, 490) which connects the force receiving body to a position of a predetermined exertion point (Q1, Q2; Q11 to Q16) on the detection ring;
a fixing member (510, 520; 515, 525; 516, 526; 560, 570, 580, 590) which fixes a position of a predetermined fixing point (P1, P2; P11 to P16) of the detection ring to the supporting body;
a detection element (C; C1 to C4; C11 to C18; r1 to r4) which detects elastic deformation occurring at the detection portion; and
a detection circuit (11 to 18) which outputs an electric signal on the basis of detection result of the detection element in a state that a load is applied to one of the force receiving body (100; 150; 180) and the supporting body (300; 380), the electric signal indicating force or moment exerted on the other; wherein
the exertion point (Q1, Q2; Q11 to Q16) and the fixing point (P1, P2; P11 to P16) are arranged at positions of the coupling portion (L; L1 to L4; L11 to L18; L11S to L18S) which are different from each other, and
the detection portion (D; D1 to D4; D1' to D4'; D11 to D18; D11S to D18S; DB; DD) is structured so as to develop elastic deformation at least partially, when force is exerted between the exertion point and the fixing point, on the basis of exertion of the force.

2. The force sensor according to claim 1, wherein
the detection element (C; C1 to C4; C11 to C18) is constituted with a capacitive element (C; C1 to C4; C11 to C18) which has a displacement electrode (E2; E21 to E28; E2 (D1) to E2 (D4)) fixed at a predetermined position of the detection portion (D; D1 to D4; D1' to D4'; D11 to D18; D11S to D18S; DB; DC) and a fixed electrode (E1; E11 to E18) fixed at a position of the supporting body (300; 380) or the force receiving body (100; 150; 180) facing the displacement electrode,
the displacement electrode is arranged at a position at which displacement is caused to the fixed electrode on the basis of elastic deformation occurring at the detection portion, and
the detection circuit (11 to 18) outputs an electric signal which indicates force or moment exerted, on the basis of variation in a capacitance value of the capacitive element.

3. The force sensor according to claim 2, wherein
when an XY plane is taken on a horizontal face and a Z-axis is given as an axis moving perpendicularly upward,
the detection ring (600; 600B; 600C; 700; 700S) is provided with an annular structure extending along a basic annular channel (B; BS) positioned on the XY plane, with the Z-axis given as a central axis,
the supporting body (300; 380) is constituted with a supporting substrate arranged below the detection ring, with a predetermined interval kept, and
the displacement electrode (E2; E21 to E28; E2(D1) to E2(D4)) is fixed on a lower face of the detection portion, and the fixed electrode (E1; E11 to E18) is fixed on an upper face of the supporting substrate.

4. The force sensor according to claim 3, wherein
the detection portion (D; D1 to D4; D11 to D18; D11S to D18S; DB; DC) is provided with a first deformation portion (61; 61B; 61C; 71; 71S) which undergoes elastic deformation by exertion of force or moment to be detected, a second deformation portion (62; 62B; 62C; 72; 72S) which undergoes elastic deformation by exertion of force or moment to be detected, and a displacement portion (63; 63B; 63C; 73; 73S) which undergoes displacement by elastic deformation of the first deformation portion and the second deformation portion,
an external end of the first deformation portion (61; 61B; 61C; 71; 71S) is connected to a coupling portion (L; L1 to L4; L11 to L18; L11S to L18S) adjacent thereto, an internal end of the first deformation portion (61; 61B; 61C; 71; 71S) is connected to the displacement portion (63; 63B; 63C; 73; 73S), an external end of the second deformation portion (62; 62B; 62C; 72; 72S) is connected to a coupling portion (L; L1 to L4; L11 to L18; L11S to L18S) adjacent thereto, and an internal end of the second deformation portion (62; 62B; 62C; 72; 72S) is connected to the displacement portion (63; 63B; 63C; 73; 73S), and
the displacement electrode (E2; E21 to E28; E2 (D1) to E2 (D4)) is fixed at a position of the displacement portion (63; 63B; 63C; 73; 73S) facing the supporting substrate (300; 380).

5. The force sensor according to claim 4, wherein
n number, where n≥2, of plural detection points (R; R1 to R4; R11 to R18) are defined on the basic annular channel (B; BS), detection portions (D; D1 to D4; D11 to D18; D11S to D18S; DB; DC) are positioned at the respective detection points, the detection ring (600;

600B; 600C; 700; 700S) is constituted by arranging alternately n number of detection portions (D; D1 to D4; D11 to D18; D11S to D18S; DB; DC) and n number of coupling portions (L; L1 to L4; L11 to L18; L11S to L18S) along the basic annular channel (B; BS).

6. The force sensor according to claim 5, wherein n even number, where n>2, of the detection points (R; R1 to R4; R11 to R18) are defined on the basic annular channel (B; BS), the detection portions (D; D1 to D4; D11 to D18; D11S to D18S; DB; DC) are positioned on the respective detection points, and the detection ring (600; 600B; 600C; 700; 700S) is constituted by alternately arranging n number of the detection portions (D; D1 to D4; D11 to D18; D11S to D18S; DB; DC) and n number of the coupling portions (L; L1 to L4; L11 to L18; L11S to L18S) along the basic annular channel (B; BS).

7. The force sensor according to claim 6, wherein when n even number of the coupling portions (L1 to L4; L11 to L18) are numbered sequentially along the basic annular channel (B), the exertion points (Q1, Q2; Q11 to Q16) are arranged at odd-numbered coupling portions, and the fixing points (P1, P2; P11 to P16) are arranged at even-numbered coupling portions.

8. The force sensor according to claim 7, wherein n is set to be equal to 2, by which the coupling portions and the detection portions are arranged in an order of a first coupling portion (L1), a first detection portion (D1), a second coupling portion (L2) and a second detection portion (D2) along the basic annular channel (B) to constitute the detection ring, the exertion point (Q1) is arranged at the first coupling portion (L1), and the fixing point (P1) is arranged at the second coupling portion (L2).

9. The force sensor according to claim 7, wherein n is set to be equal to 4, by which the coupling portions and the detection portions are arranged in an order of a first coupling portion (L1), a first detection portion (D1), a second coupling portion (L2), a second detection portion (D2), a third coupling portion (L3), a third detection portion (D3), a fourth coupling portion (L4) and a fourth detection portion (D4) along the basic annular channel (B) to constitute the detection ring (600), a first exertion point (Q1) is arranged at the first coupling portion (L1), a first fixing point (P1) is arranged at the second coupling portion (L2), a second exertion point (Q2) is arranged at the third coupling portion (L3), and a second fixing point (P2) is arranged at the fourth coupling portion (L4), connection members (410, 420) are provided with a first connection member (410) for connecting a position of the first exertion point (Q1) of the detection ring (600) to the force receiving body (100) and a second connection member (420) for connecting a position of the second exertion point (Q2) of the detection ring (600) to the force receiving body (100), and fixing members (510, 520) are provided with a first fixing member (510) for fixing a position of the first fixing point (P1) of the detection ring (600) to the supporting substrate (300) and a second fixing member (520) for fixing a position of the second fixing point (P2) of the detection ring (600) to the supporting substrate (300).

10. The force sensor according to claim 9, wherein the first exertion point (Q1) is arranged on a positive X-axis, the second exertion point (Q2) is arranged on a negative X-axis, the first fixing point (P1) is arranged on a positive Y-axis, and the second fixing point (P2) is arranged on a negative Y-axis.

11. The force sensor according to claim 10, wherein where a V-axis is defined as a coordinate axis in which the X-axis is rotated counter-clockwise by 45 degrees around an origin O on the XY plane and W-axis is defined as a coordinate axis in which the Y-axis is rotated counter-clockwise by 45 degrees around the origin O on the XY plane, a first detection point (R1), a second detection point (R2), a third detection point (R3) and a fourth detection point (R4) are arranged respectively on a positive V-axis, a positive W-axis, a negative V-axis and a negative W-axis.

12. The force sensor according to claim 11, wherein there is formed at each of the detection portions, a capacitive element in which a capacitance value is reversed in terms of an increase and decrease depending on when a compression stress is exerted or when an extension stress is exerted along the basic annular channel (B), when a capacitance value of a first capacitive element having a displacement electrode fixed at the first detection portion (D1) positioned at the first detection point (R1) is termed C1, a capacitance value of the second capacitive element having a displacement electrode fixed at the second detection portion (D2) positioned at the second detection point (R2) is termed C2, a capacitance value of the third capacitive element having a displacement electrode fixed at the third detection portion (D3) positioned at the third detection point (R3) is termed C3, and a capacitance value of the fourth capacitive element having a displacement electrode fixed at the fourth detection portion (D4) positioned at the fourth detection point (R4) is termed C4, the detection circuit (11 to 18) performs operation on the basis of the following arithmetic expressions $Fz = -(C1+C2+C3+C4)$ $Mx = -C1-C2+C3+C4$ $My = +C1-C2-C3+C4$ $Mz = +C1-C2+C3-C4,$ thereby outputting electric signals which indicate force Fz exerted in a direction of the Z-axis, moment Mx exerted around the X-axis, moment My exerted around the Y-axis and moment Mz exerted around the Z-axis.

* * * * *